United States Patent
Weiss et al.

(10) Patent No.: US 11,577,965 B2
(45) Date of Patent: *Feb. 14, 2023

(54) METHODS AND SYSTEMS FOR TREATMENT OF LIME TO FORM VATERITE

(71) Applicant: Arelac, Inc., San Jose, CA (US)

(72) Inventors: Michael Joseph Weiss, Los Gatos, CA (US); Ryan J Gilliam, San Jose, CA (US)

(73) Assignee: Arelac, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/184,933

(22) Filed: Feb. 25, 2021

(65) Prior Publication Data

US 2021/0261428 A1   Aug. 26, 2021

Related U.S. Application Data

(60) Provisional application No. 62/981,266, filed on Feb. 25, 2020.

(51) Int. Cl.
*C01F 11/18* (2006.01)

(52) U.S. Cl.
CPC .......... *C01F 11/183* (2013.01); *C01F 11/181* (2013.01); *C01F 11/185* (2013.01)

(58) Field of Classification Search
None
See application file for complete search history.

(56) References Cited

U.S. PATENT DOCUMENTS

| | | | |
|---|---|---|---|
| 2,212,446 A | * | 8/1940 | MacIntire ............. C04B 2/10 423/176 |
| 4,108,752 A | | 8/1978 | Pohto et al. |
| 4,111,779 A | | 9/1978 | Seko et al. |
| 4,329,320 A | * | 5/1982 | Vydra ................ B01D 5/0084 423/420 |
| 4,623,433 A | | 11/1986 | Streichenberger |
| 4,643,818 A | | 2/1987 | Seko et al. |
| 5,275,651 A | | 1/1994 | Minayoshi et al. |
| 5,290,353 A | | 3/1994 | Goffin et al. |
| 5,376,343 A | | 12/1994 | Fouche |

(Continued)

FOREIGN PATENT DOCUMENTS

| | | |
|---|---|---|
| CN | 1053642 C | 6/2000 |
| CN | 1056591 C | 9/2000 |

(Continued)

OTHER PUBLICATIONS

Dri et al., Dissolution of steel slag and recycled concrete aggregate in ammonium bisulphrate for CO2 mineral carbonation, Fuel Processing Technology, 2013, 113, 114-122 (Year: 2013).*

(Continued)

*Primary Examiner* — Coris Fung
*Assistant Examiner* — Keling Zhang
(74) *Attorney, Agent, or Firm* — Arelac, Inc.

(57) ABSTRACT

Provided herein are methods and systems to form calcium carbonate comprising vaterite, comprising dissolving lime in an aqueous base solution under one or more precipitation conditions to produce a precipitation material comprising calcium carbonate and a supernatant solution, wherein the calcium carbonate comprises vaterite.

23 Claims, 9 Drawing Sheets

(56) References Cited

U.S. PATENT DOCUMENTS

| | | |
|---|---|---|
| 5,494,651 A | 2/1996 | Minayoshi et al. |
| 5,792,440 A | 8/1998 | Huege |
| 5,846,500 A | 12/1998 | Bunger et al. |
| 5,997,833 A | 12/1999 | Bunger et al. |
| 6,132,696 A | 10/2000 | Porter et al. |
| 6,251,356 B1 | 6/2001 | Mathur |
| 6,310,129 B1 | 10/2001 | Lilly et al. |
| 7,735,274 B2 | 6/2010 | Constantz et al. |
| 7,744,761 B2 | 6/2010 | Constantz et al. |
| 7,749,476 B2 | 7/2010 | Constantz et al. |
| 7,753,618 B2 | 7/2010 | Constantz et al. |
| 7,754,169 B2 | 7/2010 | Constantz et al. |
| 7,771,684 B2 | 8/2010 | Constantz et al. |
| 7,790,012 B2 | 9/2010 | Kirk et al. |
| 7,815,880 B2 | 10/2010 | Constantz et al. |
| 7,829,053 B2 | 11/2010 | Constantz et al. |
| 7,875,163 B2 | 1/2011 | Gilliam et al. |
| 7,887,694 B2 | 2/2011 | Constantz et al. |
| 7,906,028 B2 | 3/2011 | Constantz et al. |
| 7,914,685 B2 | 3/2011 | Constantz et al. |
| 7,922,809 B1 | 4/2011 | Constantz et al. |
| 7,931,809 B2 | 4/2011 | Constantz et al. |
| 7,939,336 B2 | 5/2011 | Constantz et al. |
| 7,966,250 B2 | 6/2011 | Constantz et al. |
| 7,993,500 B2 | 8/2011 | Gilliam et al. |
| 7,993,511 B2 | 8/2011 | Gilliam et al. |
| 8,006,446 B2 | 8/2011 | Constantz et al. |
| 8,062,418 B2 | 11/2011 | Constantz et al. |
| 8,114,214 B2 | 2/2012 | Constantz et al. |
| 8,137,455 B1 | 3/2012 | Constantz et al. |
| 8,906,156 B2 | 12/2014 | Constantz et al. |
| 8,992,875 B2 | 3/2015 | Tavakkoli et al. |
| 9,725,330 B2 | 8/2017 | Tavakkoli et al. |
| 9,902,652 B2 | 2/2018 | Devenney et al. |
| 2001/0033820 A1 | 10/2001 | Yaniv |
| 2005/0158226 A1 | 7/2005 | Misske et al. |
| 2006/0067869 A1 | 3/2006 | De et al. |
| 2008/0245012 A1 | 10/2008 | Boisvert et al. |
| 2009/0001020 A1 | 1/2009 | Constantz et al. |
| 2009/0020044 A1 | 1/2009 | Constantz et al. |
| 2009/0169452 A1 | 7/2009 | Constantz et al. |
| 2009/0202410 A1 | 8/2009 | Kawatra et al. |
| 2009/0301352 A1 | 12/2009 | Constantz et al. |
| 2010/0000444 A1 | 1/2010 | Constantz et al. |
| 2010/0024686 A1 | 2/2010 | Constantz et al. |
| 2010/0051859 A1 | 3/2010 | House et al. |
| 2010/0063902 A1 | 3/2010 | Constantz et al. |
| 2010/0077691 A1 | 4/2010 | Constantz et al. |
| 2010/0077922 A1 | 4/2010 | Constantz et al. |
| 2010/0083880 A1 | 4/2010 | Constantz et al. |
| 2010/0084280 A1 | 4/2010 | Gilliam et al. |
| 2010/0093581 A1 | 4/2010 | Winston et al. |
| 2010/0108537 A1 | 5/2010 | Perego et al. |
| 2010/0111810 A1 | 5/2010 | Constantz et al. |
| 2010/0116683 A1 | 5/2010 | Gilliam et al. |
| 2010/0132556 A1 | 6/2010 | Constantz et al. |
| 2010/0132591 A1 | 6/2010 | Constantz et al. |
| 2010/0135865 A1 | 6/2010 | Constantz et al. |
| 2010/0135882 A1 | 6/2010 | Constantz et al. |
| 2010/0140103 A1 | 6/2010 | Gilliam et al. |
| 2010/0144521 A1 | 6/2010 | Constantz et al. |
| 2010/0150802 A1 | 6/2010 | Gilliam et al. |
| 2010/0154679 A1 | 6/2010 | Constantz et al. |
| 2010/0155258 A1 | 6/2010 | Kirk et al. |
| 2010/0158786 A1 | 6/2010 | Constantz et al. |
| 2010/0196104 A1 | 8/2010 | Constantz et al. |
| 2010/0200419 A1 | 8/2010 | Gilliam et al. |
| 2010/0219373 A1 | 9/2010 | Seeker et al. |
| 2010/0224503 A1 | 9/2010 | Kirk et al. |
| 2010/0229725 A1 | 9/2010 | Farsad et al. |
| 2010/0230293 A1 | 9/2010 | Gilliam et al. |
| 2010/0230830 A1 | 9/2010 | Farsad et al. |
| 2010/0236242 A1 | 9/2010 | Farsad et al. |
| 2010/0239467 A1 | 9/2010 | Constantz et al. |
| 2010/0239487 A1 | 9/2010 | Constantz et al. |
| 2010/0247410 A1 | 9/2010 | Constantz et al. |
| 2010/0258035 A1 | 10/2010 | Constantz et al. |
| 2010/0276299 A1 | 11/2010 | Kelly et al. |
| 2010/0290967 A1 | 11/2010 | Detournay et al. |
| 2010/0313793 A1 | 12/2010 | Constantz et al. |
| 2010/0313794 A1 | 12/2010 | Constantz et al. |
| 2010/0319586 A1 | 12/2010 | Blount et al. |
| 2010/0326328 A1 | 12/2010 | Constantz et al. |
| 2011/0000633 A1 | 1/2011 | Kukkamaeki et al. |
| 2011/0030586 A1 | 2/2011 | Constantz et al. |
| 2011/0030957 A1 | 2/2011 | Constantz et al. |
| 2011/0033239 A1 | 2/2011 | Constantz et al. |
| 2011/0035154 A1 | 2/2011 | Kendall et al. |
| 2011/0036728 A1 | 2/2011 | Farsad |
| 2011/0038774 A1 | 2/2011 | Zhong |
| 2011/0042230 A1 | 2/2011 | Gilliam et al. |
| 2011/0054084 A1 | 3/2011 | Constantz et al. |
| 2011/0059000 A1 | 3/2011 | Constantz et al. |
| 2011/0067600 A1 | 3/2011 | Constantz et al. |
| 2011/0067603 A1 | 3/2011 | Constantz et al. |
| 2011/0067605 A1 | 3/2011 | Constantz et al. |
| 2011/0071309 A1 | 3/2011 | Constantz et al. |
| 2011/0076587 A1 | 3/2011 | Wang et al. |
| 2011/0079515 A1 | 4/2011 | Gilliam et al. |
| 2011/0083968 A1 | 4/2011 | Gilliam et al. |
| 2011/0091366 A1 | 4/2011 | Kendall et al. |
| 2011/0091955 A1 | 4/2011 | Constantz et al. |
| 2011/0094159 A1 | 4/2011 | Moller |
| 2011/0132234 A1 | 6/2011 | Constantz et al. |
| 2011/0139628 A1 | 6/2011 | Teir et al. |
| 2011/0147227 A1 | 6/2011 | Gilliam et al. |
| 2011/0203489 A1 | 8/2011 | Constantz et al. |
| 2011/0226989 A9 | 9/2011 | Seeker et al. |
| 2011/0240916 A1 | 10/2011 | Constantz et al. |
| 2011/0247336 A9 | 10/2011 | Farsad et al. |
| 2011/0277474 A1 | 11/2011 | Constantz et al. |
| 2011/0277670 A1 | 11/2011 | Self et al. |
| 2012/0031303 A1 | 2/2012 | Constantz et al. |
| 2012/0082839 A1 | 4/2012 | Ha et al. |
| 2012/0085265 A1 | 4/2012 | Walenta et al. |
| 2012/0121488 A1 | 5/2012 | Comrie |
| 2013/0036948 A1 | 2/2013 | Fernandez et al. |
| 2013/0064752 A1 | 3/2013 | Kim et al. |
| 2013/0078168 A1 | 3/2013 | Kim et al. |
| 2013/0167756 A1 | 7/2013 | Chen et al. |
| 2013/0256939 A1 | 10/2013 | Devenney et al. |
| 2013/0336859 A1 | 12/2013 | Tavakkoli et al. |
| 2015/0183654 A1 | 7/2015 | Tavakkoli et al. |
| 2015/0307400 A1 | 10/2015 | Devenney et al. |
| 2016/0074806 A1* | 3/2016 | Benyahia ............... B01D 53/78 423/220 |
| 2019/0275485 A1 | 9/2019 | Sceats et al. |
| 2020/0361819 A1 | 11/2020 | Bittner et al. |
| 2021/0017035 A1 | 1/2021 | Weiss et al. |
| 2021/0403335 A1 | 12/2021 | Gilliam et al. |

FOREIGN PATENT DOCUMENTS

| | | |
|---|---|---|
| CN | 1058683 C | 11/2000 |
| CN | 1334782 A | 2/2002 |
| CN | 1094900 C | 11/2002 |
| CN | 1112320 C | 6/2003 |
| CN | 1131172 C | 12/2003 |
| CN | 1165487 C | 9/2004 |
| CN | 1167620 C | 9/2004 |
| CN | 1172854 C | 10/2004 |
| CN | 1172855 C | 10/2004 |
| CN | 1195683 C | 4/2005 |
| CN | 1204052 C | 6/2005 |
| CN | 1238254 C | 1/2006 |
| CN | 1253373 C | 4/2006 |
| CN | 1854069 A | 11/2006 |
| CN | 1323947 C | 7/2007 |
| CN | 101020579 A | 8/2007 |
| CN | 100340225 C | 10/2007 |
| CN | 100371249 C | 2/2008 |
| CN | 100390064 C | 5/2008 |
| CN | 100411992 C | 8/2008 |
| CN | 100424015 C | 10/2008 |

(56) References Cited

FOREIGN PATENT DOCUMENTS

| | | |
|---|---|---|
| CN | 100447087 C | 12/2008 |
| CN | 100450932 C | 1/2009 |
| CN | 100455515 C | 1/2009 |
| CN | 100545092 C | 9/2009 |
| CN | 100551826 C | 10/2009 |
| CN | 101302026 B | 8/2010 |
| CN | 1429772 B | 12/2010 |
| CN | 101362048 B | 1/2011 |
| CN | 101993104 A | 3/2011 |
| CN | 101293663 B | 5/2011 |
| CN | 101565198 B | 6/2011 |
| CN | 101314478 B | 7/2011 |
| CN | 101668703 B | 10/2011 |
| CN | 101914312 B | 11/2011 |
| CN | 101823744 B | 12/2011 |
| CN | 101823745 B | 12/2011 |
| CN | 101823746 B | 12/2011 |
| CN | 101823747 B | 1/2012 |
| CN | 101160262 B | 2/2012 |
| CN | 101838005 B | 2/2012 |
| CN | 102602973 A | 7/2012 |
| CN | 101331084 B | 8/2012 |
| CN | 101774623 B | 9/2012 |
| CN | 101920983 B | 11/2012 |
| CN | 101913640 B | 12/2012 |
| CN | 102092757 B | 12/2012 |
| CN | 102020878 B | 5/2013 |
| CN | 102295306 B | 5/2013 |
| CN | 103170226 A | 6/2013 |
| CN | 103172100 A | 6/2013 |
| CN | 102267713 B | 7/2013 |
| CN | 102531017 B | 8/2013 |
| CN | 101218308 B | 11/2013 |
| CN | 102583483 B | 11/2013 |
| CN | 102674425 B | 12/2013 |
| CN | 102124061 B | 4/2014 |
| CN | 102482111 B | 9/2014 |
| CN | 102923749 B | 11/2014 |
| CN | 103183370 B | 11/2014 |
| CN | 103466678 B | 11/2014 |
| EP | 0558275 A1 | 9/1993 |
| EP | 2253600 A1 | 11/2010 |
| EP | 2447213 A1 | 5/2012 |
| EP | 2828434 A1 | 1/2015 |
| GB | 257084 A | 8/1926 |
| JP | H02302317 A | 12/1990 |
| JP | H08217522 A | 8/1996 |
| WO | WO-9713723 A1 | 4/1997 |
| WO | WO-9918151 A1 | 4/1999 |
| WO | WO-0034182 A1 | 6/2000 |
| WO | WO-2008018928 A2 | 2/2008 |
| WO | WO-2008148055 A1 | 12/2008 |
| WO | WO-2009006295 A2 | 1/2009 |
| WO | WO-2008018928 A3 | 3/2009 |
| WO | WO-2009086460 A1 | 7/2009 |
| WO | WO-2009006295 A3 | 12/2009 |
| WO | WO-2009146436 A1 | 12/2009 |
| WO | WO-2009155378 A1 | 12/2009 |
| WO | WO-2010006242 A1 | 1/2010 |
| WO | WO-2010008896 A1 | 1/2010 |
| WO | WO-2010009273 A1 | 1/2010 |
| WO | WO-2010030826 A1 | 3/2010 |
| WO | WO-2010039903 A1 | 4/2010 |
| WO | WO-2010039909 A1 | 4/2010 |
| WO | WO-2010048457 A1 | 4/2010 |
| WO | WO-2010051458 A1 | 5/2010 |
| WO | WO-2010055152 A1 | 5/2010 |
| WO | WO-2010068924 A1 | 6/2010 |
| WO | WO-2010074686 A1 | 7/2010 |
| WO | WO-2010074687 A1 | 7/2010 |
| WO | WO-2010087823 A1 | 8/2010 |
| WO | WO-2010091029 A1 | 8/2010 |
| WO | WO-2010093713 A1 | 8/2010 |
| WO | WO-2010093716 A1 | 8/2010 |
| WO | WO-2010101953 A1 | 9/2010 |
| WO | WO-2010104989 A1 | 9/2010 |
| WO | WO-2010132863 A1 | 11/2010 |
| WO | WO-2010136744 A1 | 12/2010 |
| WO | WO-2011008223 A1 | 1/2011 |
| WO | WO-2011017609 A1 | 2/2011 |
| WO | WO-2011038076 A1 | 3/2011 |
| WO | WO-2011038936 A1 | 4/2011 |
| WO | WO-2011049996 A1 | 4/2011 |
| WO | WO-2011066293 A1 | 6/2011 |
| WO | WO-2011075680 A1 | 6/2011 |
| WO | WO-2011081681 A1 | 7/2011 |
| WO | WO-2011097468 A2 | 8/2011 |
| WO | WO-2011102868 A1 | 8/2011 |
| WO | WO-2011121065 A1 | 10/2011 |
| WO | WO-2021016200 A1 | 1/2021 |
| WO | WO-2022006230 A1 | 1/2022 |

OTHER PUBLICATIONS

U.S. Appl. No. 16/933,490 Office Action dated Apr. 27, 2022.

U.S. Appl. No. 17/363,537 Notice of Allowance dated Apr. 29, 2022.

U.S. Appl. No. 17/363,537 Office Action dated Apr. 11, 2022.

Co-pending U.S. Appl. No. 17/184,904, inventors Weissmichael; Joseph et al., filed Feb. 25, 2021.

PCT/US2021/019585 International Search Report and Written Opinion dated May 6, 2021.

PCT/US2021/019597 International Search Report and Written Opinion dated May 6, 2021.

Wikipedia 'Enthalpy change of solution' Dec. 9, 2019 (Dec. 9, 2019) retrieved from 42https://en.wikipedia.org/w/index.php?title=Enthalpy_change_of_solution&oldid=929951731 entirety of document especially p. 2 para 3; p. 3 Table 2.

Wikipedia 'Calcination' Nov. 18, 2018 (Nov. 18, 2018) retrieved from https://en.wikipedia.org/w/index.php?title=Calcination&oldid=869437260 entirety of document especially p. 1 para 2.

Wikipedia 'Lime kiln' Nov. 27, 2019 (Nov. 27, 2019) retrieved from https://en.wikipedia.org/w/index.php?tille=Lime_kiln&oldid=928184598#Rotary_kilns entirety of document especially p. 8 para 1.

Andersson, et al. High power diode laser cladding. Fabricating and Metalworking. Mar. 2014; 24-26.

Bensted. Developments with oilwell cements. In Structure and Performance of Cements. 2nd ed. Bensted and Barnes. 2002; 237-525.

Cardoso, et al. Carbide lime and industrial hydrated lime characterization. Powder Technology. 2009; 195:143-149.

Chen, et al. Calcium carbonate phase transformations during the carbonation reaction of calcium heavy alkylbenzene sulfonate overbased nanodetergents preparation. Journal of Colloid and Interface Science. 2011; 359:56-67.

Constantz, B. "The Risk of Implementing New Regulations on Game-Changing Technology: Sequestering CO2 in the Built Environment" AGU, Sep. 2009; 90(22), Jt. Assem, Suppl., Abstract.

Eloneva, et al. Preliminary assessment of a method utilizing carbon dioxide and steelmaking slags to produce precipitated calcium carbonate. Applied Energy. 2012; 90:329-334.

Eloneva, et al. Reduction of CO2 Emissions from Steel Plants by Using Steelmaking Slags for Production of Marketable Calcium Carbonate. Steel Research Int. 2009; 80(6):415-421.

European search report and opinion dated Jul. 29, 2015 for EP Application No. 13769503.

Han, et al. Effect of flow rate and CO2 content on the phase and morphology of CaCO3 prepared by bubbling method. Journal of Crystal Growth. 2005; 276:541-548.

Han, et al. -Influence of initial CaCl2 concentration on the phase and morphology of CaCO3 prepared by carbonation. J. Mater. Sci. 2006; 41:4663-4667.

Hargis, et al., Calcium carbonate cement: A carbon capture, utilization, and storage (CCUS) technique. Materials 2021; 14(2709) 1-12 Pages.

(56) References Cited

OTHER PUBLICATIONS

Huan, et al. Study on pretreatment on the preparation of nanosized calcium carbonate with calcium carbide residue. Nanoscience and Nanotechnology. 2011; 8(1):70-73. (in Chinese with English abstract).
International search report and written opinion dated Jun. 3, 2013 for PCT/US2013/031670.
International search report and written opinion dated Jul. 9, 2015 for PCT/US2015/027272.
Kantiranis. Hydration of high-calcium quicklime with methanol-water mixtures. Construction and Building Materials. 2003; 17:91-96.
Kuntze. Gypsum: connecting science and technology. ASTM International. ASTM stock No. MNL67. Ch 7. 2009.
Matilla, et al. Production of precipitated calcium carbonate from steel converter slag and other calcium-containing industrial wastes and residues. Advances in inorganic chemistry. 2014; vol. 66, Ch. 10. 347-384.
Matilla, et al. Reduced Limestone Consumption in Steel Manufacturing Using a pseudo-catalytic calcium lixiviant. Energy Fuels. 2014; 28:4068-4074.
Mattila, et al. Chemical kinetics modeling and process parameter sensitivity for precipitated calcium carbonate production from steelmaking slags. Chemical Engineering Journal. 2012; 192:77-89.
Nippon Slag Association. "Chemical characteristics of iron and steel slag." [online] Oct. 28, 2011. Retrieved from the internet <http://www.slg.jp/e/slag/character.html>.
Notice of allowance dated Nov. 16, 2017 for U.S. Appl. No. 14/694,348.
Office action dated Jan. 29, 2016 for U.S. Appl. No. 13/804,439.
Office action dated May 29, 2015 for U.S. Appl. No. 13/804,439.
Office action dated Aug. 29, 2017 for U.S. Appl. No. 14/694,348.
Office action dated Sep. 29, 2015 for U.S. Appl. No. 13/804,439.
Office action dated Oct. 11, 2017 for U.S. Appl. No. 14/694,348.
Ostwald, W. Zeitschrift für Physikalische Chemie, Feb. 1897: 289-330.
PCT/US2020/042810 International Search Report and Written Opinion dated Oct. 27, 2020.
PCT/US2021/039825 International Search Report and Written Opinion dated Oct. 7, 2021.
Sarkar, et al. Synthesis of All Crystalline Phases of Anhydrous Calcium Carbonate. Crystal Growth and Design. May 5, 2010; 10(5):2129-2135.
Sun, et al. Indirect CO2 mineral sequestration by steelmaking slag with NH4Cl as leaching solution. Chemical Engineering Journal. 2011; 173:437-445.
Sunagawa, et al. Strontium and aragonite-calcite precipitation. Journal of Mineralogical and Petrological Sciences. Jan. 1, 2007; 102(3):174-181.
U.S. Appl. No. 17/363,537 Office Action dated Feb. 25, 2022.
U.S. Appl. No. 17/363,537 Office Action dated Mar. 24, 2022.
Vucak, et al. A study of carbon dioxide absorption into aqueous monoethanolamine solution containing calcium nitrate in the gas-liquid reactive precipitation of calium carbonate. Chemical Engineering Journal. 2002; 87:171-179.
Yamaguchi, et al. Formation of vaterite from Calcium Methoxide with aqueous sodium carbonate solution. Bulletin of the Chemical Society of Japan. 1979; 52(4):1217-1218.
Zhang, et al. Preparation of CaCO3 superfine powder by calcium carbide residue. Energy Procedia. 2012; 17:1635-1640.
Zhao, et al. Post-combustion CO2 capture by aqueous ammonia: A state-of-the-art review. International Journal of Greenhouse gas control. 2012; 9:355-371.
Co-pending U.S. Appl. No. 17/829,687, inventors Gilliam; Ryan et al., filed Jun. 1, 2022.

\* cited by examiner

METHODS AND SYSTEMS FOR TREATMENT OF LIME TO FORM VATERITE

CROSS-REFERENCE TO RELATED APPLICATIONS

This application claims benefit of U.S. Provisional Application No. 62/981,266, filed Feb. 25, 2020, which is incorporated herein by reference in its entirety in the present disclosure.

BACKGROUND

Carbon dioxide ($CO_2$) emissions have been identified as a major contributor to the phenomenon of global warming. $CO_2$ is a by-product of combustion and it creates operational, economic, and environmental problems. It may be expected that elevated atmospheric concentrations of $CO_2$ and other greenhouse gases can facilitate greater storage of heat within the atmosphere leading to enhanced surface temperatures and rapid climate change. In addition, elevated levels of $CO_2$ in the atmosphere may also further acidify the world's oceans due to the dissolution of $CO_2$ and formation of carbonic acid. The impact of climate change and ocean acidification may likely be economically expensive and environmentally hazardous if not timely handled. Reducing potential risks of climate change requires sequestration and avoidance of $CO_2$ from various anthropogenic processes.

SUMMARY

In one aspect, there are provided methods to form calcium carbonate comprising vaterite, comprising:
(i) calcining limestone to form lime and a gaseous stream comprising carbon dioxide;
(ii) dissolving the lime in an aqueous N-containing inorganic salt solution under one or more dissolution conditions to produce a first aqueous solution comprising calcium salt, and a gaseous stream comprising ammonia;
(iii) recovering the gaseous stream comprising carbon dioxide and the gaseous stream comprising ammonia and subjecting the gaseous streams to a cooling process under one or more cooling conditions to condense a second aqueous solution comprising ammonium bicarbonate, ammonium carbonate, ammonia, or combinations thereof; and
(iv) treating the first aqueous solution comprising calcium salt with the second aqueous solution comprising ammonium bicarbonate, ammonium carbonate, ammonia, or combinations thereof under one or more precipitation conditions to form a precipitation material comprising calcium carbonate and a supernatant solution, wherein the calcium carbonate comprises vaterite.

In some embodiments of the foregoing aspect, the calcination is carried out in shaft kiln, rotary kiln, or electric kiln.

In some embodiments of the foregoing aspect and embodiments, the lime is underburnt lime, soft burnt lime, dead burnt lime, or combinations thereof.

In some embodiments of the foregoing aspect and embodiments, the N-containing inorganic salt is selected from the group consisting of ammonium halide, ammonium sulfate, ammonium sulfite, ammonium nitrate, ammonium nitrite, and combinations thereof. In some embodiments of the foregoing aspect and embodiments, the ammonium halide is ammonium chloride.

In some embodiments of the foregoing aspect and embodiments, the first aqueous solution further comprises ammonia and/or N-containing inorganic salt.

In some embodiments of the foregoing aspect and embodiments, molar ratio of the N-containing inorganic salt:lime is between about 0.5:1-2:1.

In some embodiments of the foregoing aspect and embodiments, the one or more dissolution conditions are selected from the group consisting of temperature between about 30-200° C.; pressure between about 0.1-10 atm; N-containing salt wt % in water between about 0.5-50%; and combinations thereof.

In some embodiments of the foregoing aspect and embodiments, no external source of carbon dioxide and/or ammonia is used and the process is a closed loop process.

In some embodiments of the foregoing aspect and embodiments, the gaseous stream comprising ammonia further comprises water vapor.

In some embodiments of the foregoing aspect and embodiments, the gaseous stream further comprises between about 20-90% water vapor.

In some embodiments of the foregoing aspect and embodiments, no external water is added to the cooling process.

In some embodiments of the foregoing aspect and embodiments, the one or more cooling conditions comprise temperature between about 0-100° C.; pressure between about 0.5-50 atm; pH of the aqueous solution between about 8-12; flow rate of the $CO_2$; ratio of $CO_2$:$NH_3$ between about 0.1:1-20:1; or combinations thereof.

In some embodiments of the foregoing aspect and embodiments, the second aqueous solution further comprises ammonium carbamate.

In some embodiments of the foregoing aspect and embodiments, the second aqueous solution is formed by the condensation of the gases.

In some embodiments of the foregoing aspect and embodiments, the one or more precipitation conditions are selected from the group consisting of pH of the first aqueous solution of between 7-9, temperature of the solution between 20-60° C., residence time of between 5-60 minutes, or combinations thereof.

In some embodiments of the foregoing aspect and embodiments, the first aqueous solution further comprises solids.

In some embodiments of the foregoing aspect and embodiments, the method further comprises separating the solids from the first aqueous solution before the treatment step by filtration and/or centrifugation.

In some embodiments of the foregoing aspect and embodiments, the separated solids are added to the precipitation material as filler.

In some embodiments of the foregoing aspect and embodiments, the separated solids further comprise residual ammonium halide when the N-containing inorganic salt is the ammonium halide.

In some embodiments of the foregoing aspect and embodiments, the method further comprises recovering the residual ammonium halide from the solids using a recovery process selected from the group consisting of rinsing, thermal decomposition, pH adjustment, and combinations thereof.

In some embodiments of the foregoing aspect and embodiments, the solids are not separated from the first aqueous solution and the first aqueous solution is subjected to the treatment step to produce the precipitation material further comprising the solids. In some embodiments of the foregoing aspect and embodiments, the solids comprise silicates, iron oxides, alumina, or combinations thereof. In some embodiments of the foregoing aspect and embodiments, the solids are between 1-40 wt % in the aqueous solution, in the precipitation material, or combinations thereof.

In some embodiments of the foregoing aspect and embodiments, the method further comprises dewatering the precipitation material to separate the precipitation material from the supernatant solution.

In some embodiments of the foregoing aspect and embodiments, the precipitation material and the supernatant solution comprise residual N-containing inorganic salt.

In some embodiments of the foregoing aspect and embodiments, the residual N-containing inorganic salt comprises ammonium halide, ammonium sulfate, ammonium sulfite, ammonium hydrosulfide, ammonium thiosulfate, ammonium nitrate, ammonium nitrite, or combinations thereof.

In some embodiments of the foregoing aspect and embodiments, the method further comprises removing and optionally recovering ammonia and/or N-containing inorganic salt from the residual N-containing inorganic salt comprising removing and optionally recovering the residual N-containing inorganic salt from the supernatant aqueous solution and/or removing and optionally recovering the residual N-containing inorganic salt from the precipitation material.

In some embodiments of the foregoing aspect and embodiments, the method further comprises recovering the residual N-containing inorganic salt from the supernatant aqueous solution using recovery process selected from the group consisting of thermal decomposition, pH adjustment, reverse osmosis, multi-stage flash, multi-effect distillation, vapor recompression, distillation, and combinations thereof.

In some embodiments of the foregoing aspect and embodiments, the step of removing and optionally recovering the residual N-containing inorganic salt from the precipitation material comprises heating the precipitation material between about 300-360° C. to evaporate the N-containing inorganic salt from the precipitation material with optional recovery by condensation of the N-containing inorganic salt.

In some embodiments of the foregoing aspect and embodiments, the N-containing inorganic salt is ammonium chloride which evaporates from the precipitation material in a form comprising ammonia gas, hydrogen chloride gas, chlorine gas, or combinations thereof.

In some embodiments of the foregoing aspect and embodiments, the method further comprises recycling the recovered residual ammonia and/or N-containing inorganic salt back to the dissolving and/or treating step of the process.

In some embodiments of the foregoing aspect and embodiments, the vaterite is stable vaterite or reactive vaterite.

In some embodiments of the foregoing aspect and embodiments, the method further comprises adding water to the precipitation material comprising reactive vaterite and transforming the vaterite to aragonite wherein the aragonite sets and hardens to form cement or cementitious product.

In some embodiments of the foregoing aspect and embodiments, the cementitious product is a formed building material selected from masonry unit, construction panel, conduit, basin, beam, column, slab, acoustic barrier, insulation material, and combinations thereof.

In some embodiments of the foregoing aspect and embodiments, the method further comprises adding water to the precipitation material comprising reactive vaterite and transforming the vaterite to aragonite wherein the aragonite sets and hardens to form non-cementitious product.

In one aspect, there is provided a product formed by the method according to the aforementioned aspect and the embodiments.

In one aspect, there is provided a system to form calcium carbonate comprising vaterite, comprising:

(i) a calcining reactor configured to calcine limestone to form lime and a gaseous stream comprising carbon dioxide;

(ii) a dissolution reactor configured for dissolving the lime in an aqueous N-containing inorganic salt solution under one or more dissolution conditions to produce a first aqueous solution comprising calcium salt, and a gaseous stream comprising ammonia;

(iii) a cooling reactor configured for recovering the gaseous stream comprising carbon dioxide and the gaseous stream comprising ammonia and subjecting the gaseous streams to a cooling process under one or more cooling conditions to condense a second aqueous solution comprising ammonium bicarbonate, ammonium carbonate, ammonia, or combinations thereof; and (iv) a treatment reactor configured for treating the first aqueous solution comprising calcium salt with the second aqueous solution comprising ammonium bicarbonate, ammonium carbonate, ammonia, or combinations thereof under one or more precipitation conditions to form a precipitation material comprising calcium carbonate and a supernatant solution, wherein the calcium carbonate comprises vaterite.

In some embodiments of the foregoing aspect, the dissolution reactor is integrated with the cooling reactor.

DRAWINGS

The features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

DESCRIPTION

Figure 1:
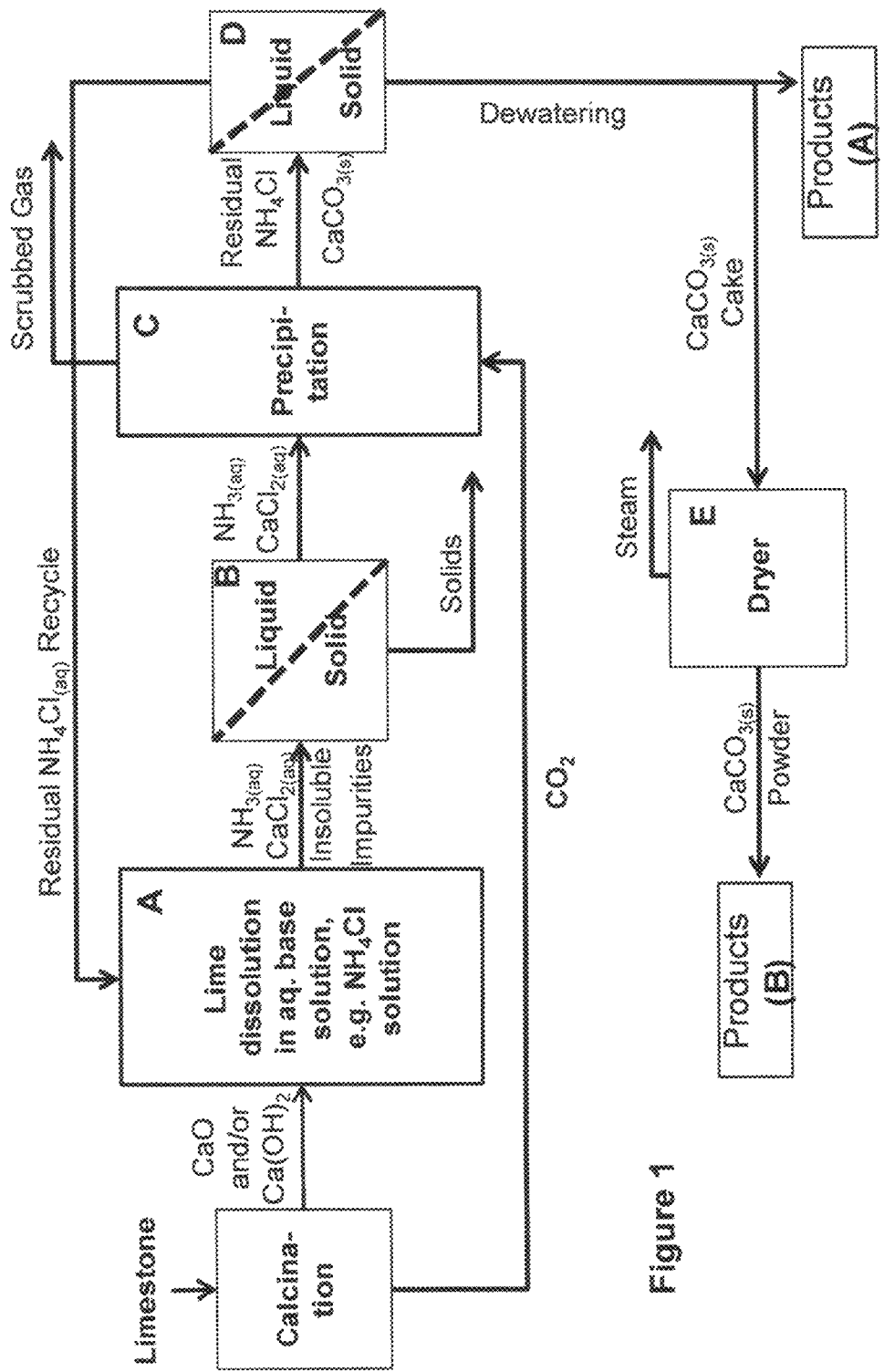
FIG. 1 illustrates some embodiments of the methods and systems provided herein.

Provided herein are unique methods and systems that use the lime to form the vaterite polymorph of calcium carbonate which can be used to form various products as described herein. The lime is obtained from the calcination of the limestone. Applicants have devised unique methods and systems to use the lime to form valuable cementitious products. In some embodiments of the methods and systems provided herein, the lime is treated directly with an aqueous base solution, such as for example only, ammonium salt e.g. aqueous ammonium chloride solution, to solubilize or dissolve calcium of the lime in an aqueous solution. The dissolved calcium in the form of calcium salt is then treated with the carbon dioxide gas (evolved during the calcination of the limestone) to form precipitate or precipitation material comprising calcium carbonate which is partially or fully in vaterite polymorphic form.

In some embodiments, the calcium carbonate is formed in vaterite polymorphic form or in some embodiments the calcium carbonate is precipitated calcium carbonate (PCC). The PCC can be in the form of vaterite, aragonite, calcite, or combinations thereof. In some embodiments, the vaterite formed by the methods and systems herein, is in stable vaterite form or is in a reactive vaterite form, both of which have been described herein. In some embodiments, the precipitation material comprising reactive vaterite possesses unique properties, including, but not limited to, cementing properties by transforming to aragonite which sets and cements with high compressive strength. In some embodiments, the vaterite transformation to aragonite results in cement that can be used to form building materials and/or cementitious products such as, but not limited to, formed building materials such as construction panel etc. further described herein. In some embodiments, the vaterite in the product is stable (does not transform to aragonite) and may be used as a filler or supplementary cementitious material (SCM) when mixed with other cement such as Ordinary Portland Cement (OPC). The precipitation material comprising vaterite may also be used as an aggregate where the reactive vaterite containing precipitation material after contact with water transforms to aragonite, which sets and cements and which is then chopped up after cementation to form the aggregate. In some embodiments, where the calcium carbonate is formed as PCC, the PCC material is cementitious or may be used as a filler in products such as paper product, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof. Such use of calcium carbonate precipitation material as a filler in non-cementitious products has been described in U.S. Pat. No. 7,829,053, issued Nov. 9, 2010, which is incorporated herein by reference in its entirety.

The base, such as but not limited to, N-containing inorganic salt or the N-containing organic salt, for example only, an ammonium salt, used to solubilize the calcium ions from the lime, may result in residual N-containing inorganic salt or N-containing organic salt remaining in the supernatant solution as well as in the precipitate itself after the formation of the precipitate. In some embodiments, the presence of the N-containing inorganic salt or the N-containing organic salt in the precipitate may not be desirable as the N-containing inorganic salt or the N-containing organic salt content such as but not limited to, ammonium chloride, ammonium sulfate, ammonium sulfite, ammonium hydrosulfide, ammonium thiosulfate, ammonium nitrate, ammonium nitrite, or combinations thereof content, in the precipitate may be detrimental to the cementitious products thus formed from the precipitation material. For example, chloride in the cementitious product may be corrosive to metal structures that are used along with the cementitious products. Further, the residual ammonia may add to the foul smell in the products. Furthermore, the non-recovered and wasted residual N-containing inorganic salt or N-containing organic salt in the precipitate as well as the supernatant solution may be economically as well as environmentally not feasible. Various methods have been provided herein to remove and optionally recover the N-containing inorganic salt or the N-containing organic salt from the supernatant solution as well as the precipitate.

Before the invention is described in greater detail, it is to be understood that this invention is not limited to particular embodiments described, as such may, of course, vary. It is also to be understood that the terminology used herein is for the purpose of describing particular embodiments only, and is not intended to be limiting.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrequited number may be a number, which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the invention, representative illustrative methods and materials are described herein.

All publications, patents, and patent applications cited in this specification are incorporated herein by reference to the same extent as if each individual publication, patent, or patent application were specifically and individually indicated to be incorporated by reference. Furthermore, each cited publication, patent, or patent application is incorporated herein by reference to disclose and describe the subject matter in connection with which the publications are cited. The citation of any publication is for its disclosure prior to the filing date and should not be construed as an admission that the invention described herein is not entitled to antedate such publication by virtue of prior invention. Further, the dates of publication provided may be different from the actual publication dates, which may need to be independently confirmed.

It is noted that, as used herein and in the appended claims, the singular forms "a", "an", and "the" include plural references unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the invention. Any recited method can be carried out in the order of events recited or in any other order, which is logically possible.

I. Methods and Systems

There are provided methods and systems to utilize the lime to form the precipitation material that has certain polymorphs of calcium carbonate, such as the vaterite, which have useful properties as a component of certain building materials. The vaterite formed in the methods and systems provided herein, can be a stable vaterite or a reactive vaterite. The reactive vaterite upon dissolution and re-precipitation with water forms aragonite which has cementitious properties. Vaterite-containing precipitate provided herein can be used to replace Ordinary Portland Cement (OPC) either entirely in applications such as but not limited to, cement fiber board or partially as a supplementary cementitious material (SCM). The "lime" as used herein relates to calcium oxide and/or calcium hydroxide. The presence and amount of the calcium oxide and/or the calcium hydroxide in the lime would vary depending on the conditions for the lime formation.

The methods and systems provided herein have several advantages, such as but not limited to, reduction of carbon dioxide emissions through the incorporation of the carbon dioxide back into the process to form the precipitate comprising calcium carbonate. Production of the vaterite containing precipitate, in the methods and systems provided herein, offers advantages including, operating expense savings through the reduction in fuel consumption, and reductions in carbon footprint.

Cement is a significant contributor to global carbon dioxide emissions with over 1.5 billion metric tons emitted per year, corresponding to about 5% of total emissions. Over 50% of the cement emissions may result from the release of carbon dioxide from the decomposition of the lime feedstock ($CaCO_3 \rightarrow CaO + CO_2$). In the methods and systems provided herein, the emissions of the $CO_2$ from the calcination of the limestone to the lime may be avoided by recapturing it back in the cementitious vaterite material. By recapturing the carbon dioxide, the vaterite product has the potential to eliminate significant amount of the cement carbon dioxide emissions and total global emissions from all sources.

Accordingly, in one aspect, there are provided methods to form calcium carbonate comprising vaterite, comprising dissolving lime in an aqueous base solution under one or more precipitation conditions to produce a precipitation material comprising calcium carbonate and a supernatant solution, wherein the calcium carbonate comprises vaterite.

In one aspect, there are provided methods to form calcium carbonate comprising vaterite, comprising (i) dissolving lime in an aqueous base solution under one or more dissolution conditions to produce a first aqueous solution comprising calcium salt; and (ii) treating the first aqueous solution comprising calcium salt with a gaseous stream comprising carbon dioxide under one or more precipitation conditions to form a precipitation material comprising calcium carbonate and a supernatant solution, wherein the calcium carbonate comprises vaterite. In some embodiments of the aforementioned aspects, the gaseous stream comprising carbon dioxide is obtained from the calcination of the limestone to form the lime.

Some aspects and embodiments of the methods and systems provided herein are as illustrated in FIGS. 1-7. It is to be understood that the steps illustrated in FIGS. 1-7 may be modified or the order of the steps may be changed or more steps may be added or deleted depending on the desired outcome. As illustrated in FIGS. 1-7, the lime is subjected to methods and systems provided herein to produce the precipitation material comprising calcium carbonate, wherein the calcium carbonate comprises vaterite.

Calcination or calcining is a thermal treatment process to bring about a thermal decomposition of the limestone. The "limestone" as used herein, means $CaCO_3$ and may further include other impurities typically present in the limestone. Limestone is a naturally occurring mineral. The chemical composition of this mineral may vary from region to region as well as between different deposits in the same region. Therefore, the lime containing the calcium oxide and/or the calcium hydroxide obtained from calcining limestone from each natural deposit may be different. Typically limestone may be composed of calcium carbonate ($CaCO_3$), magnesium carbonate ($MgCO_3$), silica ($SiO_2$), alumina ($Al_2O_3$), iron (Fe), sulphur (S) or other trace elements.

Limestone deposits are widely distributed. The limestone from the various deposits may differ in physical chemical properties and can be classified according to their chemical composition, texture and geological formation. Limestone may be classified into the following types: high calcium where the carbonate content may be composed mainly of calcium carbonate with a magnesium carbonate content not more than 5%; magnesium containing magnesium carbonate to about 5-20%; or dolomitic which may contain between 20-45% of $MgCO_3$, the balance amount is calcium carbonate. Limestones from different sources may differ considerably in chemical compositions and physical structures. It is to be understood that the methods and systems provided herein apply to all the cement plants calcining the limestone from any of the sources listed above or commercially available. The quarries include, but not limited to, quarries associated with cement kilns, quarries for lime rock for aggregate for use in concrete, quarries for lime rock for other purposes (road base), and/or quarries associated with lime kilns.

The limestone calcination is a decomposition process where the chemical reaction for decomposition of the limestone is:

$$CaCO_3 \rightarrow CaO + CO_2(g)$$

Figure 2:
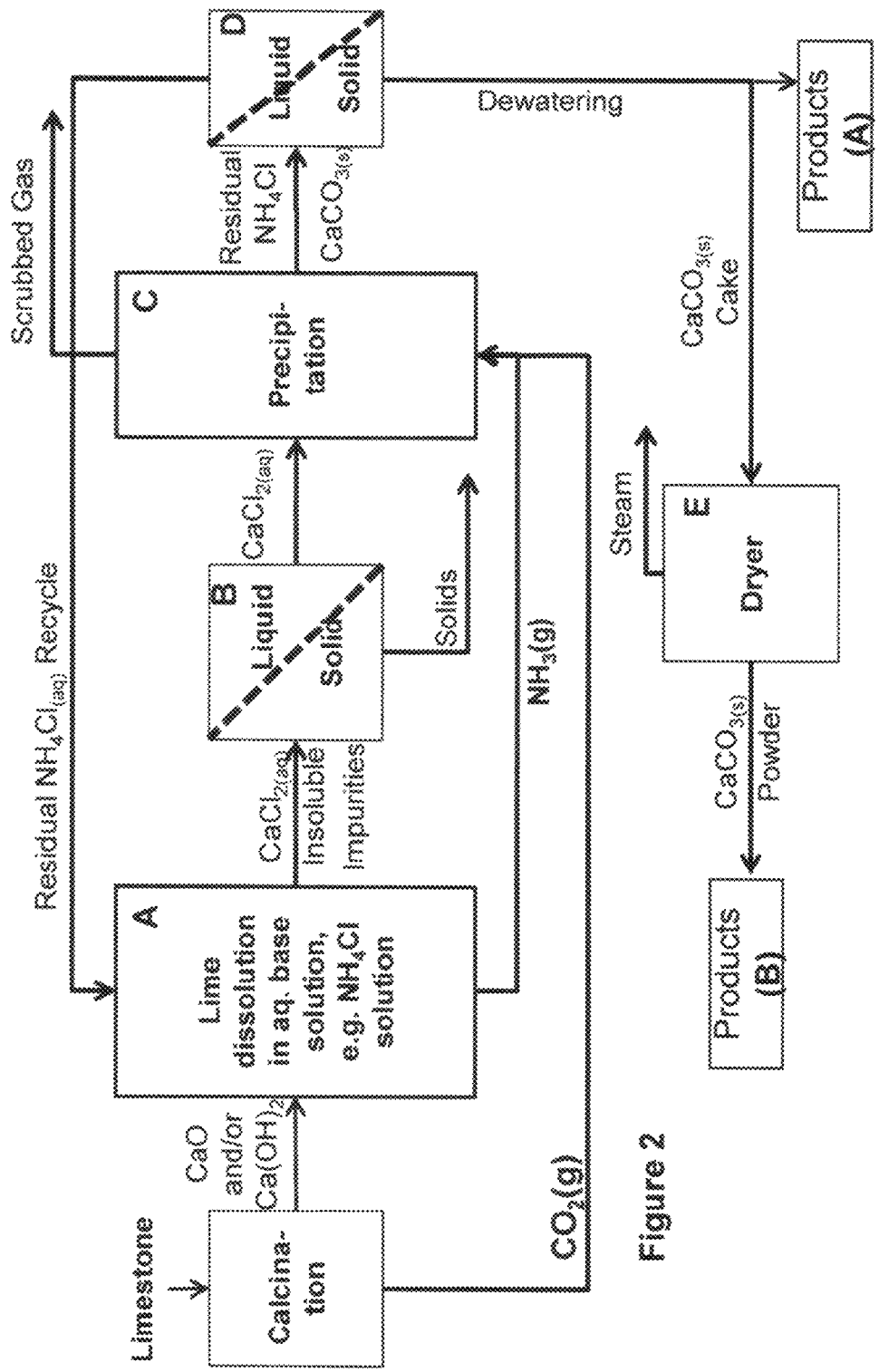
FIG. 2 illustrates some embodiments of the methods and systems provided herein.
Figure 3:
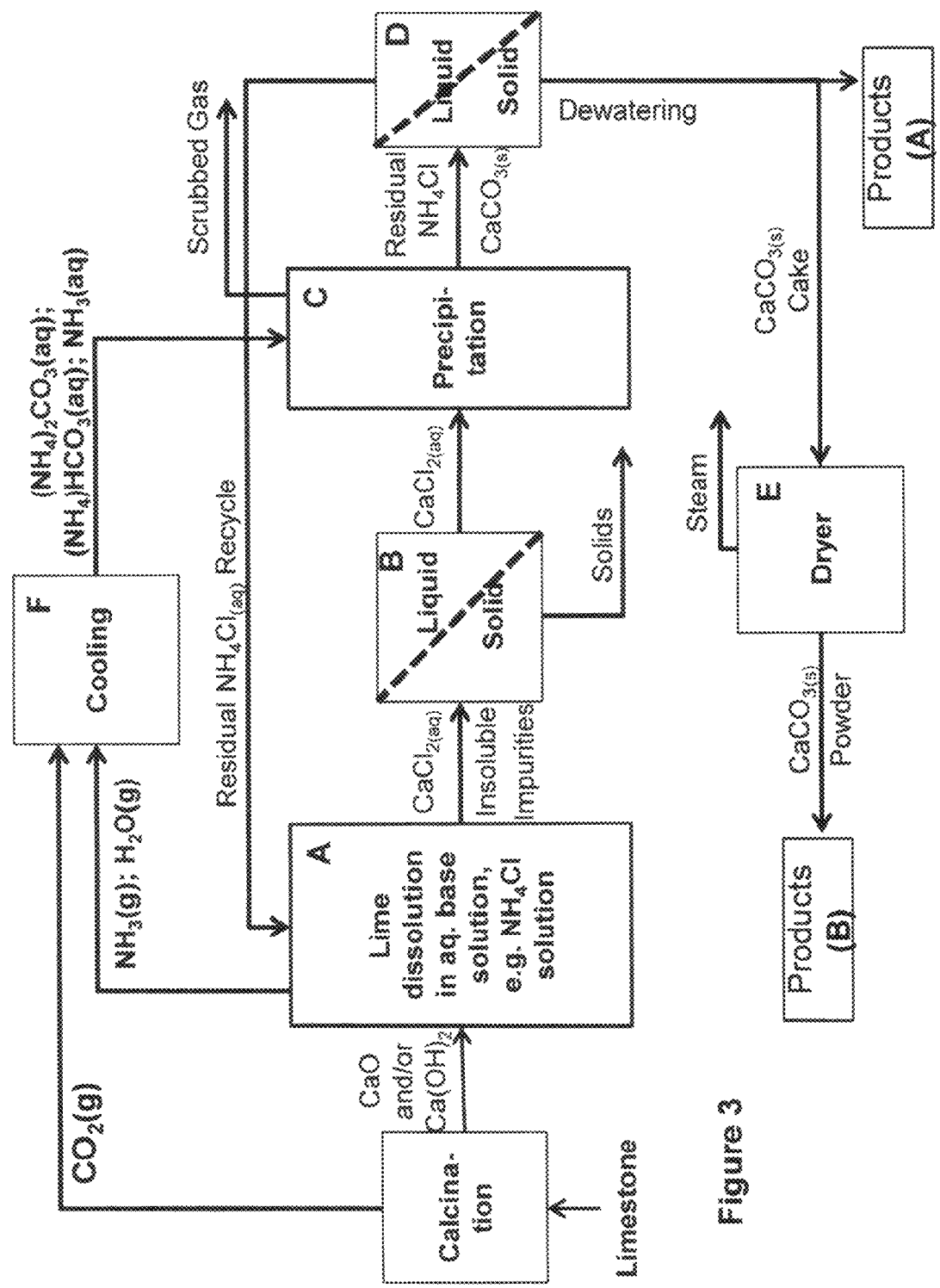
FIG. 3 illustrates some embodiments of the methods and systems provided herein.

This step is illustrated in FIGS. 1-3 as a first step of the calcination of the limestone to form the lime. The lime may be in dry form i.e. calcium oxide, and/or in wet form e.g. calcium hydroxide, depending on the conditions. The production of the lime may depend upon the type of kiln, conditions of the calcination, and the nature of the raw material i.e. limestone. At relatively low calcination temperatures, products formed in the kiln may contain both un-burnt carbonate and lime and may be called underburnt lime. As the temperature increases, soft burnt or high reactive lime may be produced. At still higher temperatures, dead burnt or low reactive lime may be produced. Soft burnt lime is produced when the reaction front reaches the core of the charged limestone and converts all carbonate present to lime. A high productive product may be relatively soft, contains small lime crystallites and has open porous structure with an easily assessable interior. Such lime may have the optimum properties of high reactivity, high surface area and low bulk density. Increasing the degree of calcination beyond this stage may make lime crystallites to grow larger, agglomerate and sinter. This may result in a decrease in surface area, porosity and reactivity and an increase in bulk density. This product may be known as dead burnt or low reactive lime. Without being limited by any theory, the methods and systems provided herein utilize any one or the combination of the aforementioned lime. Therefore, in some embodiments, the lime is dead burnt, soft burnt, underburnt, or combinations thereof.

Production of the lime by calcining the limestone may be carried out using various types of kilns, such as, but not limited to, a shaft kiln or a rotary kiln or an electric kiln. The use of the electric kiln in the calcination and the advantages associated with it, have been described in U.S. Provisional Application No. 63/046,239, filed Jun. 30, 2020, which is fully incorporated herein by reference in its entirety.

These apparatuses for the calcining are suitable for calcining the limestone in the form of lumps having diameters of several to tens millimeters. Cement plant waste streams include waste streams from both wet process and dry process plants, which plants may employ shaft kilns, rotary kilns, electric kilns, or combinations thereof and may include pre-calciners. These industrial plants may each burn a single fuel, or may burn two or more fuels sequentially or simultaneously.

As illustrated in FIGS. 1-3, the limestone obtained from the limestone quarry is subjected to the calcination in a cement plant resulting in the formation of the lime and $CO_2$ gas. The lime may be calcium oxide in the form of a solid from dry kilns/cement processes and/or may be a combination of calcium oxide and calcium hydroxide in the form of slurry in wet kilns/cement processes. When wet the calcium oxide (also known as a base anhydride that converts to its hydroxide form in water) may be present in its hydrated form such as but not limited to, calcium hydroxide. While calcium hydroxide (also called slaked lime) is a common hydrated form of calcium oxide, other intermediate hydrated and/or water complexes may also be present in the slurry, and are all included within the scope of the methods and systems provided herein. It is to be understood that while the lime is illustrated as CaO in some of the figures herein, it may be present as $Ca(OH)_2$ or combination of CaO and $Ca(OH)_2$.

The lime may be sparingly soluble in water. In the methods and systems provided herein, the lime solubility is increased by its treatment with solubilizers.

In the methods and systems provided herein, the lime is solvated or dissolved or solubilized with a solubilizer, such as an aqueous base solution (step A in FIGS. 1-3) under one or more dissolution conditions to produce a first aqueous solution comprising calcium salt. For illustration purposes only, the aqueous base solution, e.g. N-containing inorganic salt solution is being illustrated in the figures as ammonium chloride ($NH_4Cl$) solution and the subsequent calcium salt is bring illustrated as calcium chloride ($CaCl_2$). Various examples of the bases have been provided herein and are all within the scope of the invention.

The "base" as used herein includes any base or conjugate base of an acid. In some embodiments, the base is a solubilizing base that solubilizes or dissolves the calcium from the lime and leaves the solid impurities. The bases include without limitation, N-containing inorganic salt, N-containing organic salt, or combination thereof.

The "N-containing inorganic salt" as used herein includes any inorganic salt with nitrogen in it. Examples of N-containing inorganic salt include, but not limited to, ammonium halide (halide is any halogen), ammonium sulfate, ammonium sulfite, ammonium nitrate, ammonium nitrite, and the like. In some embodiments, the ammonium halide is ammonium chloride or ammonium bromide. In some embodiments, the ammonium halide is ammonium chloride.

The "N-containing organic salt" as used herein includes any salt of an organic compound with nitrogen in it. Examples of N-containing organic compounds include, but not limited to, aliphatic amine, alicyclic amine, heterocyclic amine, and combinations thereof.

The "aliphatic amine" as used herein includes any alkyl amine of formula $(R)_n$—$NH_{3-n}$ where n is an integer from 1-3, wherein R is independently between C1-C8 linear or branched and substituted or unsubstituted alkyl. An example of the corresponding halide salt (chloride salt, bromide salt, fluoride salt, or iodide salt) of the alkyl amine of formula $(R)_n$—$NH_{3-n}$ is $(R)_n$—$NH_{4-n}{}^+Cl^-$. In some embodiments, when R is substituted alkyl, the substituted alkyl is independently substituted with halogen, hydroxyl, acid and/or ester.

For example, when R is alkyl in $(R)_n$—$NH_{3-n}$, the alkyl amine can be a primary alkyl amine, such as for example only, methylamine, ethylamine, butylamine, pentylamine, etc.; the alkyl amine can be a secondary amine, such as for example only, dimethylamine, diethylamine, methylethylamine, etc.; and/or the alkyl amine can be a tertiary amine, such as for example only, trimethylamine, triethylamine, etc.

For example, when R is substituted alkyl substituted with hydroxyl in $(R)_n$—$NH_{3-n}$, the substituted alkyl amine is an alkanolamine including, but not limited to, monoalkanolamine, dialkanolamine, or trialkanolamine, such as e.g. monoethanolamine, diethanolamine, or triethanolamine, etc.

For example, when R is substituted alkyl substituted with halogen in $(R)_n$—$NH_{3-n}$, the substituted alkyl amine is, for example, chloromethylamine, bromomethylamine, chloroethylamine, bromoethylamine, etc.

For example, when R is substituted alkyl substituted with acid in $(R)_n$—$NH_{3-n}$, the substituted alkyl amine is, for example, amino acids. In some embodiments, the aforementioned amino acid has a polar uncharged alkyl chain, examples include without limitation, serine, threonine, asparagine, glutamine, or combinations thereof. In some embodiments, the aforementioned amino acid has a charged alkyl chain, examples include without limitation, arginine, histidine, lysine, aspartic acid, glutamic acid, or combinations thereof. In some embodiments, the aforementioned amino acid is glycine, proline, or combination thereof.

The "alicyclic amine" as used herein includes any alicyclic amine of formula $(R)_n$—$NH_{3-n}$ where n is an integer from 1-3, wherein R is independently one or more all-carbon rings which may be either saturated or unsaturated, but do not have aromatic character. Alicyclic compounds may have one or more aliphatic side chains attached. An example of the corresponding salt of the alicyclic amine of formula $(R)_n$—$NH_{3-n}$ is $(R)_n$—$NH_{4-n}{}^+Cl^-$. Examples of alicyclic amine include, without limitation, cycloalkylamine:cyclopropylamine, cyclobutylamine, cyclopentylamine, cyclohexylamine, cycloheptylamine, cyclooctylamine, and so on.

The "heterocyclic amine" as used herein includes at least one heterocyclic aromatic ring attached to at least one amine. Examples of heterocyclic rings include, without limitation, pyrrole, pyrrolidine, pyridine, pyrimidine, etc. Such chemicals are well known in the art and are commercially available.

In the methods and systems provided herein, the lime is dissolved or solubilized with the solubilizer, such as the aqueous base solution (step A in FIGS. 1-3) under one or more dissolution conditions to produce the first aqueous solution comprising calcium salt, and a gaseous stream comprising ammonia.

As illustrated in step A of FIGS. 1-3, the base is exemplified as ammonium chloride ($NH_4Cl$). The lime is solubilized by treatment with $NH_4Cl$ (new and recycled as further explained below) when the reaction that may occur is:

$$CaO + 2NH_4Cl(aq) \rightarrow CaCl_2(aq) + 2NH_3 + H_2O$$

$$Ca(OH)_2 + 2NH_4Cl(aq) \rightarrow 2NH_3 + CaCl_2 + 2H_2O$$

Similarly, when the base is N-containing organic salt, the reaction may be shown as below:

$$CaO + 2NH_3RCl \rightarrow CaCl_2(aq) + 2NH_2R + H_2O$$

In some embodiments, the base or the N-containing inorganic salt such as, but not limited to, an ammonium salt, e.g. ammonium chloride solution may be supplemented with anhydrous ammonia or an aqueous solution of ammonia to maintain an optimum level of ammonium chloride in the solution.

In some embodiments, the first aqueous solution comprising calcium salt obtained after dissolution of the lime may contain sulfur depending on the source of the lime. The sulfur may get introduced into the first aqueous solution after the solubilization of the lime with any of the bases described herein. In an alkaline solution, various sulfur compounds containing various sulfur ionic species may be present in the solution including, but not limited to, sulfite ($SO_3^{2-}$), sulfate ($SO_4^{2-}$), hydrosulfide ($HS^-$), thiosulfate ($S_2O_3^{2-}$), polysulfides ($S_n^{2-}$), thiol (RSH), and the like. The "sulfur compound" as used herein, includes any sulfur ion containing compound.

In some embodiments, the first aqueous solution further comprises the base, such as, ammonia and/or N-containing inorganic or N-containing organic salt.

In some embodiments, the amount of the base such as, the N-containing inorganic salt, the N-containing organic salt, or combinations thereof, is in more than 20% excess or more than 30% excess to the lime. In some embodiments, the molar ratio of the base:lime (or N-containing inorganic salt:lime or N-containing organic salt:lime or ammonium chloride:lime) is between 0.5:1-2:1; or 0.5:1-1.5:1; or 1:1-1.5:1; or 1.5:1; or 2:1; or 2.5:1; or 1:1.

In some embodiments of the methods described herein, no polyhydroxy compounds are used to form the precipitation material and/or the products provided herein.

In some embodiments of the methods and systems described herein, one or more dissolution conditions are selected from the group consisting of temperature between about 30-200° C., or between about 30-150° C., or between about 30-100° C., or between about 30-75° C., or between about 30-50° C., or between about 40-200° C., or between about 40-150° C., or between about 40-100° C., or between about 40-75° C., or between about 40-50° C., or between about 50-200° C., or between about 50-150° C., or between about 50-100° C.; pressure between about 0.1-50 atm, or between about 0.1-40 atm, or between about 0.1-30 atm, or between about 0.1-20 atm, or between about 0.1-10 atm, or between about 0.5-20 atm; N-containing inorganic or organic salt wt % in water between about 0.5-50%, or between about 0.5-25%, or between about 0.5-10%, or between about 3-30%, or between about 5-20%; or combinations thereof.

Agitation may be used to affect dissolution of the lime with the aqueous base solution in the dissolution reactor, for example, by eliminating hot and cold spots. In some embodiments, the concentration of the lime in water may be between 1 and 10 g/L, 10 and 20 g/L, 20 and 30 g/L, 30 and 40 g/L, 40 and 80 g/L, 80 and 160 g/L, 160 and 320 g/L, 320 and 640 g/L, or 640 and 1280 g/L. To optimize the dissolution/solvation of the lime, high shear mixing, wet milling, and/or sonication may be used to break open the lime. During or after high shear mixing and/or wet milling, the lime suspension may be treated with the base.

In some embodiments, the dissolution of the lime with the base (illustrated as e.g. ammonium chloride) results in the formation of the first aqueous solution comprising calcium salt and solids. In some embodiments, the solid insoluble impurities may be removed from the first aqueous solution of the calcium salt (step B in FIGS. 1-3) before the aqueous solution is treated with the carbon dioxide in the process. The solids may optionally be removed from the aqueous solution by filtration and/or centrifugation techniques.

It is to be understood that the step B in FIGS. 1-3 is optional and in some embodiments, the solids may not be removed from the aqueous solution (not shown in FIGS. 1-3) and the aqueous solution containing calcium salts as well as the solids are contacted with the carbon dioxide (in step C in FIGS. 1-3) to form the precipitates. In such embodiments, the precipitation material further comprises solids.

In some embodiments, the solids obtained from the dissolution of the lime (shown as insoluble impurities in FIGS. 1-3) are calcium depleted solids and may be used as a cement substitute (such as a substitute for Portland cement). In some embodiments, the solids comprise silicates, iron oxides, alumina, or combinations thereof. The silicates include, without limitation, clay (phyllosilicate), aluminosilicate, etc.

In some embodiments, the solids are between 1-40 wt %; or between 1-30 wt %; or between 1-20 wt %; or between 1-10 wt % or between 1-5 wt %; or between 1-2 wt %, in the aqueous solution, in the precipitation material, or combinations thereof.

As illustrated in step C in FIG. 1, the first aqueous solution comprising calcium salt (and optionally solids) and dissolved ammonia and/or ammonium salt is contacted under one or more precipitation conditions with the gaseous stream comprising carbon dioxide recycled from the calcination step of the respective process, to form a precipitation material comprising calcium carbonate and a supernatant solution, wherein the calcium carbonate comprises vaterite, shown in the reaction below:

$$CaCl_2(aq) + 2NH_3(aq) + CO_2(g) + H_2O \rightarrow CaCO_3(s) + 2NH_4Cl(aq)$$

The absorption of the $CO_2$ into the first aqueous solution produces $CO_2$-charged water containing carbonic acid, a species in equilibrium with both bicarbonate and carbonate. The precipitation material is prepared under one or more precipitation conditions (as described herein) suitable to form vaterite containing or PCC material.

In one aspect, there are provided methods to form calcium carbonate comprising vaterite, comprising (i) calcining limestone to form lime and a gaseous stream comprising carbon dioxide; (ii) dissolving the lime in an aqueous base solution under one or more dissolution conditions to produce a first aqueous solution comprising calcium salt, and a gaseous stream comprising ammonia; and (iii) treating the first aqueous solution comprising calcium salt with the gaseous stream comprising carbon dioxide and the gaseous stream comprising ammonia under one or more precipitation conditions to form a precipitation material comprising calcium carbonate and a supernatant solution, wherein the calcium carbonate comprises vaterite. This aspect is illustrated in FIG. 2, wherein the gaseous stream comprising $CO_2$ from the calcination step and the gaseous stream comprising $NH_3$ from step A of the process is recirculated to the precipitation reactor (step C) for the formation of the precipitation material. Remaining steps of FIG. 2 are identical to the steps of FIG. 1. It is to be understood that the processes of both FIG. 1 and FIG. 2 can also take place simultaneously such that the base, such as the N-containing inorganic salt or the N-containing organic salt and optionally ammonia may be partially present in the first aqueous solution and partially present in the gaseous stream.

The reaction taking place in the aforementioned aspect may be shown as below:

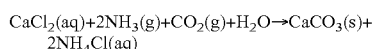

$CaCl_2(aq)+2NH_3(g)+CO_2(g)+H_2O \rightarrow CaCO_3(s)+2NH_4Cl(aq)$

In some embodiments of the aspects and embodiments provided herein, the gaseous stream comprising ammonia may have ammonia from an external source and/or is recovered and recirculated from step A of the process.

In some embodiments of the aspects and embodiments provided herein, wherein the gaseous stream comprises ammonia and/or the gaseous stream comprises carbon dioxide, no external source of carbon dioxide and/or ammonia is used and the process is a closed loop process. Such closed loop process is being illustrated in the figures described herein.

In some embodiments, the dissolution of the lime with some of the N-containing organic salt may not result in the formation of ammonia gas or the amount of ammonia gas formed may not be substantial. In embodiments where the ammonia gas is not formed or is not formed in substantial amounts, the methods and systems illustrated in FIG. 1 where the first aqueous solution comprising calcium salt is treated with the carbon dioxide gas, are applicable. In such embodiments, the organic amine salt may remain in the aqueous solution in fully or partially dissolved state or may separate as an organic amine layer, as shown in the reaction below:

$CaO+2NH_3R^+Cl^- \rightarrow CaCl_2(aq)+2NH_2R+H_2O$

The N-containing organic salt or the N-containing organic compound remaining in the supernatant solution after the precipitation may be called residual N-containing organic salt or residual N-containing organic compound. Methods and systems have been described herein to recover the residual compounds from the precipitate as well as the supernatant solution.

In one aspect, there are provided methods to form calcium carbonate comprising vaterite, comprising (i) calcining limestone to form lime and a gaseous stream comprising carbon dioxide; (ii) dissolving the lime in an aqueous N-containing inorganic salt solution or N-containing organic salt solution under one or more dissolution conditions to produce a first aqueous solution comprising calcium salt, and a gaseous stream comprising ammonia; (iii) recovering the gaseous stream comprising carbon dioxide and the gaseous stream comprising ammonia and subjecting the gaseous streams to a cooling process under one or more cooling conditions to condense a second aqueous solution comprising ammonium bicarbonate, ammonium carbonate, ammonia, or combinations thereof; and (iv) treating the first aqueous solution comprising calcium salt with the second aqueous solution comprising ammonium bicarbonate, ammonium carbonate, ammonia, or combinations thereof under one or more precipitation conditions to form a precipitation material comprising calcium carbonate and a supernatant solution, wherein the calcium carbonate comprises vaterite. This aspect is illustrated in FIG. 3, wherein the gaseous stream comprising $CO_2$ from the calcination step and the gaseous stream comprising $NH_3$ from step A of the process is recirculated to the cooling reactor/reaction (step F) for the formation of the carbonate and bicarbonate solutions as shown in the reactions further herein below. Remaining steps of FIG. 3 are identical to the steps of FIGS. 1 and 2.

It is to be understood that the aforementioned aspect illustrated in FIG. 3 may be combined with the aspects illustrated in FIG. 1 and/or FIG. 2 such that the precipitation step C comprises treating the first aqueous solution comprising calcium salt with the second aqueous solution comprising ammonium bicarbonate, ammonium carbonate, ammonia, or combinations thereof (illustrated in FIG. 3), as well as comprises treating the first aqueous solution comprising calcium salt with the gaseous stream comprising carbon dioxide (illustrated in FIG. 1) and/or comprises treating the first aqueous solution comprising calcium salt with the gaseous stream comprising carbon dioxide and the gaseous stream comprising ammonia (illustrated in FIG. 2). In such embodiments, the gaseous stream comprising carbon dioxide is split between the stream going to the cooling process and the stream going to the precipitation process. Similarly, in such embodiments, the gaseous stream comprising ammonia is split between the stream going to the cooling process and the stream going to the precipitation process. Any combination of the processes depicted in FIGS. 1-3 is possible and all are within the scope of this disclosure.

In some embodiments of the aforementioned aspects, the second aqueous solution further comprises ammonium carbamate. Ammonium carbamate has a formula $NH_4[H_2NCO_2]$ consisting of ammonium ions $NH_4^+$, and carbamate ions $H_2NCO_2^-$. In some embodiments of the aforementioned aspect and embodiments, the second aqueous solution comprises ammonium bicarbonate, ammonium carbonate, ammonia, ammonium carbamate, or combinations thereof.

The combination of these condensed products in the second aqueous solution may be dependent on the one or more of the cooling conditions. Table 1 presented below represents various combinations of the condensed products in the second aqueous solution.

TABLE 1

| Ammonium carbonate | Ammonium bicarbonate | Ammonia | Ammonium carbamate |
|---|---|---|---|
| X | | | |
| | X | | |
| | | X | |
| | | | X |
| X | X | | |
| X | | X | |
| X | | | X |
| | X | X | |
| | X | | X |
| | | X | X |
| X | X | X | |
| X | X | | X |
| X | | X | X |
| | X | X | X |

In some embodiments of the aforementioned aspect and embodiments, the gaseous stream (e.g. the gaseous streams going to the cooling reaction/reactor (step F in FIGS. 1-3)) further comprises water vapor. In some embodiments of the aforementioned aspect and embodiments, the gaseous stream further comprises between about 20-90%; or between about 20-80%; or between about 20-70%; or between about 20-60%; or between about 20-55%; or between about 20-50%; or between about 20-40%; or between about 20-30%; or between about 20-25%; or between about 30-90%; or between about 30-80%; or between about 30-70%; or between about 30-60%; or between about 30-50%; or between about 30-40%; or between about 40-90%; or between about 40-80%; or between about 40-70%; or between about 40-60%; or between about 40-50%; or between about 50-90%; or between about 50-80%; or between about 50-70%; or between about 50-60%; or between about 60-90%; or between about 60-80%; or between about 60-70%; or between about 70-90%; or between about 70-80%; or between about 80-90%, water vapor.

In some embodiments of the aforementioned aspect and embodiments, no external water is added to the cooling process. It is to be understood that the cooling process is similar to condensation of the gases (but not similar to the absorption of the gases) in the existing water vapors such that the gases are not absorbed in the water but are as such cooled down together with the water vapors. Condensation of the gases into a liquid stream may provide process control advantages compared to absorbing the vapors. For example only, condensation of the gases into the liquid stream may allow pumping of the liquid stream into the precipitation step. Pumping of the liquid stream may be lower in cost than compression of a vapor stream into the absorption process.

Intermediate steps in the cooling reaction/reactor may include the formation of ammonium carbonate and/or ammonium bicarbonate and/or ammonium carbamate, by reactions as below:

$$2NH_3 + CO_2 + H_2O \rightarrow (NH_4)_2CO_3$$

$$NH_3 + CO_2 + H_2O \rightarrow (NH_4)HCO_3$$

$$2NH_3 + CO_2 \rightarrow (NH_4)NH_2CO_2$$

Similar reactions may be shown for the N-containing organic salt:

$$2NH_2R + CO_2 + H_2O \rightarrow (NH_3R)_2CO_3$$

$$NH_2R + CO_2 + H_2O \rightarrow (NH_3R)HCO_3$$

An advantage of cooling the ammonia in the cooling reaction/reactor is that ammonia may have a limited vapor pressure in the vapor phase of the dissolution reaction. By reacting the ammonia with $CO_2$, as shown in the reactions above, can remove some ammonia from the vapor space, allowing more ammonia to leave the dissolution solution.

The second aqueous solution comprising ammonium bicarbonate, ammonium carbonate, ammonia, (and optionally ammonium carbamate) or combinations thereof (exiting the cooling reaction/reactor in FIG. 3) is then treated with the first aqueous solution comprising calcium salt from the dissolution reaction/reactor, in the precipitation reaction/reactor (step C) to form the precipitation material comprising vaterite:

$$(NH_4)_2CO_3 + CaCl_2 \rightarrow CaCO_3(vaterite) + 2NH_4Cl$$

$$(NH_4)HCO_3 + NH_3 + CaCl_2 \rightarrow CaCO_3(vaterite) + 2NH_4Cl + H_2O$$

$$2(NH_4)HCO_3 + CaCl_2 \rightarrow CaCO_3(vaterite) + 2NH_4Cl + H_2O + CO_2$$

$$(NH_4)NH_2CO_2 + H_2O + CaCl_2 \rightarrow CaCO_3(vaterite) + 2NH_4Cl$$

Independent of any intermediate steps, the combination of the reactions lead to an overall process chemistry of:

$$CaO(lime) \rightarrow CaCO_3(vaterite)$$

In some embodiments of the aspects and embodiments provided herein, the one or more cooling conditions comprise temperature between about 0-200° C., or between about 0-150° C., or between about 0-75° C., or between about 0-100° C., or between about 0-80° C., or between about 0-60° C., or between about 0-50° C., or between about 0-40° C., or between about 0-30° C., or between about 0-20° C., or between about 0-10° C., or between about 10-100° C., or between about 10-80° C., or between about 10-60° C., or between about 10-50° C., or between about 10-40° C., or between about 10-30° C., or between about 20-100° C., or between about 20-80° C., or between about 20-60° C., or between about 20-50° C., or between about 20-40° C., or between about 20-30° C., or between about 30-100° C., or between about 30-80° C., or between about 30-60° C., or between about 30-50° C., or between about 30-40° C., or between about 40-100° C., or between about 40-80° C., or between about 40-60° C., or between about 50-100° C., or between about 50-80° C., or between about 60-100° C., or between about 60-80° C., or between about 70-100° C., or between about 70-80° C.

In some embodiments of the aspects and embodiments provided herein, the one or more cooling conditions comprise pressure between about 0.5-50 atm; or between about 0.5-25 atm; or between about 0.5-10 atm; or between about 0.1-10 atm; or between about 0.5-1.5 atm; or between about 0.3-3 atm.

In some embodiments, the formation and the quality of the reactive vaterite formed in the methods and systems provided herein, is dependent on the amount and/or the ratio of the condensed products in the second aqueous solution comprising ammonium bicarbonate, ammonium carbonate, ammonia, ammonium carbamate, or combinations thereof.

In some embodiments, the presence or absence or distribution of the condensed products in the second aqueous solution comprising ammonium bicarbonate, ammonium carbonate, ammonia, ammonium carbamate, or combinations thereof, can be optimized in order to maximize the formation of the reactive vaterite and/or to obtain a desired particle size distribution. This optimization can be based on the one or more cooling conditions, such as, pH of the aqueous solution in the cooling reactor, flow rate of the $CO_2$ and the $NH_3$ gases, and/or ratio of the $CO_2$:$NH_3$ gases. The inlets for the cooling reactor (F in FIG. 3) may be carbon dioxide ($CO_{2(g)}$), the dissolution reactor gas exhaust containing ammonia ($NH_{3(g)}$), water vapor, and optionally fresh makeup water (or some other dilute water stream). The outlet may be a slipstream of the reactor's recirculating fluid (the second aqueous solution), which is directed to the precipitation reactor for contacting with the first aqueous solution and optionally additional carbon dioxide and/or ammonia. The pH of the system may be controlled by regulating the flow rate of $CO_2$ and $NH_3$ into the cooling reactor. The conductivity of the system may be controlled by addition of dilute makeup water to the cooling reactor. Volume may be maintained constant by using a level detector in the cooling reactor or it's reservoir.

In some embodiments, higher pH of the aqueous solution in the cooling reactor (may be achieved by higher flow rate of ammonia) may favor carbamate formation whereas lower pH of the aqueous solution in the cooling reactor (may be achieved by lower flow rate of ammonia) may favor carbonate and/or bicarbonate formation. In some embodiments, the one or more cooling conditions include pH of the aqueous solution formed in the cooling reactor to be between about 8-12, or between about 8-11, or between about 8-10, or between about 8-9.

In some embodiments, the flow rate of the carbon dioxide can be modified to achieve a desired pH of the second aqueous solution exiting the cooling reactor. For example, if the pH of the second aqueous solution is high, the flow rate of the carbon dioxide can be increased to reduce the pH or if the pH of the second aqueous solution is low, the flow rate of the carbon dioxide can be reduced to increase the pH. The effect of the flow rate of the $CO_2$ on the pH of the second aqueous solution and on the ratio of the carbamate:carbonate:bicarbonate formation can be seen in Example 3 provided herein. Similarly, the effect of the ratio of $CO_2$:$NH_3$ on the pH of the second aqueous solution and on the ratio of the carbamate:carbonate:bicarbonate formation can be seen in Example 4 provided herein. In some embodiments, the one or more cooling conditions include ratio of $CO_2$:$NH_3$ in the cooling reactor to be between about 0.1:1-20:1, or between about 0.1:1-1:1, or between about 0.1:1-2:1, or between about 5:1-10:1, or between about 1:1-5:1, or between about 2:1-5:1.

Figure 4:
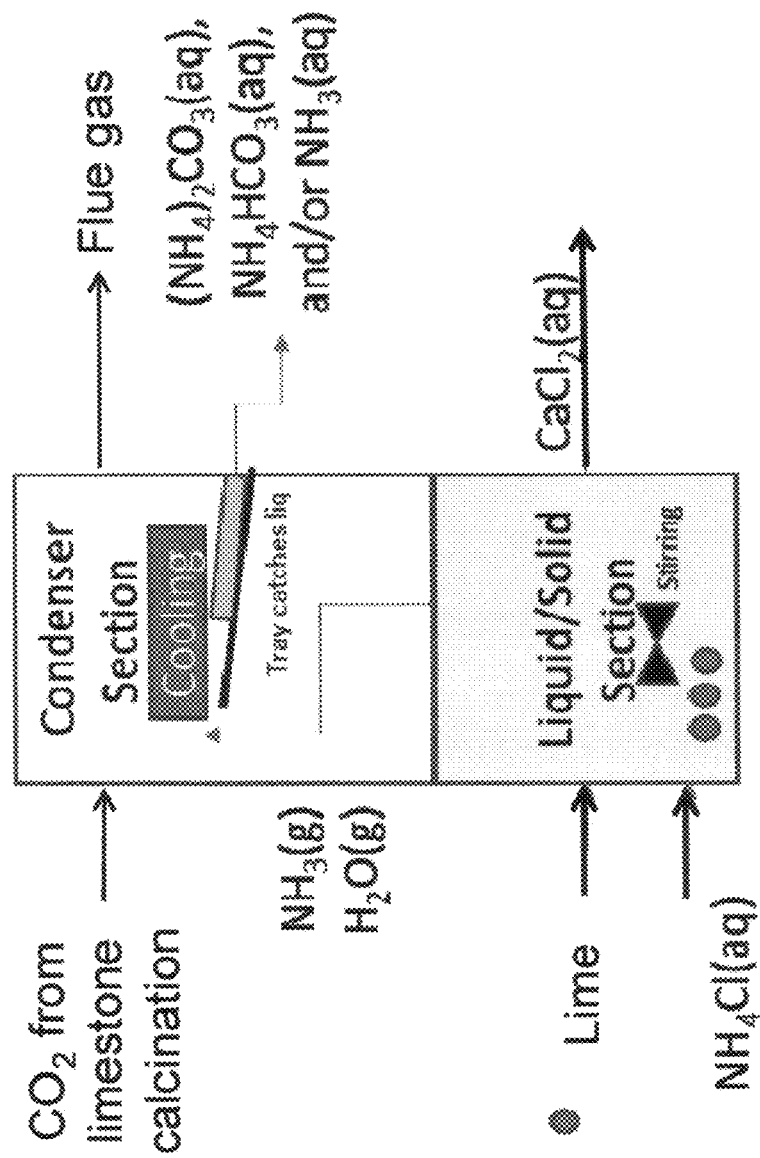
FIG. 4 illustrates some embodiments of the methods and systems comprising an integrated reactor provided herein.

It is to be understood that while FIG. 3 illustrates a separate cooling reaction/reactor, in some embodiments, the dissolution reaction/reactor may be integrated with the cooling reaction/reactor, as illustrated in FIGS. 4-7. For example, the dissolution reactor may be integrated with a condenser acting as a cooling reactor. Both the lime and the aqueous base solution (illustrated as $NH_4Cl$ in FIGS. 4-7) are fed to the dissolution reaction/reactor, when the first aqueous solution comprising calcium salt (illustrated as $CaCl_2$) is formed. The solution may optionally contain solid impurities that stay at the bottom of the dissolution reactor. The first aqueous solution comprising calcium salt (illustrated as $CaCl_2$) is withdrawn from the dissolution reaction/reactor to be processed further for precipitation. The gaseous stream comprising ammonia and water vapor passes to the upper section of the dissolution reactor (i.e. the cooling reactor; illustrated in FIGS. 4-7) where it is cooled along with the carbon dioxide to condense into the second aqueous solution. The carbon dioxide may be obtained from a plant where limestone is being calcined into the lime and the carbon dioxide. The carbon dioxide is then fed to the vapor phase of the cooling reactor. The second aqueous solution comprising ammonium bicarbonate, ammonium carbonate, ammonia, ammonium carbamate, or combinations thereof, is collected from the cooling reactor using various means, such as, e.g. one or more trays (e.g. as illustrated in FIG. 4).

In one aspect, there is provided an integrated reactor comprising:

a dissolution reactor integrated with a cooling reactor wherein the dissolution reactor is positioned below the cooling reactor;

the dissolution reactor is configured to dissolve lime in an aqueous N-containing inorganic salt solution or N-containing organic salt solution under one or more dissolution conditions to produce a first aqueous solution comprising calcium salt, and a gaseous stream comprising ammonia and water vapor; and the cooling reactor operably connected to the dissolution reactor and configured to receive and condense under one or more cooling conditions the gaseous stream comprising ammonia and water vapor from the dissolution reactor and a gaseous stream comprising carbon dioxide from calcination of limestone to the lime; and form a second aqueous solution comprising ammonium bicarbonate, ammonium carbonate, ammonia, ammonium carbamate, or combinations thereof.

Figure 5:
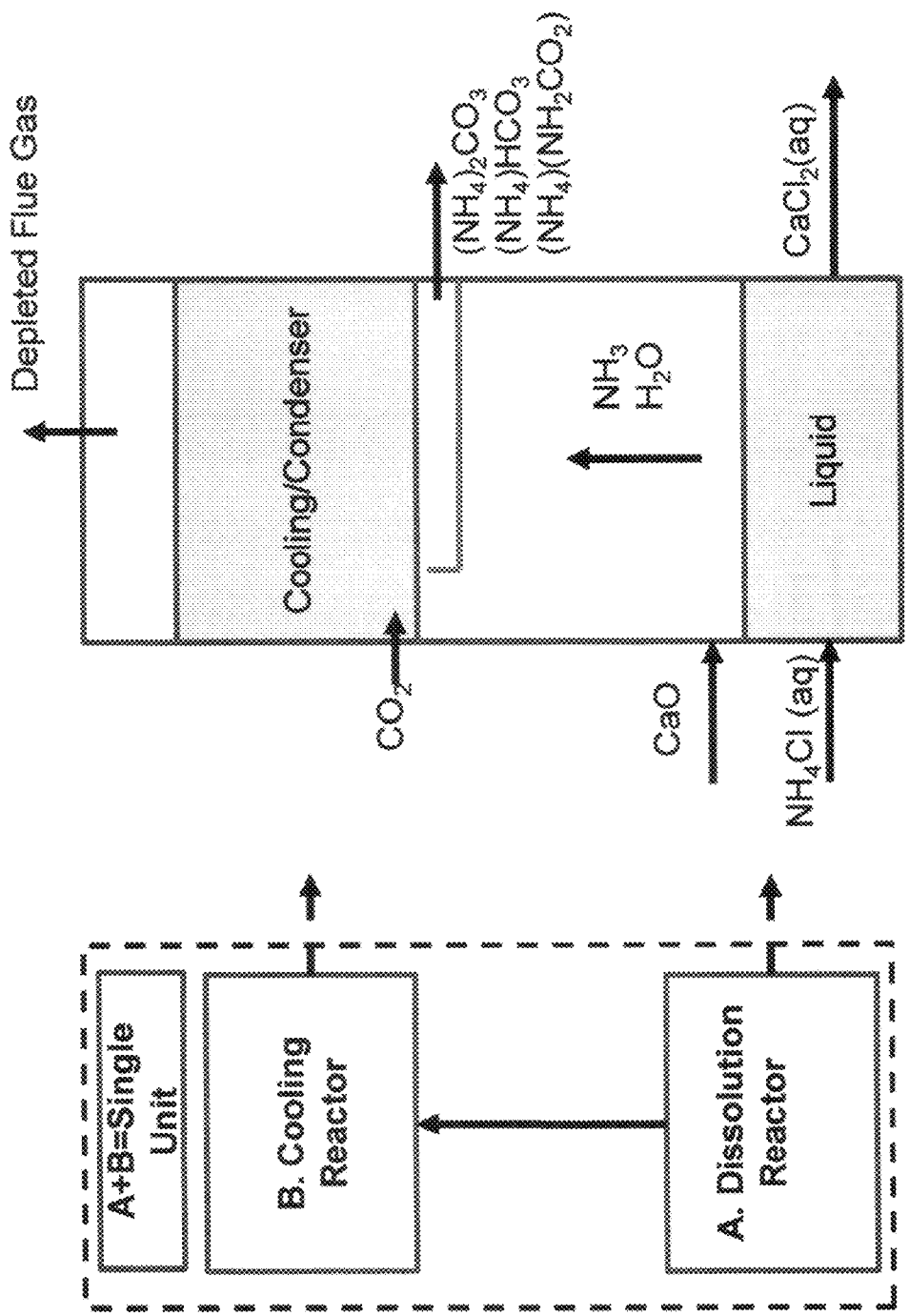
FIG. 5 illustrates some embodiments of the methods and systems comprising an integrated reactor provided herein.
Figure 6:
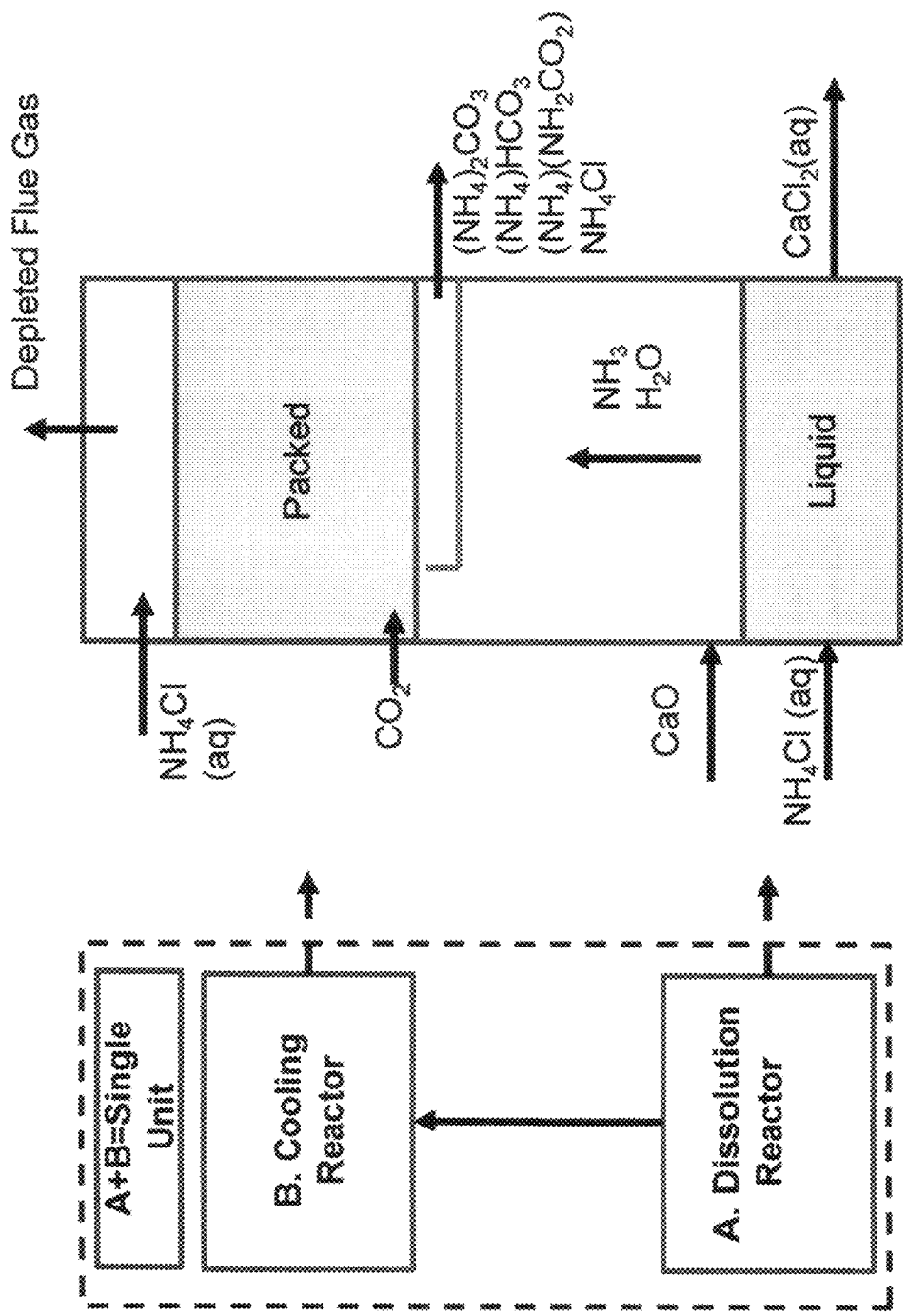
FIG. 6 illustrates some embodiments of the methods and systems comprising an integrated reactor provided herein.
Figure 7:
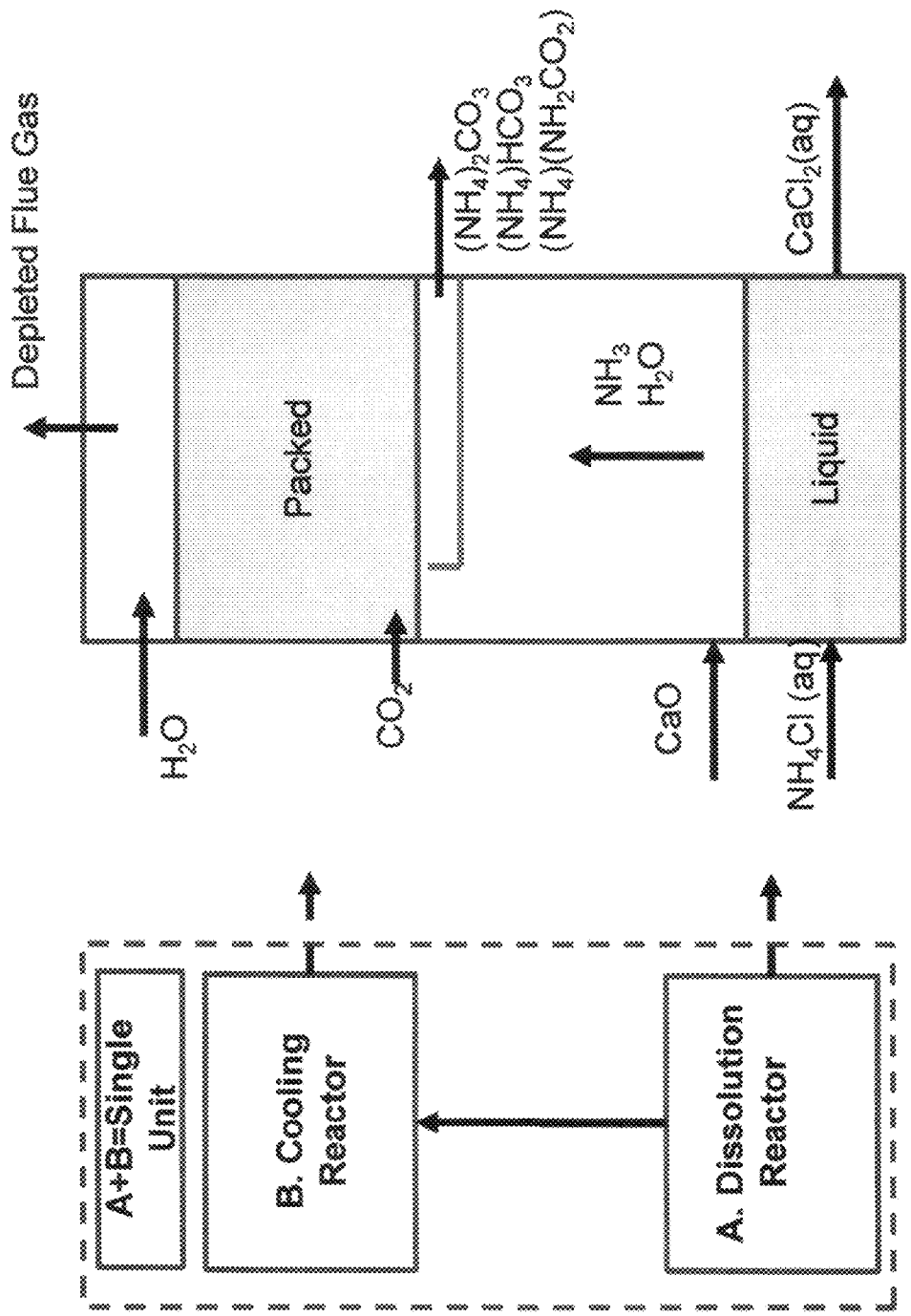
FIG. 7 illustrates some embodiments of the methods and systems comprising an integrated reactor provided herein.

Various other configurations of the integrated reactor described above, are as illustrated in FIGS. 5-7. FIG. 5 is another illustration of FIG. 4. FIG. 6 further illustrates $CO_2$ introduction into the vapor space of the cooling reactor that is packed with a packing material. The packing material can be any inert material used to aid mass transfer of $NH_3$ and $CO_2$ from the vapor into the liquid phase. The packing can be random packing or structured packing. The random packing material can be any material that has individual pieces packed into the vessel or the reactor. The structured packing material can be any material that has an individual monolith that is shaped to provide surface area and enhance mass transfer. Examples of loose or unstructured or random packing material include, but not limited to, Raschig rings (such as in ceramic material), pall rings (e.g. in metal and plastic), lessing rings, Michael Bialecki rings (e.g. in metal), berl saddles, intalox saddles (e.g. in ceramic), super intalox saddles, Tellerette® ring (e.g. spiral shape in polymeric material), etc.

Examples of structured packing material include, but not limited to, thin corrugated metal plates or gauzes (honeycomb structures) in different shapes with a specific surface area. The structured packing material may be used as a ring or a layer or a stack of rings or layers that have diameter that may fit into the diameter of the reactor. The ring may be an individual ring or a stack of rings fully filling the reactor. In some embodiments, the voids left out by the structured packing in the reactor are filled with the unstructured or random packing material.

Examples of structured packing material includes, without limitation, Flexipac®, Intalox®, Flexipac® HC®, etc. In a structured packing material, corrugated sheets may be arranged in a crisscross pattern to create flow channels for the vapor phase. The intersections of the corrugated sheets may create mixing points for the liquid and vapor phases. The structured packing material may be rotated about the column (reactor) axis to provide cross mixing and spreading of the vapor and liquid streams in all directions. The structured packing material may be used in various corrugation sizes and the packing configuration may be optimized to attain the highest efficiency, capacity, and pressure drop requirements of the reactor. The structured packing material may be made of a material of construction including, but not limited to, titanium, stainless steel alloys, carbon steel, aluminum, nickel alloys, copper alloys, zirconium, thermoplastic, etc. The corrugation crimp in the structured packing material may be of any size, including, but not limited to, Y designated packing having an inclination angle of 45° from the horizontal or X designated packing having an inclination angle of 60° from the horizontal. The X packing may provide a lower pressure drop per theoretical stage for the same surface area. The specific surface area of the structured packing may be between 50-800 $m^2/m^3$; or between 75-350 $m^2/m^3$; or between 200-800 $m^2/m^3$; or between 150-800 $m^2/m^3$; or between 500-800 $m^2/m^3$.

In some embodiments, the cooling reactor further comprises an inlet to introduce a scrubbing fluid, such as e.g. ammonium chloride solution (FIG. 6) or water (FIG. 7) to the top of the packing material of the cooling reactor. The scrubbing fluids such as ammonium chloride solution, or ammonia solution, or water or the like, facilitate formation of the condensed products such as ammonium bicarbonate, ammonium carbonate, ammonia, ammonium carbamate, or combinations thereof. The scrubbing fluid can provide more liquid volume for the condensation of the gases. In some embodiments, if the scrubbing fluid is pre-cooled, then it can further aid the condensation process. When the scrubbing fluid is the ammonium chloride solution (FIG. 6), the ammonium chloride solution can be a portion of the ammonium chloride solution being fed to the dissolution reactor. In some embodiments, the second aqueous solution comprising ammonium bicarbonate, ammonium carbonate, ammonia, ammonium carbamate, ammonium chloride, or combinations thereof, collected from the condensed liquid from the cooling reactor, may be recycled back to the cooling reactor as the scrubbing fluid to further facilitate the condensation process. In some embodiments, the second aqueous solution may be cooled in a heat exchanger prior to recycling it back to the cooling reactor.

Other gases such as flue gas in the gaseous stream comprising carbon dioxide (obtained from the calcination process) may exit the cooling reactor (illustrated in FIGS. 4-7).

In the aforementioned aspects, both the dissolution and the cooling reactors are fitted with inlets and outlets to receive the required gases and collect the aqueous streams. In some embodiments of the aforementioned aspect, the dissolution reactor comprises a stirrer to mix the lime with the aqueous base solution. The stirrer can also facilitate upward movement of the gases. In some embodiments of the aforementioned aspect, the dissolution reactor is configured to collect the solids settled at the bottom of the reactor after removing the first aqueous solution comprising calcium salt. In some embodiments of the aforementioned aspect, the cooling tower comprises one or more trays configured to catch and collect the condensed second aqueous solution and prevent it from falling back into the dissolution reactor. As such, the cooling/condensation may be accomplished through use of infusers, bubblers, fluidic Venturi reactors, spargers, gas filters, sprays, trays, or packed column reactors, and the like.

In some embodiments, the cooling reactor comprises a heat exchanger in the reactor or a heat exchanging surface. The heat exchanger may comprise one or more tubes with a cold fluid circulating inside the tubes such that the cold fluid is isolated from the vapor phase in the cooling reactor but facilitates lowering the temperature of the cooling reactor for the condensation of the gases. The cold fluid can be cooling water, the scrubbing solution described above, and the like. In some embodiments, the second aqueous solution exiting the cooling reactor is cooled down by the heat exchanger before it is used as the scrubbing solution.

As illustrated in step C in FIGS. 1-2, the first aqueous solution comprising calcium salt, from treatment of the lime with a base as described herein, such as e.g. an ammonium salt or an ammonium halide, is contacted with $CO_2$ and optionally $NH_3$ from step A at any time before, during, or after the first aqueous solution comprising calcium salt is subjected to one or more precipitation conditions (i.e., conditions allowing for precipitation of the precipitation material). Similarly, as illustrated in step C in FIG. 3, the first aqueous solution comprising calcium salt, from treatment of the lime with a base as described herein for step A, such as e.g. an ammonium salt or an ammonium halide, is contacted with the second aqueous solution comprising ammonium bicarbonate, ammonium carbonate, ammonia, ammonium carbamate, or combinations thereof from the cooling reaction/reactor at any time before, during, or after the first aqueous solution comprising calcium salt is subjected to one or more precipitation conditions (i.e., conditions allowing for precipitation of the precipitation material).

Accordingly, in some embodiments, the first aqueous solution comprising calcium salt is contacted with the $CO_2$ (and $NH_3$ as in FIG. 2 or second aqueous solution as in FIG. 3) prior to subjecting the aqueous solution to the one or more precipitation conditions that favor formation of the precipitation material comprising stable or reactive vaterite or PCC. In some embodiments, the first aqueous solution comprising calcium salt is contacted with the $CO_2$ (and $NH_3$ as in FIG. 2 or second aqueous solution as in FIG. 3) while the aqueous solution is being subjected to the one or more precipitation conditions that favor formation of the precipitation material comprising stable or reactive vaterite or PCC. In some embodiments, the first aqueous solution comprising calcium salt is contacted with the $CO_2$ (and $NH_3$ as in FIG. 2 or second aqueous solution as in FIG. 3) prior to and while subjecting the aqueous solution to the one or more precipitation conditions that favor formation of the precipitation material comprising stable or reactive vaterite or PCC. In some embodiments, the first aqueous solution comprising calcium salt is contacted with the $CO_2$ (and $NH_3$ as in FIG. 2 or second aqueous solution as in FIG. 3) after subjecting the aqueous solution to the one or more precipitation conditions that favor formation of the precipitation material comprising stable or reactive vaterite or PCC.

In some embodiments, the contacting of the first aqueous solution comprising calcium salt with carbon dioxide and optionally ammonia or second aqueous solution is achieved by contacting the first aqueous solution to achieve and maintain a desired pH range, a desired temperature range, and/or desired divalent cation concentration using a convenient protocol as described herein (precipitation conditions). In some embodiments, the systems include a precipitation reactor configured to contact the first aqueous solution comprising calcium salt with carbon dioxide and optionally ammonia from step A of the process or the systems include a precipitation reactor configured to contact the first aqueous solution comprising calcium salt with the second aqueous solution comprising ammonium bicarbonate, ammonium carbonate, ammonia, (optionally ammonium carbamate), or combinations thereof.

In some embodiments, the first aqueous solution comprising calcium salt may be placed in a precipitation reactor, wherein the amount of the first aqueous solution comprising calcium salt added is sufficient to raise the pH to a desired level (e.g., a pH that induces precipitation of the precipitation material) such as pH 7-9, pH 7-8.7, pH 7-8.5, pH 7-8, pH 7.5-8, pH 8-8.5, pH 8.5-9, pH 9-14, pH 10-14, pH 11-14, pH 12-14, or pH 13-14. In some embodiments, the pH of the first aqueous solution comprising calcium salt when contacted with the carbon dioxide and optionally the $NH_3$ or the second aqueous solution, is maintained at between 7-9 or between 7-8.7 or between 7-8.5 or between 7.5-8.5 or between 7-8, or between 7.6-8.5, or between 8-8.5, or between 7.5-9.5 in order to form the precipitation material comprising stable vaterite, reactive vaterite or PCC.

In some embodiments, the first aqueous solution is immobilized in a column or bed (an example of a configuration of the precipitation reactor). In such embodiments, water is passed through or over an amount of the calcium salt solution sufficient to raise the pH of the water to a desired pH or to a particular divalent cation ($Ca^{2+}$) concentration. In some embodiments, the first aqueous solution may be cycled more than once, wherein a first cycle of precipitation removes primarily calcium carbonate minerals and leaves an alkaline solution to which additional first aqueous solution comprising calcium salt may be added. The gaseous stream comprising the carbon dioxide and optionally the $NH_3$, or the second aqueous solution when contacted with the recycled solution of the aqueous solution, allows for the precipitation of more calcium carbonate and/or bicarbonate compounds. It will be appreciated that, in these embodiments, the aqueous solution following the first cycle of precipitation may be contacted with the gaseous stream comprising the $CO_2$ and optionally the $NH_3$ (or with the second aqueous solution) before, during, and/or after the first aqueous solution comprising calcium salt has been added. In these embodiments, the water may be recycled or newly introduced. As such, the order of addition of the gaseous stream comprising the $CO_2$ and optionally the $NH_3$ and the first aqueous solution comprising calcium salt may vary. For example, the first aqueous solution comprising calcium salt may be added to, for example, brine, seawater, or freshwater, followed by the addition of the gaseous stream comprising the $CO_2$ and optionally the $NH_3$, or the second aqueous solution. In another example, the gaseous stream comprising the $CO_2$ and optionally the $NH_3$, or the second aqueous solution may be added to, for example, brine, seawater, or freshwater, followed by the addition of the first aqueous solution comprising calcium salt. In another example, the gaseous stream comprising the $CO_2$ and optionally the $NH_3$, or the second aqueous solution may be added directly to the first aqueous solution comprising calcium salt.

The first aqueous solution comprising calcium salt may be contacted with the gaseous stream comprising the $CO_2$ and optionally the $NH_3$ using any convenient protocol. The contact protocols of interest include, but not limited to, direct contacting protocols (e.g., bubbling the gases through the first aqueous solution), concurrent contacting means (i.e., contact between unidirectional flowing gaseous and liquid phase streams), countercurrent means (i.e., contact between oppositely flowing gaseous and liquid phase streams), and the like. As such, contact may be accomplished through use of infusers, bubblers, fluidic Venturi reactors, spargers, gas filters, sprays, trays, or packed column reactors, and the like, in the precipitation reactor. In some embodiments, gas-liquid contact is accomplished by forming a liquid sheet of solution with a flat jet nozzle, wherein the gases and the liquid sheet move in countercurrent, co-current, or crosscurrent directions, or in any other suitable manner. In some embodiments, gas-liquid contact is accomplished by contacting liquid droplets of the solution having an average diameter of 500 micrometers or less, such as 100 micrometers or less, with the gas source.

In some embodiments, substantially (e.g., 80% or more or 90% or 99.9% or 100%) the entire gaseous $CO_2$ (from the calcination) and optionally $NH_3$ waste stream produced by step A of the process illustrated in Figs herein is employed in the precipitation of the precipitation material. In some embodiments, a portion of the gaseous $CO_2$ and optionally $NH_3$ waste stream is employed in the precipitation of the precipitation material and is may be 75% or less, such as 60% or less, and including 50% and less of the gaseous waste stream.

Any number of the gas-liquid contacting protocols described herein may be utilized. Gas-liquid contact or the liquid-liquid contact is continued until the pH of the precipitation reaction mixture is optimum (various optimum pH values have been described herein to form the precipitation material comprising e.g. reactive vaterite), after which the precipitation reaction mixture is allowed to stir. The rate at which the pH drops may be controlled by addition of more of the first aqueous solution comprising calcium salt during gas-liquid contact or the liquid-liquid contact. In addition, additional first aqueous solution may be added after sparging to raise the pH back to basic levels for precipitation of a portion or all of the precipitation material. In any case, the precipitation material may be formed upon removing protons from certain species in the precipitation reaction mixture. The precipitation material comprising carbonates may then be separated and, optionally, further processed.

The rate at which the pH drops may be controlled by addition of additional supernatant or the first aqueous solution comprising calcium salt during gas-liquid contact or the liquid-liquid contact. In addition, additional supernatant or the first aqueous solution comprising calcium salt may be added after gas-liquid contact or the liquid-liquid contact to raise the pH back to basic levels (e.g. between 7-9 or between 7-8.5 or between 7-8 or between 8-9) for precipitation of a portion or all of the precipitation material.

In methods and systems provided herein, the aqueous solution produced by contacting the first aqueous solution comprising calcium salt with the gaseous stream comprising the $CO_2$ and optionally the $NH_3$ or the aqueous solution produced by contacting the first aqueous solution comprising calcium salt with the second aqueous solution comprising ammonium bicarbonate, ammonium carbonate, ammonia, (optionally ammonium carbamate) or combinations thereof, is subjected to the one or more of precipitation conditions (step C in FIGS. 1-3) sufficient to produce the precipitation material comprising stable or reactive vaterite or PCC and a supernatant (i.e., the part of the solution that is left over after precipitation of the precipitation material). The one or more precipitation conditions favor production of the precipitation material comprising stable or reactive vaterite or PCC.

The one or more precipitation conditions include those that modulate the environment of the precipitation reaction mixture to produce the desired precipitation material comprising stable or reactive vaterite or PCC. Such one or more precipitation conditions, that can be used in the method and system aspects and embodiments described herein, suitable to form stable or reactive vaterite or PCC containing precipitation material include, but not limited to, temperature, pH, pressure, ion ratio, precipitation rate, presence of additive, presence of ionic species, concentration of additive and ionic species, stirring, residence time, mixing rate, forms of agitation such as ultrasonics, presence of seed crystals, catalysts, membranes, or substrates, dewatering, drying, ball milling, etc. In some embodiments, the average particle size of the stable or the reactive vaterite or PCC may also depend on the one or more precipitation conditions used in the precipitation of the precipitation material. In some embodiments, the percentage of the stable or the reactive vaterite in the precipitation material may also depend on the one or more precipitation conditions used in the precipitation process.

For example, the temperature of the precipitation reaction may be raised to a point at which an amount suitable for precipitation of the desired precipitation material occurs. In such embodiments, the temperature of the precipitation reaction may be raised to a value, such as from 20° C. to 60° C., and including from 25° C. to 60° C.; or from 30° C. to 60° C.; or from 35° C. to 60° C.; or from 40° C. to 60° C.; or from 50° C. to 60° C.; or from 25° C. to 50° C.; or from 30° C. to 50° C.; or from 35° C. to 50° C.; or from 40° C. to 50° C.; or from 25° C. to 40° C.; or from 30° C. to 40°

C.; or from 25° C. to 30° C. In some embodiments, the temperature of the precipitation reaction may be raised using energy generated from low or zero carbon dioxide emission sources (e.g., solar energy source, wind energy source, hydroelectric energy source, waste heat from the flue gases of the carbon emitter, etc).

The pH of the precipitation reaction may also be raised to an amount suitable for the precipitation of the desired precipitation material. In such embodiments, the pH of the precipitation reaction may be raised to alkaline levels for precipitation. In some embodiments, the pH of the first aqueous solution comprising calcium salt that is contacted with the gaseous stream comprising the carbon dioxide gas and optionally the $NH_3$ gas (or with the second aqueous solution) has an effect on the formation of the stable or reactive vaterite or PCC. In some embodiments, the precipitation conditions required to form the precipitation material include conducting the precipitation step of the gaseous stream comprising the carbon dioxide gas and optionally the $NH_3$ gas (or the second aqueous solution) with the first aqueous solution comprising calcium salt at pH higher than 7 or pH of 8 or pH of between 7.1-8.5 or pH of between 7.5-8 or between 7.5-8.5 or between 8-8.5 or between 8-9 or between 7.6-8.4, in order to form the precipitation material. The pH may be raised to pH 9 or higher, such as pH 10 or higher, including pH 11 or higher or pH 12.5 or higher.

Adjusting major ion ratios during precipitation may influence the nature of the precipitation material. Major ion ratios may have considerable influence on polymorph formation. For example, as the magnesium:calcium ratio in the water increases, aragonite may become the major polymorph of calcium carbonate in the precipitation material over low-magnesium vaterite. At low magnesium:calcium ratios, low-magnesium calcite may become the major polymorph. In some embodiments, where $Ca^{2+}$ and $Mg^{2+}$ are both present, the ratio of $Ca^{2+}$ to $Mg^{2+}$ (i.e., $Ca^{2+}:Mg^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000. In some embodiments, the ratio of $Mg^{2+}$ to $Ca^{2+}$ (i.e., $Mg^{2+}:Ca^{2+}$) in the precipitation material is 1:1 to 1:2.5; 1:2.5 to 1:5; 1:5 to 1:10; 1:10 to 1:25; 1:25 to 1:50; 1:50 to 1:100; 1:100 to 1:150; 1:150 to 1:200; 1:200 to 1:250; 1:250 to 1:500; or 1:500 to 1:1000.

Precipitation rate may also have an effect on precipitation material formation, with the most rapid precipitation rate achieved by seeding the solution with a desired phase. Without seeding, rapid precipitation may be achieved by rapidly increasing the pH of the precipitation reaction mixture, which may result in more amorphous constituents. The higher the pH, the more rapid is the precipitation, which may result in a more amorphous precipitation material.

Residence time of the precipitation reaction after contacting the first aqueous solution with the gaseous stream comprising the carbon dioxide gas and optionally the $NH_3$ gas (or with the second aqueous solution) may also have an effect on precipitation material formation. For example, in some embodiments, a longer residence time may result in transformation of the reactive vaterite to aragonite/calcite within the reaction mixture. In some embodiments, too short residence time may result in an incomplete formation of the reactive vaterite in the reaction mixture. Therefore, the residence time may be critical to the precipitation of the reactive vaterite. Further, the residence time may also affect the particle size of the precipitate. For example, too long residence time may result in the agglomeration of the particles forming large size particles which is undesirable for PCC formation. Therefore, in some embodiments, the residence time of the reaction is between about 5-60 minutes, or between about 5-15 minutes, or between about 10-60 minutes, or between about 15-60 min, or between about 15-45 min, or between about 15-30 min, or between about 30-60 min.

In some embodiments, the one or more precipitation conditions to produce the desired precipitation material from the precipitation reaction may include, as above, the temperature and pH, as well as, in some instances, the concentrations of additives and ionic species in the water. The additives have been described herein below. The presence of the additives and the concentration of the additives may also favor formation of stable or reactive vaterite or PCC. In some embodiments, a middle chain or long chain fatty acid ester may be added to the first aqueous solution during the precipitation to form the PCC. Examples of fatty acid esters include, without limitation, cellulose such as carboxymethyl cellulose, sorbitol, citrate such as sodium or potassium citrate, stearate such as sodium or potassium stearate, phosphate such as sodium or potassium phosphate, sodium tripolyphosphate, hexametaphosphate, EDTA, or combinations thereof. In some embodiments, a combination of stearate and citrate may be added during the precipitation step of the process to form the PCC.

The one or more precipitation conditions may also include factors such as mixing rate, forms of agitation such as ultrasonics, and the presence of seed crystals, catalysts, membranes, or substrates. In some embodiments, the one or more precipitation conditions include supersaturated conditions, temperature, pH, and/or concentration gradients, or cycling or changing any of these parameters. The protocols employed to prepare the precipitation material may be batch, semi-batch, or continuous protocols. The one or more precipitation conditions may be different to produce the precipitation material in a continuous flow system compared to a semi-batch or batch system.

In some embodiments of the methods and systems provided herein, the formation of the precipitation material comprising stable or reactive vaterite can be facilitated on a surface of an aggregate. In some embodiments of the methods and systems provided herein, where the aqueous solution is produced under the one or more of precipitation conditions (step C in FIGS. 1-3) by contacting the first aqueous solution comprising calcium salt with the gaseous stream comprising the $CO_2$ and optionally the $NH_3$, or the aqueous solution produced by contacting the first aqueous solution comprising calcium salt with the second aqueous solution comprising ammonium bicarbonate, ammonium carbonate, ammonia, (optionally ammonium carbamate) or combinations thereof; the methods and systems further comprise adding an aggregate to the aqueous solution and forming the precipitation material comprising stable or reactive vaterite on the surface of the aggregate.

The term "aggregate" as used herein includes a particulate composition that finds use in concretes, mortars and other materials, e.g., roadbeds, asphalts, and other structures and is suitable for use in such structures. Aggregates are particulate compositions that may in some embodiments be classified as fine or coarse. Fine aggregates generally include natural sand or crushed stone with most particles passing through a ⅜-inch sieve. Coarse aggregates generally are any particles greater than 0.19 inch, but generally range between ⅜ and 1.5 inches in diameter. Gravels may constitute the coarse aggregate used in concrete with crushed stone making up the remainder. In some embodiments, the aggregate is crushed lime rock. In some embodiments, the aggregate is repurposed or reused concrete. The methods and systems provided herein add recyclability or value (by having better bonding characteristics) to concrete repurposed from old projects.

In the aforementioned methods and systems, when the aggregate is added to the precipitation step C, the precipitation material forms an outer layer surrounding the surface of the aggregate thereby activating the surface of the inert aggregate material. This activated surface of the aggregate (comprising the reactive vaterite) coming in contact with water (the process of dissolution-reprecipitation of the vaterite to aragonite explained herein below) and cement, transforms vaterite to the aragonite which binds to the cement. The aggregate thus activated provides better binding to the cement.

Therefore, in some embodiments, there are provided methods to form calcium carbonate comprising vaterite, comprising:

(i) calcining limestone to form lime and a gaseous stream comprising carbon dioxide;

(ii) dissolving the lime in an aqueous base solution under one or more dissolution conditions to produce a first aqueous solution comprising calcium salt, and a gaseous stream comprising ammonia;

(iii) adding an aggregate to the first aqueous solution; and (iv) treating the first aqueous solution comprising calcium salt and the aggregate with the gaseous stream comprising carbon dioxide and the gaseous stream comprising ammonia under one or more precipitation conditions to form a precipitation material comprising calcium carbonate on a surface of the aggregate, wherein the calcium carbonate comprises vaterite.

In some embodiments, there are provided methods to form calcium carbonate comprising vaterite, comprising:

(i) calcining limestone to form lime and a gaseous stream comprising carbon dioxide;

(ii) dissolving the lime in an aqueous N-containing inorganic salt solution under one or more dissolution conditions to produce a first aqueous solution comprising calcium salt, and a gaseous stream comprising ammonia;

(iii) recovering the gaseous stream comprising carbon dioxide and the gaseous stream comprising ammonia and subjecting the gaseous streams to a cooling process under one or more cooling conditions to condense a second aqueous solution comprising ammonium bicarbonate, ammonium carbonate, ammonia, or combinations thereof;

(iv) adding an aggregate to the first aqueous solution; and (v) treating the first aqueous solution comprising calcium salt and the aggregate with the second aqueous solution comprising ammonium bicarbonate, ammonium carbonate, ammonia, or combinations thereof under one or more precipitation conditions to form a precipitation material comprising calcium carbonate on a surface of the aggregate, wherein the calcium carbonate comprises vaterite.

In some embodiments of the aforementioned embodiments, the second aqueous solution further comprises ammonium carbamate. It is to be understood that while the precipitation material comprising calcium carbonate is formed on the surface of the aggregate, some precipitation material may be formed in the aqueous solution which is separated from the supernatant solution along with the activated aggregate. In some embodiments, the amount of the first aqueous solution comprising calcium salt in the precipitation reactor may be optimized to selectively precipitate the reactive vaterite on the surface of the aggregate, or selectively precipitate the precipitation material in the aqueous solution, or both. In the aforementioned methods and systems, the precipitation material comprising calcium carbonate comprises reactive vaterite. In the aforementioned methods and systems, the aggregate may be the fine aggregate or the coarse aggregate. In some embodiments of the aforementioned methods and systems, the aggregate is the same limestone used in step (i) of the process or may be a crushed form of the limestone of step (i).

In some embodiments, the gas leaving the precipitation reactor (shown as "scrubbed gas" in FIGS. 1-3) passes to a gas treatment unit for a scrubbing process. The mass balance and equipment design for the gas treatment unit may depend on the properties of the gases. In some embodiments, the gas treatment unit may incorporate an HCl scrubber for recovering the small amounts of $NH_3$ in the gas exhaust stream that may be carried from the $CO_2$ absorption, precipitation step by the gas. $NH_3$ may be captured by the HCl solution through:

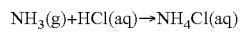
$$NH_3(g)+HCl(aq)\rightarrow NH_4Cl(aq)$$

The $NH_4Cl$ (aq) from the HCl scrubber may be recycled to the dissolution step A.

In some embodiments, the gas exhaust stream comprising ammonia (shown as "scrubbed gas" in FIGS. 1-3) may be subjected to a scrubbing process where the gas exhaust stream comprising ammonia is scrubbed with the carbon dioxide from the industrial process and water to produce a solution of ammonia. The inlets for the scrubber may be carbon dioxide ($CO_{2(g)}$), the reactor gas exhaust containing ammonia ($NH_{3(g)}$, and fresh makeup water (or some other dilute water stream). The outlet may be a slipstream of the scrubber's recirculating fluid (e.g. $H_3N$—$CO_{2(aq)}$ or carbamate), which may optionally be returned back to the main reactor for contacting with carbon dioxide and precipitation. The pH of the system may be controlled by regulating the flow rate of $CO_{2(g)}$ into the scrubber. The conductivity of the system may be controlled by addition of dilute makeup water to the scrubber. Volume may be maintained constant by using a level detector in the scrubber or it's reservoir. While ammonia is a basic gas, the carbon dioxide gases are acidic gases. In some embodiments, the acidic and basic gases may ionize each other to increase their solubilities.

Without being limited by any theory, it is contemplated that the following reaction may take place in the scrubber:

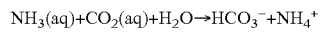
$$NH_3(aq)+CO_2(aq)+H_2O\rightarrow HCO_3^-+NH_4^+$$

The first aqueous solution comprising calcium salt when contacted with the gaseous stream comprising $CO_2$ gas and optionally the $NH_3$ gas (or with the second aqueous solution) under one or more precipitation conditions results in the precipitation of the calcium carbonate. The one or more precipitation conditions that result in the formation of the stable or reactive vaterite or PCC in this process have been described herein below.

In some embodiments, the precipitation material comprises stable vaterite and/or reactive vaterite or PCC. The "stable vaterite" or its grammatical equivalent as used herein includes vaterite that does not transform to aragonite or calcite during and/or after dissolution-reprecipitation process in water. The "reactive vaterite" or "activated vaterite" or its grammatical equivalent as used herein, includes vaterite that results in aragonite formation during and/or after dissolution-re-precipitation process in water. The "precipitated calcium carbonate" or "PCC" as used herein includes conventional PCC with high purity and micron or lesser size particles. The PCC can be in any polymorphic form of calcium carbonate including but not limited to vaterite, aragonite, calcite, or combination thereof. In some embodiments, the PCC has a particle size in nanometers or between 0.001-5 micron.

In some embodiments, the vaterite in the precipitation material and/or on the surface of the aggregate may be formed under suitable conditions so that the vaterite is reactive and transforms to aragonite upon dissolution-precipitation process (during cementation) in water. The aragonite may impart one or more unique characteristics to the product including, but not limited to, high compressive strength, complex microstructure network, neutral pH etc. In some embodiments, the vaterite in the precipitation material may be formed under suitable conditions so that the vaterite is stable and is used as filler in various applications. In some embodiments, the PCC in the precipitation material may be formed under suitable conditions so that the PCC is highly pure and is of a very small size particle.

The precipitation material comprising reactive vaterite (optionally including solids as described herein) undergoes transformation to aragonite and sets and hardens into cementitious products (shown as products (A) in FIGS. 1-3), the solids may get incorporated in the cementitious products. This provides an additional advantage of one less step of removal of the solids, minimizing the loss of the base, such as e.g. $NH_4Cl$ loss as well as eliminating a potential waste stream thereby increasing the efficiency and improving the economics of the process. In some embodiments, the solid impurities do not adversely affect the transformation and/or reactivity of the vaterite to aragonite. In some embodiments, the solid impurities do not adversely affect the strength (such as compressive strength or flexural strength) of the cementitious products.

In some embodiments, the methods and systems provided herein further include separating the precipitation material (step D in FIGS. 1-3) from the aqueous solution by dewatering to form calcium carbonate cake (as shown in FIGS. 1-3). The calcium carbonate cake may be subjected optionally to rinsing, and optionally drying (step E in FIGS. 1-3). The dried precipitated material or the dried calcium carbonate cake may then be used to make cementitious or non-cementitious products (shown as products (B) in FIGS. 1-3). In some embodiments, the calcium carbonate cake may contain impurities (e.g., 1-2% by weight or more) of ammonium ($NH_4^+$) ions, sulfur ions, and/or chloride ($Cl^-$) ions. While rinsing of the calcium carbonate cake may remove some or all of the ammonium salts and/or sulfur compounds, it may result in a dilute concentration of ammonium salts (in the supernatant) which may need concentrating before recycling it back to the process.

The methods and systems provided herein may result in residual base such as the residual N-containing inorganic or N-containing organic salt, e.g. residual ammonium salt remaining in the supernatant solution as well as in the precipitate itself after the formation of the precipitate. The residual base such as the N-containing inorganic or N-containing organic salt, e.g. residual ammonium salt (e.g. residual $NH_4Cl$) as used herein includes any salt that may be formed by ammonium ions and anions present in the solution including, but not limited to halogen ions such as chloride ions, nitrate or nitrite ions, and sulfur ions such as, sulfate ions, sulfite ions, thiosulfate ions, hydrosulfide ions, and the like. In some embodiments, the residual N-containing inorganic salt comprises ammonium halide, ammonium sulfate, ammonium sulfite, ammonium hydrosulfide, ammonium thiosulfate, ammonium nitrate, ammonium nitrite, or combinations thereof. Various methods have been provided herein to remove and optionally recover the residual salt from the supernatant solution as well as the precipitate. In some embodiments, the supernatant solution further comprising the N-containing inorganic or N-containing organic salt, e.g. residual ammonium salt (e.g. residual $NH_4Cl$), is recycled back to the dissolution reactor for the dissolution of the lime (to step A in FIGS. 1-3).

The residual base solution such as the N-containing inorganic or N-containing organic salt solution, e.g. residual ammonium salt solution (e.g. residual $NH_4Cl$) obtained from the dewatering as well as the rinsing stream may optionally be concentrated before being recycled back for the dissolution of the lime. Additional base, such as e.g. ammonium chloride and/or ammonia (anhydrous or aqueous solution) may be added to the recycled solution to make up for the loss of the ammonium chloride during the process and bring the concentration of ammonium chloride to the optimum level.

In some embodiments, the residual N-containing inorganic or N-containing organic salt solution, e.g. residual ammonium salt solution (e.g. residual $NH_4Cl$), as illustrated in FIGS. 1-3, may be recovered from the supernatant aqueous solution and concentrated using recovery process, such as, but not limited to, thermal decomposition, pH adjustment, reverse osmosis, multi-stage flash, multi-effect distillation, vapor recompression, distillation, or combinations thereof. The systems configured to carry out these processes are available commercially. For example, the pH of the solution may be raised (e.g. with a strong base like NaOH). This may shift the equilibrium towards volatile ammonia ($NH_3(aq)/NH_3(g)$). Rates and total removal could both be improved by heating the solution.

In some embodiments, the residual N-containing inorganic or N-containing organic salt solution, e.g. residual ammonium salt solution (e.g. residual $NH_4Cl$) may be separated and recovered from the precipitate by the thermal decomposition process. This process may be incorporated in the processes illustrated in FIGS. 1-3 at the separation of the $CaCO_3$ precipitate (step D) and/or after the step of the dried $CaCO_3$ precipitate or powder (step E).

Typically, at 338° C., solid $NH_4Cl$ may decompose into ammonia ($NH_3$) and hydrogen chloride (HCl) gases. While at 840° C., solid $CaCO_3$ decomposes to calcium oxide (CaO) solid and carbon dioxide ($CO_2$) gas.

In some embodiments, the residual ammonium salt in the $CaCO_3$ precipitate and/or dried $CaCO_3$ precipitate such as, but not limited to, ammonium chloride, ammonium sulfate, ammonium sulfite, ammonium hydrosulfide, ammonium thiosulfate, ammonium nitrate, ammonium nitrite, or combinations thereof may be removed by thermal decomposition at a temperature between 338-840° C. This may be done either during the normal filter cake drying process and/or as a second post-drying heat treatment. A temperature range is desirable that decomposes residual ammonium salts in the precipitation while preserving the cementitious properties of the reactive vaterite in the precipitation material such that the reactive vaterite stays as reactive vaterite after heating, and after combination with water, successfully transforms to aragonite to form cementitious products.

In some embodiments of the foregoing aspect and embodiments, the step of removing and optionally recovering the residual N-containing inorganic or N-containing organic salt, such as e.g. ammonium salt from the precipitation material comprises heating the precipitation material between about 290-375° C. or between about 300-360° C. or between about 300-350° C. or between about 310-345° C. or between about 320-345° C. or between about 330-345° C. or between about 300-345° C., to evaporate the residual N-containing inorganic or N-containing organic salt from the precipitation material with optional recovery by condensation of the residual N-containing inorganic or N-containing organic salt.

In some embodiments of the foregoing aspect and embodiments, the step of removing and optionally recovering the residual N-containing inorganic or N-containing organic salt, such as e.g. residual ammonium salt from the precipitation material comprises heating the precipitation material, for a duration of more than about 10 min or of more than about 15 min or for than about 5 min or of between about 10 min to about 1 hour or of between about 10 min to about 1.5 hour or of between about 10 min to about 2 hours or of between about 10 min to about 5 hours or of between about 10 min to about 10 hours.

In some embodiments, the precipitation material is dewatered (to remove the supernatant aqueous solution) and dried to remove water (e.g. by heating at about or above 100° C.) before subjecting the precipitation material to the heating step as above to remove and optionally recover the residual N-containing inorganic or N-containing organic salt, e.g. residual ammonium salt. In some embodiments, the precipitation material is partially dewatered (to remove bulk of the supernatant aqueous solution) and partially dried to remove water (or avoid the drying step) before subjecting the precipitation material to the heating step to remove and optionally recover the residual N-containing inorganic or N-containing organic salt, e.g. residual ammonium salt. In some embodiments, the reactive vaterite in the precipitation material stays as reactive vaterite after heating. In some embodiments of the foregoing embodiments, it is desirable that the reactive vaterite in the precipitation material stays as reactive vaterite such that the cementitious properties of the material are conserved. In some embodiments, the ammonium salt evaporates from the precipitation material in a form comprising ammonia gas, hydrogen chloride gas, chlorine gas, or combinations thereof. Applicants have found that in some embodiments, maintaining a combination of the amount of temperature and duration of heating may be critical to removing ammonium salt from the precipitation material yet preserving the cementitious properties of the reactive vaterite material. Traditionally, the reactive vaterite is highly unstable and transforms readily to aragonite/calcite. However, Applicants have found temperature ranges coupled optionally with duration of heating that minimize the transformation of the reactive vaterite yet remove residual ammonium salts from the material. In some embodiments of the foregoing embodiments, the vaterite in the precipitation material, after removal of the residual N-containing inorganic or N-containing organic salt, e.g. residual ammonium salt, stays as reactive vaterite which when combined with water transforms to aragonite (dissolution-reprecipitation process) which sets and cements to form cementitious products. The cementitious products, thus formed, possess minimal or no chloride content and have no foul smell of ammonia or sulfur. In some embodiments, the chloride content is around or below acceptable ASTM standards for the cementitious products.

In some embodiments, the above recited temperature conditions optionally coupled with duration of heating, may be combined with pressure conditions that provide a driving force to improve the thermodynamics of the decomposition of the residual N-containing inorganic or N-containing organic salt, e.g. residual ammonium salt. For example, the heating of the precipitation material may be carried out in a system in which the headspace is at a pressure lower than atmospheric pressure. The pressure lower than the atm pressure may create a driving force for heating reaction that involves gas phase products (such as, but not limited to, ammonia gas, hydrogen chloride gas, chlorine gas, or combinations thereof), by reducing the partial pressure of the reactant in the vapor phase. Another advantage of operating under reduced pressure or vacuum may be that at lower pressure some sublimation reactions may occur at lower temperatures thereby improving the energy requirements of the heating reaction.

In some embodiments of the above described thermal decomposition process, the separated ammonium chloride in the form of ammonia and HCl gases, may be recovered for reuse by either recrystallization of the combined thermally evolved gases or by absorbing the gases into an aqueous medium. Both mechanisms may result in the $NH_4Cl$ product that may be concentrated enough for reuse in the processes as shown in FIGS. 1-3.

In some embodiments, the ammonium salt may be separated and recovered in the above described process by pH adjusted evolution of the $NH_3$ gas from the ammonium salt. This process may be incorporated in the processes illustrated in FIGS. 1-3 at the separation of the $CaCO_3$ cake. The final pH of the water in the filter cake may typically be about 7.5. At this pH, $NH_4^+$ (pKa=9.25) may be the predominant species. Increasing the pH of this water may drive the acid base equilibrium toward $NH_3$ gas, as described in the following equation:

$$NH_4^+ \leftrightarrow H^+ + NH_{3(g)}$$

Any source of alkalinity may be used to increase the pH of the filter cake water. In some embodiments, the aqueous solution of the calcium oxide and/or hydroxide or the lime slurry may provide the source of high alkalinity. In some embodiments, the aqueous fraction of the lime may be integrated into the rinsing stage of the dewatering process (e.g. filter cake step) to raise the pH of the system, and drive the evolution of $NH_3$ gas. As ammonia has substantial solubility in water, heat and/or vacuum pressure may be applied to drive the equilibrium further toward the gaseous phase. The ammonia may be recovered for reuse by either recrystallization of ammonia with chloride or by absorbing the ammonia into an aqueous medium. Both mechanisms may result in the ammonia solution or $NH_4Cl$ product that may be concentrated enough for reuse in the processes described in FIGS. 1-3.

The calcium carbonate cake (e.g. vaterite or PCC) may be sent to the dryer (step E in FIG. 1) to form calcium carbonate powder containing stable or reactive vaterite or PCC. The powder form of the precipitation material comprising stable or reactive vaterite or PCC may be used further in applications to form products, as described herein. The cake may be dried using any drying techniques known in the art such as, but not limited to fluid bed dryer or swirl fluidizer. The resulting solid powder may be then mixed with additives to make different products described herein. In some embodiments, the slurry form with reduced water or the cake form of the precipitation material is directly used to form products, such as construction panel, as described herein.

Optionally the solids separated, may be dried and used as a pozzolan. In some embodiments, the solids separated may be added to the powder form of the precipitation material comprising vaterite as filler or supplementary cementitious material.

In the systems provided herein, the separation or dewatering step D may be carried out on the separation station. The precipitation material may be stored in the supernatant for a period of time following precipitation and prior to separation. For example, the precipitation material may be stored in the supernatant for a period of time ranging from few min to hours to 1 to 1000 days or longer, such as 1 to 10 days or longer, at a temperature ranging from 1° C. to 40° C., such as 20° C. to 25° C. Separation or dewatering of the precipitation material from the precipitation reaction mixture may be achieved using any of a number of convenient approaches, including draining (e.g., gravitational sedimentation of the precipitation material followed by draining), decanting, filtering (e.g., gravity filtration, vacuum filtration, filtration using forced air), centrifuging, pressing, or any combination thereof. Separation of the bulk water from the precipitation material produces a wet cake of precipitation material, or a dewatered precipitation material. Liquid-solid separator such as Epuramat's Extrem-Separator ("ExSep") liquid-solid separator, Xerox PARC's spiral concentrator, or a modification of either of Epuramat's ExSep or Xerox PARC's spiral concentrator, may be useful for the separation of the precipitation material from the precipitation reaction.

In some embodiments, the resultant dewatered precipitation material such as the wet cake material (after e.g. thermally removing the N-containing salt) may be directly used to make the products (A) described herein. For example, the wet cake of the dewatered precipitation material is mixed with one or more additives, described herein, and is spread out on the conveyer belt where the reactive vaterite or PCC in the precipitation material transforms to aragonite and sets and hardens (and ammonium salt gets thermally removed). The hardened material is then cut into desired shapes such as boards or panels described herein. In some embodiments, the wet cake is poured onto a sheet of paper on top of the conveyer belt. Another sheet of paper may be put on top of the wet cake which is then pressed to remove excess water. After the setting and hardening of the precipitation material (vaterite transformation to aragonite), the material is cut into desired shapes, such as, cement siding boards and drywall etc. In some embodiments, the amount of the one or more additives may be optimized depending on the desired time required for the transformation of the vaterite to aragonite (described below). For example, for some applications, it may be desired that the material transform rapidly and in certain other instance, a slow transformation may be desired. In some embodiments, the wet cake may be heated on the conveyer belt to hasten the transformation of the vaterite to aragonite. In some embodiments, the wet cake may be poured in the molds of desired shape and the molds are then heated in the autoclave to hasten the transformation of the vaterite to aragonite (and to remove residual salt). Accordingly, the continuous flow process, batch process or semi-batch process, all are well within the scope of the invention.

In some embodiments, the precipitation material comprising vaterite, once separated from the precipitation reaction, is washed with fresh water, and then placed into a filter press to produce a filter cake with 30-60% solids. This filter cake is then mechanically pressed in a mold, using any convenient means, e.g., a hydraulic press, at adequate pressures, e.g., ranging from 5 to 5000 psi, such as 1000 to 5000 psi, to produce a formed solid, e.g., a rectangular brick. These resultant solids are then cured, e.g., by placing outside and storing, by placing in a chamber wherein they are subjected to high levels of humidity and heat, etc. These resultant cured solids are then used as building materials themselves or crushed to produce aggregate.

In processes involving the use of temperature and pressure, the dewatered precipitate cake may be dried. The cake is then exposed to a combination of rewatering, and elevated temperature and/or pressure for a certain time. The combination of the amount of water added back, the temperature, the pressure, and the time of exposure, as well as the thickness of the cake, can be varied according to composition of the starting material and the desired results.

A number of different ways of exposing the material to temperature and pressure are described herein; it will be appreciated that any convenient method may be used. Thickness and size of the cake may be adjusted as desired; the thickness can vary in some embodiment from 0.05 inch to 5 inches, e.g. 0.1-2 inches, or 0.3-1 inch. In some embodiments the cake may be 0.5 inch to 6 feet or even thicker. The cake is then exposed to elevated temperature and/or pressure for a given time, by any convenient method, for example, in a platen press using heated platens. The heat to elevate the temperature, e.g., for the platens, may be provided, e.g., by heat from an industrial waste gas stream such as a flue gas stream. The temperature may be any suitable temperature; in general, for a thicker cake a higher temperature is desired; examples of temperature ranges are 40-150° C., e.g., 60-120° C., such as 70-110° C., or 80-100° C. Similarly, the pressure may be any suitable pressure to produce the desired results; exemplary pressures include 1000-100,000 pounds per square inch (psi), including 2000-50,000 psi, or 2000-25,000 psi, or 2000-20,000 psi, or 3000-5000 psi. Finally, the time that the cake is pressed may be any suitable time, e.g., 1-100 seconds, or 1-100 minute, or 1-50 minutes, or 2-25 minutes, or 1-10,000 days. The resultant hard tablet may optionally then cured, e.g., by placing outside and storing, by placing in a chamber wherein they are subjected to high levels of humidity and heat, etc. These hard tablets, optionally cured, are then used as building materials themselves or crushed to produce aggregate.

Another method of providing temperature and pressure is the use of a press. A suitable press, e.g., a platen press, may be used to provide pressure at the desired temperature (using heat supplied, e.g., by a flue gas or by other steps of the process to produce a precipitate, e.g., from an electrochemical process) for a desired time. A set of rollers may be used in similar fashion.

Another way to expose the cake to elevated temperature and pressure is by means of an extruder, e.g., a screw-type extruder. The barrel of the extruder can be outfitted to achieve an elevated temperature, e.g., by jacketing; this elevated temperature can be supplied by, e.g., flue gases or the like. Extrusion may be used as a means of pre-heating and drying the feedstock prior to a pressing operation. Such pressing can be performed by means of a compression mold, via rollers, via rollers with shaped indentations (which can provide virtually any shape of aggregate desired), between a belt which provides compression as it travels, or any other convenient method. Alternatively, the extruder may be used to extrude material through a die, exposing the material to pressure as it is forced through the die, and giving any desired shape. In some embodiments, the carbonate precipitate is mixed with fresh water and then placed into the feed section of a rotating screw extruder. The extruder and/or the exit die may be heated to further assist in the process. The turning of the screw conveys the material along its length and compresses it as the flute depth of the screw decreases. The screw and barrel of the extruder may further include vents in the barrel with decompression zones in the screw coincident with the barrel vent openings. Particularly in the case of a heated extruder, these vented areas allow for the release of steam from the conveyed mass, removing water from the material.

The screw conveyed material is then forced through a die section which further compresses the material and shapes it. Typical openings in the die can be circular, oval, square, rectangular, trapezoidal, etc., although any shape which the final aggregate is desired in could be made by adjusting the shape of the opening. The material exiting the die may be cut to any convenient length by any convenient method, such as by a fly knife. Use of a heated die section may further assist in the formation of the product by accelerating the transition of the carbonate mineral to a hard, stable form. Heated dies may also be used in the case of binders to harden or set the binder. Temperatures of 100° C. to 600° C. are commonly used in the heated die section.

In yet other embodiments, the precipitate may be employed for in situ or form-in-place structure fabrication. For example, roads, paved areas, or other structures may be fabricated from the precipitate by applying a layer of precipitate, e.g., as described above, to a substrate, e.g., ground, roadbed, etc., and then hydrating the precipitate, e.g., by allowing it to be exposed to naturally applied water, such as in the form of rain, or by irrigation. Hydration solidifies the precipitate into a desired in situ or form-in-place structure, e.g., road, paved over area, etc. The process may be repeated, e.g., where thicker layers of in-situ formed structures are desired.

In some embodiments, the production of the precipitation material and the products is carried out in the same facility. In some embodiments, the precipitation material is produced in one facility and is transported to another facility to make the end product. The precipitation material may be transported in the slurry form, wet cake form, or dry powder form.

In some embodiments, the resultant dewatered precipitation material obtained from the separation station is dried at the drying station to produce a powder form of the precipitation material comprising stable or reactive vaterite or PCC. Drying may be achieved by air-drying the precipitation material. In certain embodiments, drying is achieved by freeze-drying (i.e., lyophilization), wherein the precipitation material is frozen, the surrounding pressure is reduced, and enough heat is added to allow the frozen water in the precipitation material to sublime directly into gas. In yet another embodiment, the precipitation material is spray-dried to dry the precipitation material, wherein the liquid containing the precipitation material is dried by feeding it through a hot gas (such as the gaseous waste stream from the power plant), and wherein the liquid feed is pumped through an atomizer into a main drying chamber and a hot gas is passed as a co-current or countercurrent to the atomizer direction. Depending on the particular drying protocol of the system, the drying station may include a filtration element, freeze-drying structure, spray-drying structure, etc. In some embodiments, the precipitate may be dried by fluid bed dryer. In certain embodiments, waste heat from a power plant or similar operation may be used to perform the drying step when appropriate. For example, in some embodiments, dry product is produced by the use of elevated temperature (e.g., from power plant waste heat), pressure, or a combination thereof. Following the drying of the precipitation material, the material may be then subjected to heating at elevated temperatures to remove the residual N-containing salts, e.g. residual ammonium salts as described herein.

The resultant supernatant of the precipitation process, or slurry of precipitation material may also be processed as desired. For example, the supernatant or slurry may be returned to the first aqueous solution, or to another location. In some embodiments, the supernatant may be contacted with the gaseous stream comprising $CO_2$ and optionally ammonia gas, as described herein, to sequester additional $CO_2$. For example, in embodiments in which the supernatant is to be returned to the precipitation reactor, the supernatant may be contacted with the gaseous stream of $CO_2$ and optionally ammonia gas in a manner sufficient to increase the concentration of carbonate ion present in the supernatant. As described above, contact may be conducted using any convenient protocol. In some embodiments, the supernatant has an alkaline pH, and contact with the $CO_2$ gas is carried out in a manner sufficient to reduce the pH to a range between pH 5 and 9, pH 6 and 8.5, or pH 7.5 to 8.7.

In some embodiments, the precipitation material produced by methods provided herein, is employed as a building material (e.g., a construction material for some type of man-made structure such as buildings, roads, bridges, dams, and the like), such that $CO_2$ is effectively sequestered in the built environment. Any man made structure, such as foundations, parking structures, houses, office buildings, commercial offices, governmental buildings, infrastructures (e.g., pavements; roads; bridges; overpasses; walls; footings for gates, fences and poles; and the like) is considered a part of the built environment. Mortars find use in binding construction blocks (e.g., bricks) together and filling gaps between construction blocks. Mortars can also be used to fix existing structure (e.g., to replace sections where the original mortar has become compromised or eroded), among other uses.

In some embodiments, the powder form of the precipitation material comprising reactive vaterite is employed as cement, which transforms to aragonite (the dissolution-re-precipitation process) and sets and hardens after combining with water. In some embodiments, the precipitation material comprising reactive vaterite on the surface of the aggregate is transformed to the aragonite (the dissolution-re-precipitation process) after combining with water and binds to the cement that is mixed with it.

In some embodiments, an aggregate itself is produced from the resultant precipitation material. In such embodiments, where the drying process produces particles of the desired size, little if any additional processing is required to produce the aggregate. In yet other embodiments, further processing of the precipitation material is performed in order to produce the desired aggregate. For example, the precipitation material may be combined with fresh water in a manner sufficient to cause the precipitate to form a solid product, where the reactive vaterite converts to aragonite. By controlling the water content of the wet material, the porosity, and eventual strength and density of the final aggregate may be controlled. Typically a wet cake may be 40-60 volume % water. For denser aggregates, the wet cake may be <50% water, for less dense cakes, the wet cake may be >50% water. After hardening, the resultant solid product may then be mechanically processed, e.g., crushed or otherwise broken up and sorted to produce aggregate of the desired characteristics, e.g., size, particular shape, etc. In these processes the setting and mechanical processing steps may be performed in a substantially continuous fashion or at separate times. In certain embodiments, large volumes of precipitate may be stored in the open environment where the precipitate is exposed to the atmosphere. For the setting step, the precipitate may be irrigated in a convenient fashion with fresh water, or allowed to be rained on naturally in order to produce the set product. The set product may then be mechanically processed as described above. Following production of the precipitate, the precipitate is processed to produce the desired aggregate. In some embodiment the precipitate may be left outdoors, where rainwater can be used as the freshwater source, to cause the meteoric water stabilization reaction to occur, hardening the precipitate to form aggregate.

The precipitate or the precipitation material formed in the methods and systems herein after the optional removal of the residual salt comprises vaterite or PCC. The stable vaterite includes vaterite that does not transform to aragonite or calcite during and/or after dissolution-re-precipitation process. The reactive vaterite or activated vaterite includes vaterite that results in aragonite formation during and/or after dissolution-re-precipitation process. In some embodiments, the PCC formed is in vaterite form. In some embodiments, the methods described herein further include contacting the precipitation material (in dried or wet form) with water and transforming the reactive vaterite to aragonite. In some embodiments, the stable vaterite when contacted with water does not transform to aragonite and stays either in the vaterite form or transforms over a long period of time to calcite.

Figure 8:
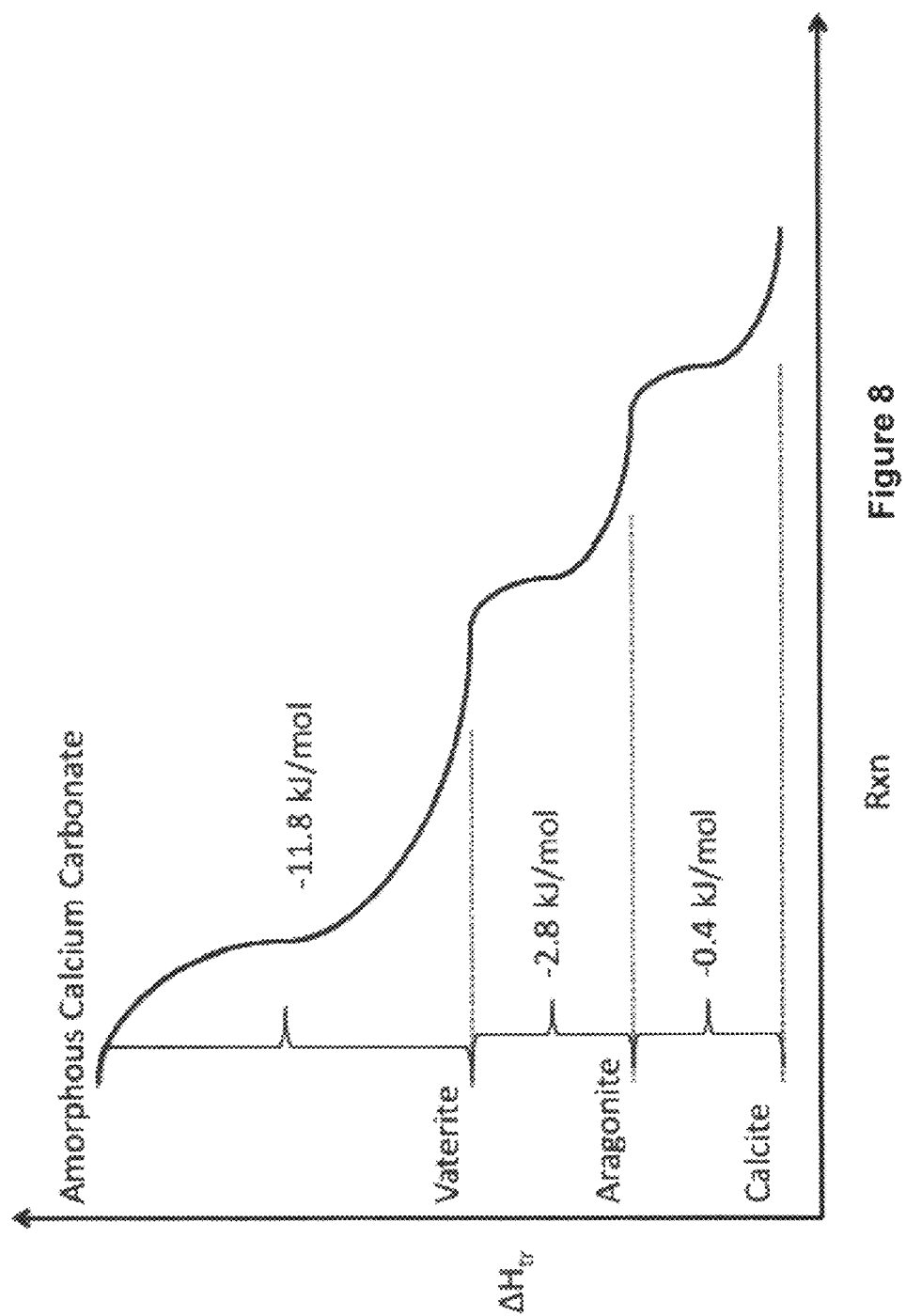
FIG. 8 illustrates a Gibbs free energy diagram of the transition from vaterite to aragonite.

Typically, upon precipitation of the calcium carbonate, amorphous calcium carbonate (ACC) may initially precipitate and transform into one or more of its three more stable phases (vaterite, aragonite, or calcite). A thermodynamic driving force may exist for the transformation from unstable phases to more stable phases. For this reason, calcium carbonate phases transform in the order: ACC to vaterite, aragonite, and calcite where intermediate phases may or may not be present. During this transformation, excesses of energy are released, as exhibited by FIG. 8. This intrinsic energy may be harnessed to create a strong aggregation tendency and surface interactions that may lead to agglomeration and setting or cementing. It is to be understood that the values reported in FIG. 8 are well known in the art and may vary.

The methods and systems provided herein produce or isolate the precipitation material in the vaterite form or in the form of PCC which may be present in vaterite, aragonite, or calcite form. The precipitation material may be in a wet form, slurry form, or a dry powder form. This precipitation material may have a stable vaterite form that does not transform readily to any other polymorph or may have a reactive vaterite form that transforms to aragonite form upon dissolution-re-precipitation. The aragonite form may not convert further to more stable calcite form. The product containing the aragonite form of the precipitate shows one or more unexpected properties, including but not limited to, high compressive strength, high porosity (low density or light weight), neutral pH (useful as artificial reef described below), microstructure network, etc.

Other minor polymorph forms of calcium carbonate that may be present in the carbonate containing precipitation material in addition to vaterite include, but not limited to, amorphous calcium carbonate, aragonite, calcite, a precursor phase of vaterite, a precursor phase of aragonite, an intermediary phase that is less stable than calcite, polymorphic forms in between these polymorphs or combination thereof.

Vaterite may be present in monodisperse or agglomerated form, and may be in spherical, ellipsoidal, plate like shape, or hexagonal system. Vaterite typically has a hexagonal crystal structure and forms polycrystalline spherical particles upon growth. The precursor form of vaterite comprises nanoclusters of vaterite and the precursor form of aragonite comprises sub-micron to nanoclusters of aragonite needles. Aragonite, if present in the composition along with vaterite, may be needle shaped, columnar, or crystals of the rhombic system. Calcite, if present in the composition along with vaterite, may be cubic, spindle, or crystals of hexagonal system. An intermediary phase that is less stable than calcite may be a phase that is between vaterite and calcite, a phase between precursor of vaterite and calcite, a phase between aragonite and calcite, and/or a phase between precursor of aragonite and calcite.

The transformation between calcium carbonate polymorphs may occur via solid-state transition, may be solution mediated, or both. In some embodiments, the transformation is solution-mediated as it may require less energy than the thermally activated solid-state transition. Vaterite is metastable and the difference in thermodynamic stability of calcium carbonate polymorphs may be manifested as a difference in solubility, where the least stable phases are the most soluble. Therefore, vaterite may dissolve readily in solution and transform favorably towards a more stable polymorph, such as aragonite. In a polymorphic system like calcium carbonate, two kinetic processes may exist simultaneously in solution: dissolution of the metastable phase and growth of the stable phase. In some embodiments, the aragonite crystals may be growing while vaterite is undergoing dissolution in the aqueous medium.

In one aspect, the reactive vaterite may be activated such that the reactive vaterite leads to aragonitic pathway and not calcite pathway during dissolution-re-precipitation process. In some embodiments, the reactive vaterite containing composition is activated in such a way that after the dissolution-re-precipitation process, the aragonite formation is enhanced and the calcite formation is suppressed. The activation of the reactive vaterite containing composition may result in control over the aragonite formation and crystal growth. The activation of the vaterite containing composition may be achieved by various processes. Various examples of the activation of vaterite, such as, but not limited to, nuclei activation, thermal activation, mechanical activation, chemical activation, or combination thereof, are described herein. In some embodiments, the vaterite is activated through various processes such that aragonite formation and its morphology and/or crystal growth can be controlled upon reaction of vaterite containing composition with water. The aragonite formed results in higher tensile strength and fracture tolerance to the products formed from the reactive vaterite.

In some embodiments, the reactive vaterite may be activated by mechanical means, as described herein. For example, the reactive vaterite containing compositions may be activated by creating surface defects on the vaterite composition such that the aragonite formation is accelerated. In some embodiments, the activated vaterite is a ball-milled reactive vaterite or is a reactive vaterite with surface defects such that aragonite formation pathway is facilitated.

The reactive vaterite containing compositions may also be activated by providing chemical or nuclei activation to the vaterite composition. Such chemical or nuclei activation may be provided by one or more of aragonite seeds, inorganic additive, or organic additive. The aragonite seed present in the compositions provided herein may be obtained from natural or synthetic sources. The natural sources include, but not limited to, reef sand, lime, hard skeletal material of certain fresh-water and marine invertebrate organisms, including pelecypods, gastropods, mollusk shell, and calcareous endoskeleton of warm- and cold-water corals, pearls, rocks, sediments, ore minerals (e.g., serpentine), and the like. The synthetic sources include, but not limited to, precipitated aragonite, such as formed from sodium carbonate and calcium chloride; or aragonite formed by the transformation of vaterite to aragonite, such as transformed vaterite described herein.

In some embodiments, the inorganic additive or the organic additive in the compositions provided herein can be any additive that activates reactive vaterite. Some examples of inorganic additive or organic additive in the compositions provided herein, include, but not limited to, sodium decyl sulfate, lauric acid, sodium salt of lauric acid, urea, citric acid, sodium salt of citric acid, phthalic acid, sodium salt of phthalic acid, taurine, creatine, dextrose, poly(n-vinyl-1-pyrrolidone), aspartic acid, sodium salt of aspartic acid, magnesium chloride, acetic acid, sodium salt of acetic acid, glutamic acid, sodium salt of glutamic acid, strontium chloride, gypsum, lithium chloride, sodium chloride, glycine, sodium citrate dehydrate, sodium bicarbonate, magnesium sulfate, magnesium acetate, sodium polystyrene, sodium dodecylsulfonate, poly-vinyl alcohol, or combination thereof. In some embodiments, inorganic additive or organic additive in the compositions provided herein, include, but not limited to, taurine, creatine, poly(n-vinyl-1-pyrrolidone), lauric acid, sodium salt of lauric acid, urea, magnesium chloride, acetic acid, sodium salt of acetic acid, strontium chloride, magnesium sulfate, magnesium acetate, or combination thereof. In some embodiments, inorganic additive or organic additive in the compositions provided herein, include, but not limited to, magnesium chloride, magnesium sulfate, magnesium acetate, or combination thereof.

Without being limited by any theory, it is contemplated that the activation of vaterite by ball-milling or by addition of aragonite seed, inorganic additive or organic additive or combination thereof may result in control of formation of aragonite during dissolution-re-precipitation process of the activated reactive vaterite including control of properties, such as, but not limited to, polymorph, morphology, particle size, cross-linking, agglomeration, coagulation, aggregation, sedimentation, crystallography, inhibiting growth along a certain face of a crystal, allowing growth along a certain face of a crystal, or combination thereof. For example, the aragonite seed, inorganic additive or organic additive may selectively target the morphology of aragonite, inhibit calcite growth and promote the formation of aragonite that may generally not be favorable kinetically.

In some embodiments, one or more inorganic additives may be added to facilitate transformation of vaterite to aragonite. The one or more additives may be added during any step of the process. For example, the one or more additives may be added during contact of the first aqueous solution comprising calcium salt with carbon dioxide gas and optionally ammonia gas or the second aqueous solution; after contact of the first aqueous solution comprising calcium salt with carbon dioxide gas and optionally ammonia gas or the second aqueous solution; during precipitation of the precipitation material, after precipitation of the precipitation material in the slurry, in the slurry after the dewatering of the precipitation material, in the powder after the drying of the slurry, in the aqueous solution to be mixed with the powder precipitation material, or in the slurry made from the powdered precipitation material with water, or any combination thereof. In some embodiments, the water used in the process of making the precipitation material may already contain the one or more additives or the one or more additive ions. For example, if sea water is used in the process, then the additive ion may already be present in the sea water.

In some embodiments, in the foregoing methods, the amount of the one or more additives added during the process is more than 0.1% by weight, or more than 0.5% by weight, or more than 1% by weight, or more than 1.5% by weight, or more than 1.6% by weight, or more than 1.7% by weight, or more than 1.8% by weight, or more than 1.9% by weight, or more than 2% by weight, or more than 2.1% by weight, or more than 2.2% by weight, or more than 2.3% by weight, or more than 2.4% by weight, or more than 2.5% by weight, or more than 2.6% by weight, or more than 2.7% by weight, or more than 2.8% by weight, or more than 2.9% by weight, or more than 3% by weight, or more than 3.5% by weight, or more than 4% by weight, or more than 4.5% by weight, or more than 5% by weight, or between 0.5-5% by weight, or between 0.5-4% by weight, or between 0.5-3% by weight, or 0.5-2% by weight, or 0.5-1% by weight, or 1-3% by weight, or 1-2.5% by weight, or 1-2% by weight, or 1.5-2.5% by weight, or 2-3% by weight, or 2.5-3% by weight, or 0.5% by weight, or 1% by weight, or 1.5% by weight, or 2% by weight, or 2.5% by weight, or 3% by weight, or 3.5% by weight, or 4% by weight, or 4.5% by weight, or 5% by weight. In some embodiments, in the foregoing methods, the amount of the one or more additives added during the process is between 0.5-3% by weight or between 1.5-2.5% by weight.

In some embodiments, the precipitation material is in a powder form. In some embodiments, the precipitation material is in a dry powder form. In some embodiments, the precipitation material is disordered or is not in an ordered array or is in the powdered form. In still some embodiments, the precipitation material is in a partially or wholly hydrated form. In still some embodiments, the precipitation material is in saltwater or fresh water. In still some embodiments, the precipitation material is in water containing sodium chloride. In still some embodiments, the precipitation material is in water containing alkaline earth metal ions, such as, but are not limited to, calcium, magnesium, etc. In some embodiments, the precipitation material is non-medical or is not for medical procedures.

The products made from the compositions or the precipitation material provided herein show one or more properties, such as, high compressive strength, high durability, high porosity (light weight), high flexural strength, and less maintenance costs. In some embodiments, the compositions or the precipitation material comprising reactive vaterite upon combination with water, setting, and hardening, have a compressive strength of at least 3 MPa (megapascal), or at least 7 MPa, or at least 10 MPa or in some embodiments, between 3-30 MPa, or between 14-80 MPa or 14-35 MPa.

In some embodiments of the foregoing aspects and embodiments, the composition or the precipitation material includes at least 10% w/w vaterite; or at least 20% w/w vaterite; or at least 30% w/w vaterite; or at least 40% w/w vaterite; or at least 50% w/w vaterite; or at least 60% w/w vaterite; or at least 70% w/w vaterite; or at least 80% w/w vaterite; or at least 90% w/w vaterite; or at least 95% w/w vaterite; or at least 99% w/w vaterite; or from 10% w/w to 99% w/w vaterite; or from 10% w/w to 90% w/w vaterite; or from 10% w/w to 80% w/w vaterite; or from 10% w/w to 70% w/w vaterite; or from 10% w/w to 60% w/w vaterite; or from 10% w/w to 50% w/w vaterite; or from 10% w/w to 40% w/w vaterite; or from 10% w/w to 30% w/w vaterite; or from 10% w/w to 20% w/w vaterite; or from 20% w/w to 99% w/w vaterite; or from 20% w/w to 95% w/w vaterite; or from 20% w/w to 90% w/w vaterite; or from 20% w/w to 75% w/w vaterite; or from 20% w/w to 50% w/w vaterite; or from 30% w/w to 99% w/w vaterite; or from 30% w/w to 95% w/w vaterite; or from 30% w/w to 90% w/w vaterite; or from 30% w/w to 75% w/w vaterite; or from 30% w/w to 50% w/w vaterite; or from 40% w/w to 99% w/w vaterite; or from 40% w/w to 95% w/w vaterite; or from 40% w/w to 90% w/w vaterite; or from 40% w/w to 75% w/w vaterite; or from 50% w/w to 99% w/w vaterite; or from 50% w/w to 95% w/w vaterite; or from 50% w/w to 90% w/w vaterite; or from 50% w/w to 75% w/w vaterite; or from 60% w/w to 99% w/w vaterite; or from 60% w/w to 95% w/w vaterite; or from 60% w/w to 90% w/w vaterite; or from 70% w/w to 99% w/w vaterite; or from 70% w/w to 95% w/w vaterite; or from 70% w/w to 90% w/w vaterite; or from 80% w/w to 99% w/w vaterite; or from 80% w/w to 95% w/w vaterite; or from 80% w/w to 90% w/w vaterite; or from 90% w/w to 99% w/w vaterite; or 10% w/w vaterite; or 20% w/w vaterite; or 30% w/w vaterite; or 40% w/w vaterite; or 50% w/w vaterite; or 60% w/w vaterite; or 70% w/w vaterite; or 75% w/w vaterite; or 80% w/w vaterite; or 85% w/w vaterite; or 90% w/w vaterite; or 95% w/w vaterite; or 99% w/w vaterite. The vatreite may be stable vaterite or reactive vaterite or PCC.

In some embodiments of the foregoing aspects and the foregoing embodiments, the precipitation material comprising reactive vaterite after combination with water, setting, and hardening (i.e. transformation to aragonite) or the stable vaterite mixed with cement and water and after setting and hardening, has a compressive strength of at least 3 MPa; at least 7 MPa; at least 14 MPa; or at least 16 MPa; or at least 18 MPa; or at least 20 MPa; or at least 25 MPa; or at least 30 MPa; or at least 35 MPa; or at least 40 MPa; or at least 45 MPa; or at least 50 MPa; or at least 55 MPa; or at least 60 MPa; or at least 65 MPa; or at least 70 MPa; or at least 75 MPa; or at least 80 MPa; or at least 85 MPa; or at least 90 MPa; or at least 95 MPa; or at least 100 MPa; or from 3-50 MPa; or from 3-25 MPa; or from 3-15 MPa; or from 3-10 MPa; or from 14-25 MPa; or from 14-100 MPa; or from 14-80 MPa; or from 14-75 MPa; or from 14-50 MPa; or from 14-25 MPa; or from 17-35 MPa; or from 17-25 MPa; or from 20-100 MPa; or from 20-75 MPa; or from 20-50 MPa; or from 20-40 MPa; or from 30-90 MPa; or from 30-75 MPa; or from 30-60 MPa; or from 40-90 MPa; or from 40-75 MPa; or from 50-90 MPa; or from 50-75 MPa; or from 60-90 MPa; or from 60-75 MPa; or from 70-90 MPa; or from 70-80 MPa; or from 70-75 MPa; or from 80-100 MPa; or from 90-100 MPa; or from 90-95 MPa; or 14 MPa; or 3 MPa; or 7 MPa; or 16 MPa; or 18 MPa; or 20 MPa; or 25 MPa; or 30 MPa; or 35 MPa; or 40 MPa; or 45 MPa. For example, in some embodiments of the foregoing aspects and the foregoing embodiments, the composition or the precipitation material after setting, and hardening has a compressive strength of 3 MPa to 25 MPa; or 14 MPa to 40 MPa; or 17 MPa to 40 MPa; or 20 MPa to 40 MPa; or 30 MPa to 40 MPa; or 35 MPa to 40 MPa. In some embodiments, the compressive strengths described herein are the compressive strengths after 1 day, or 3 days, or 7 days, or 28 days, or 56 days, or longer.

In some embodiments, the precipitation material comprising vaterite (stable or reactive) or PCC is a particulate composition with an average particle size of 0.1-100 microns. The average particle size (or average particle diameter) may be determined using any conventional particle size determination method, such as, but not limited to, multi-detector laser scattering or laser diffraction or sieving. In certain embodiments, unimodel or multimodal, e.g., bimodal or other, distributions are present. Bimodal distributions may allow the surface area to be minimized, thus allowing a lower liquids/solids mass ratio when composition is mixed with water yet providing smaller reactive particles for early reaction. In some embodiments, the composition or the precipitation material comprising vaterite (stable or reactive) or PCC provided herein is a particulate composition with an average particle size of 0.1-1000 microns; or 0.1-500 microns; or 0.1-100 microns; or 0.1-50 microns; or 0.1-20 microns; or 0.1-10 microns; or 0.1-5 microns; or 1-50 microns; or 1-25 microns; or 1-20 microns; or 1-10 microns; or 1-5 microns; or 5-70 microns; or 5-50 microns; or 5-20 microns; or 5-10 microns; or 10-100 microns; or 10-50 microns; or 10-20 microns; or 10-15 microns; or 15-50 microns; or 15-30 microns; or 15-20 microns; or 20-50 microns; or 20-30 microns; or 30-50 microns; or 40-50 microns; or 50-100 microns; or 50-60 microns; or 60-100 microns; or 60-70 microns; or 70-100 microns; or 70-80 microns; or 80-100 microns; or 80-90 microns; or 0.1 microns; or 0.5 microns; or 1 microns; or 2 microns; or 3 microns; or 4 microns; or 5 microns; or 8 microns; or 10 microns; or 15 microns; or 20 microns; or 30 microns; or 40 microns; or 50 microns; or 60 microns; or 70 microns; or 80 microns; or 100 microns. For example, in some embodiments, the composition or the precipitation material comprising vaterite (stable or reactive) or PCC provided herein is a particulate composition with an average particle size of 0.1-20 micron; or 0.1-15 micron; or 0.1-10 micron; or 0.1-8 micron; or 0.1-5 micron; or 1-25 micron; or 1-20 micron; or 1-15 micron; or 1-10 micron; or 1-5 micron; or 5-20 micron; or 5-10 micron. In some embodiments, the composition or the precipitation material comprising vaterite (stable or reactive) or PCC includes two or more, or three or more, or four or more, or five or more, or ten or more, or 20 or more, or 3-20, or 4-10 different sizes of the particles in the composition or the precipitation material. For example, the composition or the precipitation material may include two or more, or three or more, or between 3-20 particles ranging from 0.1-10 micron, 10-50 micron, 50-100 micron, 100-200 micron, 200-500 micron, 500-1000 micron, and/or sub-micron sizes of the particles. In some embodiments, the PCC in the precipitation material may have average particle size below 0.1 micron, such as between 0.001 micron to 1 micron or more. In some embodiments, the PCC may be in nanometer particle size.

In some embodiments, the composition or the precipitation material comprising vaterite (stable or reactive) or PCC may further include OPC or Portland cement clinker. The amount of Portland cement component may vary and range from 10 to 95% w/w; or 10 to 90% w/w; or 10 to 80% w/w; or 10 to 70% w/w; or 10 to 60% w/w; or 10 to 50% w/w; or 10 to 40% w/w; or 10 to 30% w/w; or 10 to 20% w/w; or 20 to 90% w/w; or 20 to 80% w/w; or 20 to 70% w/w; or 20 to 60% w/w; or 20 to 50% w/w; or 20 to 40% w/w; or 20 to 30% w/w; or 30 to 90% w/w; or 30 to 80% w/w; or 30 to 70% w/w; or 30 to 60% w/w; or 30 to 50% w/w; or 30 to 40% w/w; or 40 to 90% w/w; or 40 to 80% w/w; or 40 to 70% w/w; or 40 to 60% w/w; or 40 to 50% w/w; or 50 to 90% w/w; or 50 to 80% w/w; or 50 to 70% w/w; or 50 to 60% w/w; or 60 to 90% w/w; or 60 to 80% w/w; or 60 to 70% w/w; or 70 to 90% w/w; or 70 to 80% w/w. For example, the composition or the precipitation material comprising vaterite (stable or reactive) or PCC may include a blend of 75% OPC and 25% composition; or 80% OPC and 20% composition; or 85% OPC and 15% composition; or 90% OPC and 10% composition; or 95% OPC and 5% composition.

In certain embodiments, the composition or the precipitation material comprising vaterite (stable or reactive) or PCC may further include an aggregate. Aggregate may be included in the composition or the precipitation material to provide for mortars which include fine aggregate and concretes which also include coarse aggregate. The fine aggregates are materials that almost entirely pass through a Number 4 sieve (ASTM C 125 and ASTM C 33), such as silica sand. The coarse aggregate are materials that are predominantly retained on a Number 4 sieve (ASTM C 125 and ASTM C 33), such as silica, quartz, crushed round marble, glass spheres, granite, lime, calcite, feldspar, alluvial sands, sands or any other durable aggregate, and mixtures thereof. As such, the aggregate is used broadly to refer to a number of different types of both coarse and fine particulate material, including, but are not limited to, sand, gravel, crushed stone, slag, and recycled concrete. In some embodiments, the aggregate added to the precipitation material is the activated aggregate which has been activated on the surface by the precipitation material (this embodiment has been described earlier herein). The amount and nature of the aggregate may vary widely. In some embodiments, the amount of aggregate may range from 25 to 80%, such as 40 to 70% and including 50 to 70% w/w of the total composition made up of both the composition and the aggregate.

In some embodiments, the composition or the precipitation material comprising reactive vaterite, as prepared by the methods described above, sets and hardens after treatment with the aqueous medium under one or more suitable conditions. The aqueous medium includes, but is not limited to, fresh water optionally containing additives or brine. In some embodiments, the one or more suitable conditions include, but are not limited to, temperature, pressure, time period for setting, a ratio of the aqueous medium to the composition, and combination thereof. The temperature may be related to the temperature of the aqueous medium. In some embodiments, the temperature is in a range of 0-110° C.; or 0-80° C.; or 0-60° C.; or 0-40° C.; or 25-100° C.; or 25-75° C.; or 25-50° C.; or 37-100° C.; or 37-60° C.; or 40-100° C.; or 40-60° C.; or 50-100° C.; or 50-80° C.; or 60-100° C.; or 60-80° C.; or 80-100° C. In some embodiments, the pressure is atmospheric pressure or above atm. pressure. In some embodiments, the time period for setting the cement product is 30 min. to 48 hrs; or 30 min. to 24 hrs; or 30 min. to 12 hrs; or 30 min. to 8 hrs; or 30 min. to 4 hrs; or 30 min. to 2 hrs; 2 to 48 hrs; or 2 to 24 hrs; or 2 to 12 hrs; or 2 to 8 hrs; or 2 to 4 hrs; 5 to 48 hrs; or 5 to 24 hrs; or 5 to 12 hrs; or 5 to 8 hrs; or 5 to 4 hrs; or 5 to 2 hrs; 10 to 48 hrs; or 10 to 24 hrs; or 24 to 48 hrs.

During the mixing of the composition or the precipitation material with the aqueous medium, the precipitate may be subjected to high shear mixer. After mixing, the precipitate may be dewatered again and placed in pre-formed molds to make formed building materials or may be used to make formed building materials using the processes well known in the art or as described herein. Alternatively, the precipitate may be mixed with water and may be allowed to set. The precipitate may set over a period of days and may be then placed in the oven for drying, e.g., at 40° C., or from 40° C.-60° C., or from 40° C.-50° C., or from 40° C.-100° C., or from 50° C.-60° C., or from 50° C.-80° C., or from 50° C.-100° C., or from 60° C.-80° C., or from 60° C.-100° C. The precipitate may be subjected to curing at high temperature, such as, from 50° C.-60° C., or from 50° C.-80° C., or from 50° C.-100° C., or from 60° C.-80° C., or from 60° C.-100° C., or 60° C., or 80° C.-100° C., in high humidity, such as, in 30%, or 40%, or 50%, or 60% humidity.

The product produced by the methods described herein may be an aggregate or building material or a pre-cast material or a formed building material. In some embodiments, the product produced by the methods described herein includes non-cementitous materials such as paper, paint, PVC etc. In some embodiments, the product produced by the methods described herein includes artificial reefs. These products have been described herein.

In some embodiments, the precipitation material comprising vaterite (stable or reactive) or PCC in wet or dried form, may be mixed with one or more admixtures to impart one or more properties to the product including, but not limited to, strength, flexural strength, compressive strength, porosity, thermal conductivity, etc. The amount of admixture that is employed may vary depending on the nature of the admixture. In some embodiments, the amount of the one or more admixtures range from 1 to 50% w/w, such as 1-30% w/w, or 1-25% w/w, or 1-20% w/w/, or 2 to 10% w/w. Examples of the admixtures include, but not limited to, set accelerators, set retarders, air-entraining agents, foaming agents, defoamers, alkali-reactivity reducers, bonding admixtures, dispersants, coloring admixtures, corrosion inhibitors, damp-proofing admixtures, gas formers, permeability reducers, pumping aids, shrinkage compensation admixtures, fungicidal admixtures, germicidal admixtures, insecticidal admixtures, rheology modifying agents, finely divided mineral admixtures, pozzolans, aggregates, wetting agents, strength enhancing agents, water repellents, reinforced material such as fibers, and any other admixture. When using an admixture, the composition or the precipitation material, to which the admixture raw materials are introduced, is mixed for sufficient time to cause the admixture raw materials to be dispersed relatively uniformly throughout the composition.

Set accelerators may be used to accelerate the setting and early strength development of cement. Examples of set accelerators that may be used include, but are not limited to, POZZOLITH®NC534, non-chloride type set accelerator and/or RHEOCRETE®CNI calcium nitrite-based corrosion inhibitor, both sold under the above trademarks by BASF Admixtures Inc. of Cleveland, Ohio. Set retarding, also known as delayed-setting or hydration control, admixtures are used to retard, delay, or slow the rate of setting of cement. Most set retarders may also act as low level water reducers and can also be used to entrain some air into product. An example of a retarder is DELVO® by BASF Admixtures Inc. of Cleveland, Ohio. The air entrainer includes any substance that will entrain air in the compositions. Some air entrainers can also reduce the surface tension of a composition at low concentration. Air-entraining admixtures are used to purposely entrain microscopic air bubbles into cement. Air entrainment may increase the workability of the mix while eliminating or reducing segregation and bleeding. Materials used to achieve these desired effects can be selected from wood resin, natural resin, synthetic resin, sulfonated lignin, petroleum acids, proteinaceous material, fatty acids, resinous acids, alkylbenzene sulfonates, sulfonated hydrocarbons, vinsol resin, anionic surfactants, cationic surfactants, nonionic surfactants, natural rosin, synthetic rosin, an inorganic air entrainer, synthetic detergents, and their corresponding salts, and mixtures thereof. Air entrainers are added in an amount to yield a desired level of air in a cementitious composition. Examples of air entrainers that can be utilized in the admixture system include, but are not limited to MB AE 90, MB VR and MICRO AIR®, all available from BASF Admixtures Inc. of Cleveland, Ohio.

In some embodiments, the precipitation material is mixed with foaming agent. The foaming agents incorporate large quantities of air voids/porosity and facilitate reduction of the material's density. Examples of foaming agents include, but not limited to, soap, detergent (alkyl ether sulfate), Millifoam™ (alkyl ether sulfate), Cedepal™ (ammonium alkyl ethoxy sulfate), Witcolate™ 12760, and the like.

Also of interest as admixtures are defoamers. Defoamers are used to decrease the air content in the cementitious composition. Also of interest as admixtures are dispersants. The dispersant includes, but is not limited to, polycarboxylate dispersants, with or without polyether units. The term dispersant is also meant to include those chemicals that also function as a plasticizer, water reducer such as a high range water reducer, fluidizer, antiflocculating agent, or superplasticizer for compositions, such as lignosulfonates, salts of sulfonated naphthalene sulfonate condensates, salts of sulfonated melamine sulfonate condensates, beta naphthalene sulfonates, sulfonated melamine formaldehyde condensates, naphthalene sulfonate formaldehyde condensate resins for example LOMAR D® dispersant (Cognis Inc., Cincinnati, Ohio), polyaspartates, or oligomeric dispersants. Polycarboxylate dispersants can be used, by which is meant a dispersant having a carbon backbone with pendant side chains, wherein at least a portion of the side chains are attached to the backbone through a carboxyl group or an ether group.

Natural and synthetic admixtures may be used to color the product for aesthetic and safety reasons. These coloring admixtures may be composed of pigments and include carbon black, iron oxide, phthalocyanine, umber, chromium oxide, titanium oxide, cobalt blue, and organic coloring agents. Also of interest as admixtures are corrosion inhibitors. Corrosion inhibitors may serve to protect embedded reinforcing steel from corrosion. The materials commonly used to inhibit corrosion are calcium nitrite, sodium nitrite, sodium benzoate, certain phosphates or fluorosilicates, fluoroaluminites, amines and related chemicals. Also of interest are damp-proofing admixtures. Damp-proofing admixtures reduce the permeability of the product that has low cement contents, high water-cement ratios, or a deficiency of fines in the aggregate. These admixtures retard moisture penetration into dry products and include certain soaps, stearates, and petroleum products. Also of interest are gas former admixtures. Gas formers, or gas-forming agents, are sometimes added to the mix to cause a slight expansion prior to hardening. The amount of expansion is dependent upon the amount of gas-forming material used and the temperature of the fresh mixture. Aluminum powder, resin soap and vegetable or animal glue, saponin or hydrolyzed protein can be used as gas formers. Also of interest are permeability reducers. Permeability reducers may be used to reduce the rate at which water under pressure is transmitted through the mix. Silica fume, fly ash, ground slag, natural pozzolans, water reducers, and latex may be employed to decrease the permeability of the mix.

Also of interest are rheology modifying agent admixtures. Rheology modifying agents may be used to increase the viscosity of the compositions. Suitable examples of rheology modifier include firmed silica, colloidal silica, hydroxyethyl cellulose, starch, hydroxypropyl cellulose, fly ash (as defined in ASTM C618), mineral oils (such as light naphthenic), clay such as hectorite clay, polyoxyalkylenes, polysaccharides, natural gums, or mixtures thereof. Some of the mineral extenders such as, but not limited to, sepiolite clay are rheology modifying agents.

Also of interest are shrinkage compensation admixtures. TETRAGUARD® is an example of a shrinkage reducing agent and is available from BASF Admixtures Inc. of Cleveland, Ohio. Bacterial and fungal growth on or in hardened product may be partially controlled through the use of fungicidal and germicidal admixtures. The materials for these purposes include, but are not limited to, polyhalogenated phenols, dialdrin emulsions, and copper compounds. Also of interest in some embodiments is workability improving admixtures. Entrained air, which acts like a lubricant, can be used as a workability improving agent. Other workability agents are water reducers and certain finely divided admixtures.

In some embodiments, the composition or the precipitation material comprising vaterite (stable or reactive) or PCC is employed with reinforced material such as fibers, e.g., where fiber-reinforced product is desirable. Fibers can be made of zirconia containing materials, aluminum, glass, steel, carbon, ceramic, grass, bamboo, wood, fiberglass, or synthetic materials, e.g., polypropylene, polycarbonate, polyvinyl chloride, polyvinyl alcohol, nylon, polyethylene, polyester, rayon, high-strength aramid, (i.e. Kevlar®), or mixtures thereof. The reinforced material is described in U.S. patent application Ser. No. 13/560,246, filed Jul. 27, 2012, which is incorporated herein in its entirety in the present disclosure.

The components of the precipitation material comprising vaterite (stable or reactive) or PCC can be combined using any suitable protocol. Each material may be mixed at the time of work, or part of or all of the materials may be mixed in advance. Alternatively, some of the materials are mixed with water with or without admixtures, such as high-range water-reducing admixtures, and then the remaining materials may be mixed therewith. As a mixing apparatus, any conventional apparatus can be used. For example, Hobart mixer, slant cylinder mixer, Omni Mixer, Henschel mixer, V-type mixer, and Nauta mixer can be employed.

In one aspect, there are provided systems to form calcium carbonate comprising vaterite, comprising (i) a dissolution reactor configured for dissolving lime in an aqueous base solution under one or more precipitation conditions to produce a precipitation material comprising calcium carbonate and a supernatant solution, wherein the calcium carbonate comprises vaterite.

In one aspect, there are provided systems to form calcium carbonate comprising vaterite, comprising (i) a calcination reactor configured for calcining limestone to form lime and a gaseous stream of carbon dioxide; (ii) a dissolution reactor configured for dissolving the lime in an aqueous base solution under one or more dissolution conditions to produce a first aqueous solution comprising calcium salt, and a gaseous stream comprising ammonia; and (iii) a treatment reactor configured for treating the first aqueous solution comprising calcium salt with the gaseous stream comprising carbon dioxide and the gaseous stream comprising ammonia under one or more precipitation conditions to form a precipitation material comprising calcium carbonate and a supernatant solution, wherein the calcium carbonate comprises vaterite.

In one aspect, there are provided systems to form calcium carbonate comprising vaterite, comprising (i) a calcination reactor configured for calcining limestone to lime and a gaseous stream of carbon dioxide; (ii) a dissolution reactor configured for dissolving the lime in an aqueous N-containing inorganic salt solution under one or more dissolution conditions to produce a first aqueous solution comprising calcium salt, and a gaseous stream comprising ammonia;

and (iii) a treatment reactor configured for treating the first aqueous solution comprising calcium salt with the gaseous stream comprising carbon dioxide and the gaseous stream comprising ammonia under one or more precipitation conditions to form a precipitation material comprising calcium carbonate and a supernatant solution, wherein the calcium carbonate comprises vaterite.

In one aspect, there are provided systems to form calcium carbonate comprising vaterite, comprising (i) a calcination reactor configured for calcining limestone to lime and a gaseous stream of carbon dioxide; (ii) a dissolution reactor configured for dissolving the lime in an aqueous N-containing inorganic salt solution under one or more dissolution conditions to produce a first aqueous solution comprising calcium salt, and a gaseous stream comprising ammonia; (iii) a cooling reactor configured for recovering the gaseous stream comprising carbon dioxide and the gaseous stream comprising ammonia and subjecting the gaseous stream to a cooling process under one or more cooling conditions to condense a second aqueous solution comprising ammonium bicarbonate, ammonium carbonate, ammonia, ammonia carbamate, or combinations thereof; and (iv) a treatment reactor configured for treating the first aqueous solution comprising calcium salt with the second aqueous solution comprising ammonium bicarbonate, ammonium carbonate, ammonia, ammonium carbamate or combinations thereof under one or more precipitation conditions to form a precipitation material comprising calcium carbonate and a supernatant solution, wherein the calcium carbonate comprises vaterite. In some embodiments of the aforementioned aspect, the vaterite is stable vaterite, reactive vaterite or PCC. In some embodiments of the aforementioned aspect and embodiments, the dissolution reactor is integrated with the cooling reactor (as illustrated in FIGS. 4-7 and described herein).

In some embodiments of the aforementioned aspects and embodiments, the system further comprises a recovering system to recover the base from the aqueous solution to be recycled back to the dissolution reactor. The recovering system is the system configured to carry out thermal decomposition, reverse osmosis, multi-stage flash, multi-effect distillation, vapor recompression, distillation, and combinations thereof, as described herein above.

The methods and systems provided herein may be carried out at land (e.g., at a location close to the limestone quarry, or is easily and economically transported in), at sea, or in the ocean. In some embodiments, the cement plants calcining the lime may be retro-fitted with the systems described herein to form the precipitation material and further to form products from the precipitation material.

Aspects include systems, including processing plants or factories, for practicing the methods as described herein. Systems may have any configuration that enables practice of the particular production method of interest.

In certain embodiments, the systems include a source of lime and a structure having an input for the aqueous base solution. For example, the systems may include a pipeline or analogous feed of aqueous base solution, wherein the aqueous base solution is as described herein. The system further includes an input for $CO_2$ as well as components for combining these sources with water (optionally an aqueous solution such as water, brine or seawater) before the precipitation reactor or in the precipitation reactor. In some embodiments, the gas-liquid contactor is configured to contact enough $CO_2$ to produce the precipitation material in excess of 1, 10, 100, 1,000, or 10,000 tons per day.

The systems further include a precipitation reactor that subjects the water introduced to the precipitation reactor to the one or more precipitation conditions (as described herein) and produces precipitation material and supernatant. In some embodiments, the precipitation reactor is configured to hold water sufficient to produce the precipitation material in excess of 1, 10, 100, 1,000, or 10,000 tons per day. The precipitation reactor may also be configured to include any of a number of different elements such as temperature modulation elements (e.g., configured to heat the water to a desired temperature), chemical additive elements (e.g., configured for introducing additives etc. into the precipitation reaction mixture), computer automation, and the like.

The gaseous waste stream comprising $CO_2$ and optionally $NH_3$ may be provided to the precipitation reactor and/or the cooling reactor in any convenient manner. In some embodiments, the gaseous waste stream is provided with a gas conveyer (e.g., a duct) that runs from the dissolution reactor to the precipitation reactor and/or the cooling reactor.

Where the water source that is processed by the system to produce the precipitation material is seawater, the input is in fluid communication with a source of sea water, e.g., such as where the input is a pipeline or feed from ocean water to a land based system or a inlet port in the hull of ship, e.g., where the system is part of a ship, e.g., in an ocean based system.

The methods and systems may also include one or more detectors configured for monitoring the aqueous base solution, the lime, and/or the carbon dioxide (not illustrated in figures). Monitoring may include, but is not limited to, collecting data about the pressure, temperature and composition of the water or the carbon dioxide gas. The detectors may be any convenient device configured to monitor, for example, pressure sensors (e.g., electromagnetic pressure sensors, potentiometric pressure sensors, etc.), temperature sensors (resistance temperature detectors, thermocouples, gas thermometers, thermistors, pyrometers, infrared radiation sensors, etc.), volume sensors (e.g., geophysical diffraction tomography, X-ray tomography, hydroacoustic surveyers, etc.), and devices for determining chemical makeup of the water or the carbon dioxide gas (e.g, IR spectrometer, NMR spectrometer, UV-vis spectrophotometer, high performance liquid chromatographs, inductively coupled plasma emission spectrometers, inductively coupled plasma mass spectrometers, ion chromatographs, X-ray diffractometers, gas chromatographs, gas chromatography-mass spectrometers, flow-injection analysis, scintillation counters, acidimetric titration, and flame emission spectrometers, etc.).

In some embodiments, detectors may also include a computer interface which is configured to provide a user with the collected data about the aqueous base solution, the lime, and/or the carbon dioxide/ammonia gas. In some embodiments, the summary may be stored as a computer readable data file or may be printed out as a user readable document.

In some embodiments, the detector may be a monitoring device such that it can collect real-time data (e.g., internal pressure, temperature, etc.). In other embodiments, the detector may be one or more detectors configured to determine the parameters of the aqueous base solution, the lime, and/or the carbon dioxide gas at regular intervals, e.g., determining the composition every 1 minute, every 5 minutes, every 10 minutes, every 30 minutes, every 60 minutes, every 100 minutes, every 200 minutes, every 500 minutes, or some other interval.

In certain embodiments, the system may further include a station for preparing a building material, such as cement or aggregate, from the precipitate. Other materials such as formed building materials and/or non-cementitious materials may also be formed from the precipitate and appropriate station may be used for preparing the same.

As indicated above, the system may be present on land or sea. For example, the system may be land-based system that is in a coastal region, e.g., close to a source of seawater, or even an interior location, where water is piped into the system from a water source, e.g., ocean. Alternatively, the system is a water based system, i.e., a system that is present on or in water. Such a system may be present on a boat, ocean based platform etc., as desired.

Calcium carbonate slurry is pumped via pump to drying system, which in some embodiments includes a filtration step followed by spray drying. The water separated from the drying system is discharged or is recirculated to the reactor. The resultant solid or powder from the drying system is utilized as cement or aggregate to produce building materials. The solid or powder may also be used as a PCC filler in non-cementitious products such as paper, plastic, paint etc. The solid or powder may also be used in forming formed building materials, such as drywall, cement boards, etc.

In some embodiments, the systems may include a control station, configured to control the amount of the aqueous base solution and/or the amount of the lime conveyed to the precipitator or the dissolution reactor; the amount of the precipitate conveyed to the separator; the amount of the precipitate conveyed to the drying station; and/or the amount of the precipitate conveyed to the refining station. A control station may include a set of valves or multi-valve systems which are manually, mechanically or digitally controlled, or may employ any other convenient flow regulator protocol. In some instances, the control station may include a computer interface, (where regulation is computer-assisted or is entirely controlled by computer) configured to provide a user with input and output parameters to control the amount, as described above.

II. Products

Provided herein are methods and systems for utilizing the lime formed from the calcination of the limestone by dissolving the lime in the aqueous base solution to produce the precipitation material comprising calcium carbonate in vaterite and/or aragonite polymorphic forms which vaterite transforms to aragonite and forms cement. Provided herein are environmentally friendly methods and systems of removing or separating $CO_2$ in a gaseous waste stream from the calcination of the limestone, and fixing the $CO_2$ into a non-gaseous, storage-stable form (e.g., materials for the construction of structures such as buildings and infrastructure, as well as the structures themselves or formed building materials such as drywall, or non-cementitious materials such as paper, paint, plastic, etc. or artificial reefs) such that the $CO_2$ does not escape into the atmosphere.

Building Material

The "building material" used herein includes material used in construction. In one aspect, there is provided a structure or a building material comprising the set and hardened form of the precipitation material e.g. where the reactive vaterite has converted to aragonite or PCC that sets and hardens. The product (product (A) or (B) in the figures) containing the aragonite form of the precipitate (aragonite formed by the dissolution-re-precipitation of the reactive vaterite) shows one or more unexpected properties, including but not limited to, high compressive strength, high porosity (low density or light weight), neutral pH (e.g. useful as artificial reef), microstructure network, etc.

Examples of such structures or the building materials include, but are not limited to, building, driveway, foundation, kitchen slab, furniture, pavement, road, bridges, motorway, overpass, parking structure, brick, block, wall, footing for a gate, fence, or pole, and combination thereof.

Formed Building Material

The "formed building material" used herein includes materials shaped (e.g., molded, cast, cut, or otherwise produced) into structures with defined physical shape. The formed building material may be a pre-cast building material, such as, a pre-cast cement or concrete product. The formed building materials and the methods of making and using the formed building materials are described in U.S. application Ser. No. 12/571,398, filed Sep. 30, 2009, which is incorporated herein by reference in its entirety. The formed building materials may vary greatly and include materials shaped (e.g., molded, cast, cut, or otherwise produced) into structures with defined physical shape, i.e., configuration. Formed building materials are distinct from amorphous building materials (e.g., powder, paste, slurry, etc.) that do not have a defined and stable shape, but instead conform to the container in which they are held, e.g., a bag or other container. Formed building materials are also distinct from irregularly or imprecisely formed materials (e.g., aggregate, bulk forms for disposal, etc.) in that formed building materials are produced according to specifications that allow for use of formed building materials in, for example, buildings. Formed building materials may be prepared in accordance with traditional manufacturing protocols for such structures, with the exception that the precipitation material is employed in making such materials.

In some embodiments, the methods and systems provided herein further include setting and hardening the precipitation material comprising reactive vaterite where the reactive vaterite has converted to aragonite, or the PCC that has set and hardened and forming a formed building material.

In some embodiments, the formed building materials made from the precipitation material have a compressive strength or the flexural strength of at least 3 MPa, at least 10 MPa, or at least 14 MPa, or between 3-30 MPa, or between about 14-100 MPa, or between about 14-45 MPa; or the compressive strength of the precipitation material after setting, and hardening, as described herein.

Examples of the formed building materials that can be produced by the foregoing methods and systems, include, but not limited to, masonry units, for example only, bricks, blocks, and tiles including, but not limited to, ceiling tiles; construction panels, for example only, cement board (boards traditionally made from cement such as fiber cement board) and/or drywall (boards traditionally made from gypsum); conduits; basins; beam; column, slab; acoustic barrier; insulation material; or combinations thereof. Construction panels are formed building materials employed in a broad sense to refer to any non-load-bearing structural element that are characterized such that their length and width are substantially greater than their thickness. As such the panel may be a plank, a board, shingles, and/or tiles. Exemplary construction panels formed from the precipitation material provided herein include cement boards and/or drywall. Construction panels are polygonal structures with dimensions that vary greatly depending on their intended use. The dimensions of construction panels may range from 50 to 500 cm in length, including 100 to 300 cm, such as 250 cm; width ranging from 25 to 200 cm, including 75 to 150 cm, such as 100 cm; thickness ranging from 5 to 25 mm, including 7 to 20 mm, including 10 to 15 mm.

In some embodiments, the cement board and/or the drywall may be used in making different types of boards such as, but not limited to, paper-faced board (e.g. surface reinforcement with cellulose fiber), fiberglass-faced or glass mat-faced board (e.g. surface reinforcement with glass fiber mat), fiberglass mesh reinforced board (e.g. surface reinforcement with glass mesh), and/or fiber-reinforced board (e.g. cement reinforcement with cellulose, glass, fiber etc.). These boards may be used in various applications including, but not limited to, sidings such as, fiber-cement sidings, roofing, soffit, sheathing, cladding, decking, ceiling, shaft liner, wall board, backer, trim, frieze, shingle, and fascia, and/or underlayment.

The cement boards traditionally are made from cement such as OPC, magnesium oxide cement and/or calcium silicate cement. The cement boards made by the methods and systems provided herein are made from the precipitation material that partially or wholly replaces the traditional cement in the board. In some embodiments, the cement boards may comprise construction panels prepared as a combination of aragonitic cement (setting and hardening when vaterite transforms to aragonite) and fiber and/or fiberglass and may possess additional fiber and/or fiberglass reinforcement at both faces of the board.

The cement boards are formed building materials which in some embodiments, are used as backer boards for ceramics that may be employed behind bathroom tiles, kitchen counters, backsplashes, etc. and may have lengths ranging from 100 to 200 cm. Cement boards may vary in physical and mechanical properties. In some embodiments, the flexural strength may vary, ranging between 1 to 7.5 MPa, including 2 to 6 MPa, such as 5 MPa. The compressive strengths may also vary, ranging from 5 to 50 MPa, including 10 to 30 MPa, such as 15 to 20 MPa. In some embodiments, cement boards may be employed in environments having extensive exposure to moisture (e.g., commercial saunas). The composition or the precipitation material described herein may be used to produce the desired shape and size to form a cement board. In addition, a variety of further components may be added to the cement boards which include, but are not limited to, plasticizers, clay, foaming agents, accelerators, retarders and air entrainment additives. The composition is then poured out into sheet molds or a roller may be used to form sheets of a desired thickness. The shaped composition may be further compacted by roller compaction, hydraulic pressure, vibrational compaction, or resonant shock compaction. The sheets are then cut to the desired dimensions of the cement boards.

Another type of construction panel formed from the composition or the precipitation material described herein is backer board. The backer board may be used for the construction of interior, and/or exterior floors, walls and ceilings. In the embodiments, the backer board is made partially or wholly from the precipitation material.

Another type of construction panel formed from the compositions or the precipitation material is drywall. The drywall includes board that is used for construction of interior, and/or exterior floors, walls and ceilings. Traditionally, drywall is made from gypsum (called paper-faced board). In the embodiments, the drywall is made partially or wholly from the carbonate precipitation material thereby replacing gypsum from the drywall product. In some embodiments, the drywall may comprise construction panels prepared as a combination of aragonitic cement (setting and hardening when vaterite transforms to aragonite) and cellulose, fiber and/or fiberglass and may possess additional paper, fiber, fiberglass mesh and/or fiberglass mat reinforcement at both faces of the board. Various processes for making the drywall product are well known in the art and are well within the scope of the invention. Some examples include, but not limited to, wet process, semi dry process, extrusion process, Wonderborad® process, etc., that have been described herein.

In some embodiments, the drywall is panel made of a paper liner wrapped around an inner core. For example, in some embodiments, during the process of making the drywall product from the precipitation material, the slurry of the precipitation material comprising vaterite is poured over a sheet of paper. Another sheet of paper is then put on top of the precipitation material such that the precipitation material is flanked by the paper on both sides (the resultant composition sandwiched between two sheets of outer material, e.g., heavy paper or fiberglass mats). The vaterite in the precipitation material is then transformed to aragonite (using additives and/or heat) which then sets and hardens. When the core sets and is dried in a large drying chamber, the sandwich becomes rigid and strong enough for use as a building material. The drywall sheets are then cut and separated.

The flexural and compressive strengths of the drywall formed from the precipitation material are equal to or higher than conventional drywall prepared with gypsum plaster, which is known to be a soft construction material. In some embodiments, the flexural strength may range between 0.1 to 3 MPa, including 0.5 to 2 MPa, such as 1.5 MPa. The compressive strengths may also vary, in some instances ranging from 1 to 20 MPa, including 5 to 15 MPa, such as 8 to 10 MPa. In some embodiments, the formed building materials such as, the construction panels such as, but not limited to, cement boards and drywall produced by the methods and systems described herein, have low density and high porosity making them suitable for lightweight and insulation applications. The high porosity and light weight of the formed building materials such as construction panels may be due to the development of the aragonitic microstructure when vaterite transforms to aragonite. The transformation of the vaterite during dissolution/re-precipitation process may lead to micro porosity generation while at the same time the voids created between the aragonitic crystals formed may provide nano porosity thereby leading to highly porous and light weight structure. Certain admixtures may be added during the transformation process such as, but not limited to, foaming agents, rheology modifiers and mineral extenders, such as, but not limited to, clay, starch, etc. which may add to the porosity in the product as the foaming agent may entrain air in the mixture and lower the overall density and mineral extender such as sepiolite clay may increase the viscosity of the mixture thereby preventing segregation of the precipitation material and water.

One of the applications of the cement board or drywall is fiber cement siding. Fiber-cement sidings formed by the methods and systems provided herein comprise construction panels prepared as a combination of aragonitic cement, aggregate, interwoven cellulose, and/or polymeric fibers and may possess a texture and flexibility that resembles wood.

In some embodiments, the formed building materials are masonry units. Masonry units are formed building materials used in the construction of load-bearing and non-load-bearing structures that are generally assembled using mortar, grout, and the like. Exemplary masonry units formed from the compositions include bricks, blocks, and tiles.

Another formed building material formed from the precipitation material described herein is a conduit. Conduits are tubes or analogous structures configured to convey a gas or liquid, from one location to another. Conduits can include any of a number of different structures used in the conveyance of a liquid or gas that include, but are not limited to, pipes, culverts, box culverts, drainage channels and portals, inlet structures, intake towers, gate wells, outlet structures, and the like.

Another formed building material formed from the precipitation material described herein is basins. The term basin may include any configured container used to hold a liquid, such as water. As such, a basin may include, but is not limited to structures such as wells, collection boxes, sanitary manholes, septic tanks, catch basins, grease traps/separators, storm drain collection reservoirs, etc.

Another formed building material formed from the precipitation material described herein is a beam, which, in a broad sense, refers to a horizontal load-bearing structure possessing large flexural and compressive strengths. Beams may be rectangular cross-shaped, C-channel, L-section edge beams, I-beams, spandrel beams, H-beams, possess an inverted T-design, etc. Beams may also be horizontal load-bearing units, which include, but are not limited to joists, lintels, archways and cantilevers.

Another formed building material formed from the precipitation material described herein is a column, which, in a broad sense, refers to a vertical load-bearing structure that carries loads chiefly through axial compression and includes structural elements such as compression members. Other vertical compression members of the invention may include, but are not limited to pillars, piers, pedestals, or posts.

Another formed building material formed from the precipitation material described herein is a concrete slab. Concrete slabs are those building materials used in the construction of prefabricated foundations, floors and wall panels. In some instances, a concrete slab may be employed as a floor unit (e.g., hollow plank unit or double tee design).

Another formed building material formed from the precipitation material described herein is an acoustic barrier, which refers to a structure used as a barrier for the attenuation or absorption of sound. As such, an acoustic barrier may include, but is not limited to, structures such as acoustical panels, reflective barriers, absorptive barriers, reactive barriers, etc.

Another formed building material formed from the precipitation material described herein is an insulation material, which refers to a material used to attenuate or inhibit the conduction of heat. Insulation may also include those materials that reduce or inhibit radiant transmission of heat.

In some embodiments, the other formed building materials such as pre-cast concrete products include, but not limited to, bunker silo; cattle feed bunk; cattle grid; agricultural fencing; H-bunks; J-bunks; livestock slats; livestock watering troughs; architectural panel walls; cladding (brick); building trim; foundation; floors, including slab on grade; walls; double wall precast sandwich panel; aqueducts; mechanically stabilized earth panels; box culverts; 3-sided culverts; bridge systems; RR crossings; RR ties; sound walls/barriers; Jersey barriers; tunnel segments; reinforced concrete box; utillity protection structure; hand holes; hollowcore product; light pole base; meter box; panel vault; pull box; telecom structure; transformer pad; transformer vault; trench; utility vault; utility pole; controlled environment vaults; underground vault; mausoleum; grave stone; coffin; haz mat storage container; detention vaults; catch basins; manholes; aeration system; distribution box; dosing tank; dry well; grease interceptor; leaching pit; sand-oil/oil-water interceptor; septic tank; water/sewage storage tank; wetwells; fire cisterns; floating dock; underwater infrastructure; decking; railing; sea walls; roofing tiles; pavers; community retaining wall; res. retaining wall; modular block systems; and segmental retaining walls.

Non-Cementitious Compositions

In some embodiments, the methods and systems described herein include making other products from the precipitation material described herein including, but not limited to, non-cementitious compositions including paper, polymer product, lubricant, adhesive, rubber product, chalk, asphalt product, paint, abrasive for paint removal, personal care product, cosmetic, cleaning product, personal hygiene product, ingestible product, agricultural product, soil amendment product, pesticide, environmental remediation product, and combination thereof. Such compositions have been described in U.S. Pat. No. 7,829,053, issued Nov. 9, 2010, which is incorporated herein by reference in its entirety.

Artificial Marine Structures

In some embodiments, the methods described herein include making artificial marine structures from the precipitation material described herein including, but not limited to, artificial corals and reefs. In some embodiments, the artificial structures can be used in the aquariums or sea. In some embodiments, these products are made from the precipitated material comprising reactive vaterite that transforms to aragonite after setting and hardening. The aragonitic cement provides neutral or close to neutral pH which may be conducive for maintenance and growth of marine life. The aragonitic reefs may provide suitable habitat for marine species.

The following examples are put forth so as to provide those of ordinary skill in the art with a complete disclosure and description of how to make and use the invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for.

EXAMPLES

Example 1

Formation and Transformation of the Precipitation Material from Lime $NH_4Cl$ is dissolved into water. Lime is added to the aqueous solution and mixed at 80° C. in a vessel with a vapor outlet tube. Vapor leaves the vessel through the outlet tube and is condensed along with $CO_2$ at 20° C. to form an aqueous solution containing ammonia, ammonium bicarbonate, and ammonium carbonate in a first airtight and collapsible bag. The solid and liquid mixture remaining in the vessel is cooled to 20° C. and vacuum filtered to remove the insoluble impurities. The clear $CaCl_2$-containing filtrate is transferred to a second airtight and collapsible bag. Both bags are submersed in a water bath, which preheats the solutions to 35° C. The precipitation reactor is an acrylic cylinder equipped with baffles, pH electrode, thermocouple, turbine impeller, and inlet and outlet ports for liquid feeds and product slurry. During startup, the $CaCl_2$-containing solution in the second bag is pumped into the reactor at a fixed flow rate. The mixer is stirred while the solution in the first bag is introduced by a separate pump. A computer automated control loop controls the continuous inlet flow of the ammonium carbonate-containing solution from the first bag maintaining the pH between 7-9. Reactive vaterite slurry is formed. The resultant reactive vaterite slurry is continuously collected into a holding container. The slurry is vacuum filtered. The reactive vaterite filter cake is oven dried at 100° C. The cake shows 100% vaterite with a mean particle size of 5 microns. The clear filtrate containing regenerated $NH_4Cl$ is recycled in subsequent experiments.

The dried reactive vaterite solid is mixed with water into a paste. The XRD of the paste after 1 day shows 99.9% aragonite (vaterite fully converted to aragonite). The pastes are cast into 2"×2"×2" cubes, which set and harden in a humidity chamber set to 60° C. and 80% of relative humidity for 7 days. The cemented cubes are dried in a 100° C. oven. Destructive testing determines the compressive strength of the cubes to be 4600 psi (~31 MPa).

Example 2

Formation and Transformation of the Precipitation Material from Lime $NH_4Cl$ is dissolved into water. Lime is added to the aqueous solution and mixed under pressure at 120° C. in a dissolution vessel with outlets for vapor and slurry. Slurry containing insoluble impurities leaves through the bottom outlet and passes through a filter to remove solids. The clear $CaCl_2$-containing filtrate is cooled to 30° C. and pumped to a precipitation reactor. The precipitation reactor is an acrylic cylinder equipped with baffles, gas sparger, pH electrode, thermocouple, turbine impeller, and inlet and outlet ports for liquid and gas feeds and product slurry. Vapor containing ammonia passes from the dissolution reactor into a sparger located in the precipitation reactor. $CO_2$ is also passed into the precipitation reactor. A computer automated control loop controls the continuous inlet flow of the $CaCl_2$-containing solution maintaining the pH between 7-9. The resultant reactive vaterite slurry is continuously collected into a holding container. The slurry is vacuum filtered. The reactive vaterite filter cake is oven dried at 100° C. The cake shows 100% vaterite with a mean particle size of 5 microns. The clear filtrate containing regenerated $NH_4Cl$ is recycled in subsequent experiments.

The dried reactive vaterite solid is mixed into a paste using water. The XRD of the paste after 1 day shows 99.9% aragonite (vaterite fully converted to aragonite). The pastes are cast into 2"×2"×2" cubes, which set and harden in a humidity chamber set to 60° C. and 80% of relative humidity for 7 days. The cemented cubes are dried in a 100° C. oven. Destructive testing determines the compressive strength of the cubes to be 4600 psi (~31 MPa).

Example 3

Control of the Formation of Products in the Cooling Reactor $NH_4Cl$ is dissolved into water. Lime is added to the aqueous solution and mixed at 80° C. in a vessel with a vapor outlet tube. Vapor comprising ammonia leaves the vessel through the outlet tube and is condensed along with $CO_2$ (and water vapor) at 20° C. to form an aqueous solution containing ammonia, ammonium bicarbonate, ammonium carbonate, and ammonium carbamate in a first airtight and collapsible bag. The formation of the condensed products can be controlled by controlling the flow of $CO_2$ based on the pH of the aqueous solution.

A simulation of this process demonstrated that: (i) by varying $CO_2$ flow until an outlet pH of 10.3 was obtained, a stream was obtained with carbamate:carbonate:bicarbonate ratio of 45%:35%:20%; (ii) by varying $CO_2$ flow until an outlet pH of 9.7 was obtained, a stream was obtained with carbamate:carbonate:bicarbonate ratio of 35%:25%:40%; and (iii) by varying $CO_2$ flow until an outlet pH of 8.7 was obtained, a stream was obtained with carbamate:carbonate:bicarbonate ratio of 20%:10%:70%.

Therefore, as the pH of the system was reduced by regulating the flow rate of the $CO_2$, the amount of the bicarbonate was favored over the carbamate and as the pH of the system was increased by regulating the flow rate of the $CO_2$, the amount of the carbamate was favored over the bicarbonate and the carbonate.

Example 4

Control of the Formation of Products in the Cooling Reactor $NH_4Cl$ is dissolved into water. Lime is added to the aqueous solution and mixed at 80° C. in a vessel with a vapor outlet tube. Vapor comprising ammonia leaves the vessel through the outlet tube and is condensed along with $CO_2$ (and water vapor) at 20° C. to form an aqueous solution containing ammonia, ammonium bicarbonate, ammonium carbonate, and ammonium carbamate in a first airtight and collapsible bag. The formation of the condensed products can be controlled by controlling the ratio of the $CO_2:NH_3$.

Figure 9:
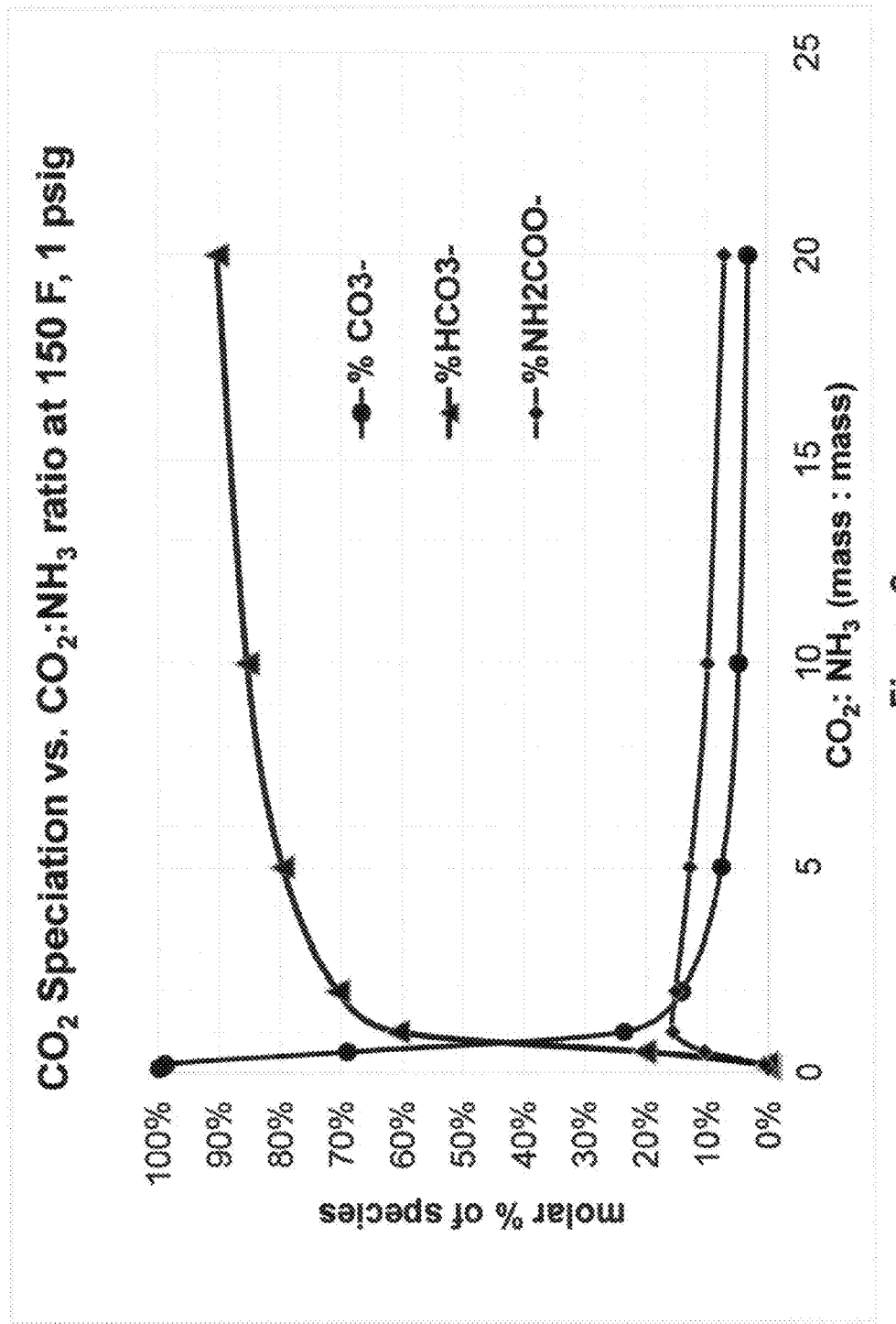
FIG. 9 illustrates the effects of $CO_2$:$NH_3$ ratio on the formation and the ratio of the condensed products in the cooling reactor, as described in Example 4 herein.

A simulation of this process demonstrated that: (i) by selecting flow of $CO_2$ to be in a mass ratio of 0.2:1 $CO_2:NH_3$, the speciation was driven to greater than 98% carbonate; (ii) by selecting flow of $CO_2$ to be in a mass ratio of 1:1 $CO_2:NH_3$, the speciation was driven to give greater than 15.6% carbamate; and (iii) by selecting flow of $CO_2$ to be in a mass ratio of 20:1 $CO_2:NH_3$, the speciation was driven to greater than 90% bicarbonate. The data is shown in Table I below as well as in FIG. 9. The data demonstrated that the ratio of $CO_2:NH_3$ directly affected the ratio of the products formed in the cooling reactor.

TABLE I

| $CO_2:NH_3$ | 0.1 | 0.2 | 0.5 | 1 | 2 | 5 | 10 | 20 |
|---|---|---|---|---|---|---|---|---|
| $NH_3:NH_4^+$ | 11.84 | 5.49 | 1.99 | 0.98 | 0.64 | 0.34 | 0.19 | 0.09 |
| % $CO_3^-$ (carbonate) | 99.8% | 98.9% | 69.1% | 23.5% | 14.1% | 7.6% | 4.7% | 3.0% |
| % $HCO_3^-$ (bicarbonate) | 0.1% | 0.4% | 20.4% | 60.9% | 70.7% | 79.7% | 85.4% | 90.2% |
| % $NH_2COO^-$ (carbamate) | 0.1% | 0.7% | 10.5% | 15.6% | 15.2% | 12.7% | 9.8% | 6.8% |

Although the foregoing invention has been described in some detail by way of illustration and example for purposes of clarity of understanding, it should be readily apparent to those of ordinary skill in the art in light of the teachings of this invention that certain changes and modifications may be made thereto without departing from the spirit or scope of the appended claims. Accordingly, the preceding merely illustrates the principles of the invention. It will be appreciated that those skilled in the art will be able to devise various arrangements, which, although not explicitly described or shown herein, embody the principles of the invention, and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein. It is intended that the following claims define the scope of the invention and that methods and structures within the scope of these claims and their equivalents be covered thereby.

What is claimed is:

1. A method, comprising:
   (i) calcining limestone to form lime wherein the lime comprises dead burnt lime and a gaseous stream comprising carbon dioxide;
   (ii) dissolving the lime in an aqueous N-containing inorganic salt solution to produce a first aqueous solution comprising calcium salt, and a gaseous stream comprising ammonia;
   (iii) recovering the gaseous stream comprising carbon dioxide and the gaseous stream comprising ammonia and subjecting the gaseous streams to a cooling process to condense a second aqueous solution comprising ammonium bicarbonate, ammonium carbonate, ammonia, ammonium carbamate, or combination thereof; and
   (iv) treating the first aqueous solution comprising calcium salt with the second aqueous solution comprising ammonium bicarbonate, ammonium carbonate, ammonia, ammonium carbamate, or combination thereof to form a precipitation material comprising calcium carbonate, wherein the calcium carbonate comprises vaterite.

2. The method of claim 1, wherein the calcination is carried out in shaft kiln, rotary kiln, or electric kiln.

3. The method of claim 1, wherein the lime further comprises underburnt lime, soft burnt lime, or combination thereof.

4. The method of claim 1, wherein a N-containing inorganic salt in the aqueous N-containing inorganic salt solution is selected from the group consisting of ammonium halide, ammonium sulfate, ammonium sulfite, ammonium nitrate, ammonium nitrite, and combination thereof.

5. The method of claim 4, wherein the ammonium halide is ammonium chloride.

6. The method of claim 1, wherein a molar ratio of a N-containing inorganic salt in the aqueous N-containing inorganic salt solution:lime is about 0.5:1-2:1.

7. The method of claim 1, wherein the dissolving step is under one or more dissolution conditions selected from the group consisting of temperature about 30-200° C.; pressure about 0.1-10 atm; a N-containing inorganic salt wt % in water about 0.5-50%; and combination thereof.

8. The method of claim 1, wherein the gaseous stream comprising ammonia further comprises water vapor.

9. The method of claim 1, wherein the cooling process is under one or more cooling conditions comprising temperature about 0-100° C.; pressure about 0.5-50 atm; pH of the aqueous solution about 8-12; ratio of $CO_2$:$NH_3$ about 0.1:1-20:1; or combination thereof.

10. The method of claim 1, wherein the treating step is under one or more precipitation conditions selected from the group consisting of pH of the first aqueous solution of 7-9, temperature of the solution of 20-60° C., residence time of 5-60 minutes, and combination thereof.

11. The method of claim 1, wherein the first aqueous solution further comprises solid.

12. The method of claim 11, further comprising separating the solid from the first aqueous solution before the treatment step by filtration and/or centrifugation and adding the separated solid to the precipitation material as filler.

13. The method of claim 11, wherein the solid is not separated from the first aqueous solution and the first aqueous solution is subjected to the treatment step to produce the precipitation material further comprising the solid.

14. The method of claim 11, wherein the solid comprises silicate, iron oxide, alumina, or combination thereof.

15. The method of claim 1, wherein the vaterite is stable vaterite or reactive vaterite.

16. The method of claim 15, further comprising adding water to the precipitation material comprising reactive vaterite and transforming the reactive vaterite to aragonite wherein the aragonite sets and hardens to form cement, cementitious product, non-cementitious product, or combination thereof.

17. The method of claim 16, wherein the cementitious product is aggregate; building material; or formed building material selected from masonry unit, construction panel, conduit, basin, beam, column, slab, acoustic barrier, insulation material, and combination thereof.

18. The method of claim 1, wherein the first aqueous solution further comprises dissolved ammonia.

19. The method of claim 1, further comprising adding an additive to the first aqueous solution, to the second aqueous solution, or to the precipitation material, wherein the additive is selected from the group consisting of fatty acid ester, sodium decyl sulfate, lauric acid, sodium salt of lauric acid, urea, citric acid, sodium salt of citric acid, phthalic acid, sodium salt of phthalic acid, taurine, creatine, dextrose, poly(n-vinyl-1-pyrrolidone), aspartic acid, sodium salt of aspartic acid, magnesium chloride, acetic acid, sodium salt of acetic acid, glutamic acid, sodium salt of glutamic acid, strontium chloride, gypsum, lithium chloride, sodium chloride, glycine, sodium citrate dehydrate, sodium bicarbonate, magnesium sulfate, magnesium acetate, sodium polystyrene, sodium dodecylsulfonate, poly-vinyl alcohol, and combination thereof.

20. The method of claim 1, wherein the vaterite is unimodal, bimodal, or multimodal distribution of a particulate composition with an average particle size of between 0.1-100 micron.

21. The method of claim 1, further comprising blending the precipitation material with Ordinary Portland Cement (OPC), aggregate, or combination thereof.

22. The method of claim 1, further comprising mixing the precipitation material with an admixture selected from the group consisting of set accelerator, set retarder, air-entraining agent, foaming agent, defoamer, alkali-reactivity reducer, bonding admixture, dispersant, coloring admixture, corrosion inhibitor, damp-proofing admixture, gas former, permeability reducer, pumping aid, shrinkage compensation admixture, fungicidal admixture, germicidal admixture, insecticidal admixture, rheology modifying agent, finely divided mineral admixture, pozzolan, aggregate, wetting agent, strength enhancing agent, water repellent, reinforced material, and combination thereof.

23. The method of claim 22, wherein the reinforced material is a fiber made of zirconia, aluminum, glass, steel, carbon, ceramic, grass, bamboo, wood, fiberglass, synthetic material, or combination thereof.

\* \* \* \* \*